(12) United States Patent
Yukawa et al.

(10) Patent No.: US 11,095,237 B2
(45) Date of Patent: Aug. 17, 2021

(54) VEHICLE DRIVING APPARATUS

(71) Applicant: PANASONIC INTELLECTUAL PROPERTY MANAGEMENT CO., LTD., Osaka (JP)

(72) Inventors: Junichi Yukawa, Kanagawa (JP); Naoya Iwasaki, Kanagawa (JP); Hisazumi Watanabe, Kanagawa (JP); Yoshihiko Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 56 days.

(21) Appl. No.: 16/703,254

(22) Filed: Dec. 4, 2019

(65) Prior Publication Data

US 2020/0186058 A1 Jun. 11, 2020

(30) Foreign Application Priority Data

Dec. 6, 2018 (JP) .............................. JP2018-228670
Jan. 24, 2019 (JP) .............................. JP2019-010433
(Continued)

(51) Int. Cl.
*H02P 6/12* (2006.01)
*H02P 6/04* (2016.01)
(Continued)

(52) U.S. Cl.
CPC ................ *H02P 6/12* (2013.01); *B60L 3/003* (2013.01); *H02P 6/04* (2013.01); *H02P 6/28* (2016.02);
(Continued)

(58) Field of Classification Search
CPC ...... H02P 6/12; H02P 6/04; H02P 6/28; H02P 3/22; H02P 29/024; H02P 2205/05;
(Continued)

(56) References Cited

U.S. PATENT DOCUMENTS 3,760,358 A * 9/1973 Isii ............................ G10H 1/18
340/2.29
5,347,443 A * 9/1994 Muramatsu ........... H02M 5/458
318/778
(Continued)

FOREIGN PATENT DOCUMENTS

JP 2015-089293 A 5/2015
JP 2015-198503 A 11/2015

OTHER PUBLICATIONS

Office Action in corresponding Japanese Patent Application No. 2019-126208, dated Jul. 7, 2020 and English machine translation thereof.

*Primary Examiner* — Rina I Duda
(74) *Attorney, Agent, or Firm* — Greenblum & Bernstein, P.L.C.

(57) ABSTRACT

A vehicle driving apparatus includes an inverter which drives a permanent magnet motor. The inverter includes a three-phase bridge circuit including a plurality of switch elements, a drive circuit connected to the three-phase bridge circuit, a control circuit connected to the drive circuit, and an abnormality detecting unit which detects abnormality of the inverter. The drive circuit includes a three-phase-short-circuit-forming circuit which causes three phases of the permanent magnet motor to form short circuits, an abnormality accepting terminal which accepts an abnormality signal output from the abnormality detecting unit, and a check terminal which accepts an active check signal for causing the three-phase-short-circuit-forming circuit to perform three-phase short circuit control.

24 Claims, 59 Drawing Sheets

(30) Foreign Application Priority Data

| | | |
|---|---|---|
| Jan. 24, 2019 | (JP) | JP2019-010440 |
| Jan. 24, 2019 | (JP) | JP2019-010453 |
| Jan. 24, 2019 | (JP) | JP2019-010557 |
| Jul. 5, 2019 | (JP) | JP2019-126208 |

(51) Int. Cl.
  *H02P 6/28* (2016.01)
  *B60L 3/00* (2019.01)
  *B60K 6/26* (2007.10)

(52) U.S. Cl.
  CPC ............ *B60K 6/26* (2013.01); *B60Y 2200/91* (2013.01); *B60Y 2200/92* (2013.01); *H02P 2006/045* (2013.01); *H02P 2205/05* (2013.01)

(58) Field of Classification Search
  CPC ...... B60L 3/003; B60L 2220/42; B60L 15/20; B60Y 2200/91; B60Y 2200/92
  See application file for complete search history.

(56) References Cited

U.S. PATENT DOCUMENTS

| | | | | |
|---|---|---|---|---|
| 7,038,405 | B2* | 5/2006 | Makinen | H02P 23/0004 318/78 |
| 7,652,858 | B2* | 1/2010 | Tang | H02H 7/0838 361/33 |
| 7,764,051 | B2* | 7/2010 | Ishikawa | B60L 3/04 322/29 |
| 8,605,471 | B2* | 12/2013 | Ogura | H02M 1/32 363/56.03 |
| 2009/0195199 | A1* | 8/2009 | Ito | H02P 29/0241 318/400.22 |
| 2010/0171448 | A1* | 7/2010 | Kitanaka | H02P 5/74 318/45 |
| 2013/0043816 | A1* | 2/2013 | Welchko | H02M 1/32 318/400.21 |
| 2015/0280624 | A1* | 10/2015 | Sotome | H02M 7/5387 318/400.22 |

* cited by examiner

VEHICLE DRIVING APPARATUS

CROSS REFERENCE TO RELATED APPLICATIONS

The present application is based on and claims priority of Japanese Patent Application No. 2018-228670 filed on Dec. 6, 2018, Japanese Patent Application No. 2019-010433 filed on Jan. 24, 2019, Japanese Patent Application No. 2019-010440 filed on Jan. 24, 2019, Japanese Patent Application No. 2019-010453 filed on Jan. 24, 2019, Japanese Patent Application No. 2019-010557 filed on Jan. 24, 2019, and Japanese Patent Application No. 2019-126208 filed on Jul. 5, 2019.

FIELD

The present disclosure relates to a vehicle driving apparatus that drives a vehicle by controlling motor driving.

BACKGROUND

Electrically driven vehicles, such as an electric vehicle (EV), a hybrid electric vehicle (HEV), and a plug-in hybrid vehicle (PHV), and a fuel cell vehicle (FCV), have been increasingly used in relation to fuel consumption regulation and $CO_2$ regulation. Further, to improve electrical efficiency of a vehicle, a permanent magnet motor has been increasingly used as the motor that drives the vehicle.

A permanent magnet motor is a high-efficiency motor because it does not require excitation current, but voltage induced by the field magnetic flux of the permanent magnet increases in proportion to the number of revolutions (also called rotational speed or angular velocity in the following description), and the induced voltage undesirably exceeds the voltage output from the inverter when a certain number of revolutions is reached. Therefore, to operate a permanent magnet motor at high speed, weakened magnetic flux control is performed. The magnetic flux weakening control suppresses the voltage induced by the field magnetic flux of the permanent magnet On the other hand, in a case where the inverter experiences abnormality when the motor rotates at high speed, for example, in a case where a terminal of a high-voltage battery experiences contact failure so that electric power for the magnetic flux weakening control is not supplied, large voltage induced by the rotation provided by the permanent magnet motor breaks a switch element in the inverter in some cases.

To solve the problem, three-phase short circuit control is performed. In the three-phase short circuit control, the three phases of the permanent magnet motor is caused to form short circuits so that the voltage induced by the permanent magnet motor is 0 (zero). As an example of the three-phase short circuit control, PTL 1 describes a vehicle driving apparatus including an inverter that drives a permanent magnet motor, an abnormality detecting unit that detects abnormality that occurs in the inverter, such as overvoltage, and a three-phase-short-circuit-forming circuit that performs three-phase short circuit control on the inverter. In the vehicle driving apparatus, when the abnormality detecting unit detects abnormality, the inverter is switched from three-phase pulse width modulation (PWM) control to the three-phase short circuit control to lower the overvoltage applied to the inverter.

CITATION LIST

Patent Literature

[PTL 1]
 Unexamined Patent Application Publication No 2015-198503

SUMMARY

However, the vehicle driving apparatus according to PTL 1 can be improved upon.

In view of this, the present disclosure provides a vehicle driving apparatus capable of improving upon the above related art.

A vehicle driving apparatus according to an aspect of the present disclosure includes an inverter configured to drive a permanent magnet motor, wherein the inverter includes a three-phase bridge circuit including a plurality of switch elements, a drive circuit connected to the three-phase bridge circuit, a control circuit connected to the drive circuit, and an abnormality detecting unit configured to detect abnormality of the inverter, and the drive circuit includes a three-phase-short-circuit-forming circuit configured to cause three phases of the permanent magnet motor to form short circuits, an abnormality accepting terminal configured to accept an abnormality signal output from the abnormality detecting unit, and a check terminal configured to accept an active check signal for causing the three-phase-short-circuit-forming circuit to perform three-phase short circuit control.

The vehicle driving apparatus according to an aspect of the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
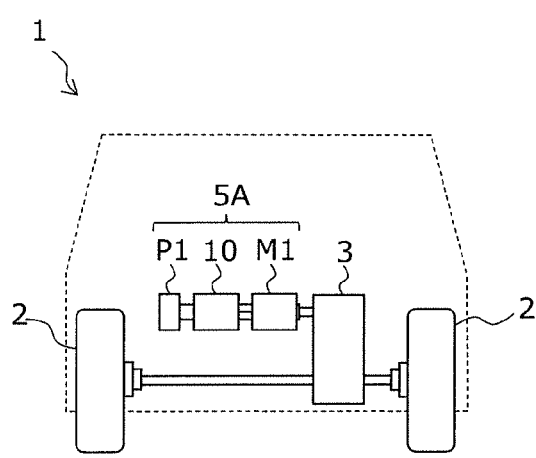
FIG. 1 is an outline diagram showing an example of an electric vehicle including a vehicle driving apparatus according to Embodiment 1.

In the vehicle driving apparatus described in PTL 1, there is no opportunity in which three-phase short circuit control is performed unless abnormality or failure that requires three-phase short circuit control, such as overvoltage, occurs. Even if the three-phase-short-circuit-forming circuit falls, a control apparatus of the inverter cannot sense the failure, resulting in a problem of potential failure.

The present disclosure provides a reliable vehicle driving apparatus that locates potential failure of three-phase short circuit control in an inverter at an early stage.

Hereinafter, a vehicle driving apparatus according to the present disclosure will be described.

A vehicle driving apparatus according to an aspect of the present disclosure includes an inverter configured to drive a permanent magnet motor, wherein the inverter includes a three-phase bridge circuit including a plurality of switch elements, a drive circuit connected to the three-phase bridge circuit, a control circuit connected to the drive circuit, and an abnormality detecting unit configured to detect abnormality of the inverter, and the drive circuit includes a three-phase-short-circuit-forming circuit configured to cause three phases of the permanent magnet motor to form short circuits, an abnormality accepting terminal configured to accept an abnormality signal output from the abnormality detecting unit, and a check terminal configured to accept an active check signal for causing the three-phase-short-circuit-forming circuit to perform three-phase short circuit control. In the following description, the action of causing the three-phase-short-circuit-forming circuit to perform the three-phase short circuit control is called an active check.

According to the configuration described above, the drive circuit can accept the active check signal as appropriate via the check terminal. The active check signal allows the vehicle driving apparatus to check as appropriate whether or not the three-phase-short-circuit-forming circuit can perform the three-phase short circuit control. If the active check locates failure of the three-phase-short-circuit-forming circuit, the control circuit in the inverter can handle the failure, for example, can guide a driver in such a way that the driver's greater safety is assured by conveying the abnormality, for example, to a high-level control unit of the vehicle, followed by the high-level control unit's issuing a warning to the driver, for example, in the form of display on a meter to prompt the driver to repair the abnormality. Potential failure of the three-phase short circuit control can therefore be located in the inverter at an early stage to increase the reliability of the vehicle driving apparatus. The content of the above description is described in Embodiments 1, 2, 3, 4, and 5.

Furthermore, in a case where the vehicle is in motion and the permanent magnet motor is performing no powering or regenerating operation, the control circuit may output the active check signal.

As described above, making the active check even when the vehicle is in motion and the permanent magnet motor is performing no powering or regenerating operation allows the active check to be made with the effect on the driven state of the permanent magnet motor suppressed. The content of the above description is described in Embodiment 1.

Furthermore, the control circuit may output the active check signal to the check terminal based on three-phase short circuit torque that is torque produced in the permanent magnet motor when the three-phase short circuit control is performed during the regenerating operation of the permanent magnet motor.

As described above, the configuration in which the control circuit outputs the active check signal based on the three-phase short circuit torque described above allows the drive circuit to accept as appropriate the active check signal via the check terminal. The active check signal allows the vehicle driving apparatus to check as appropriate whether or not the three-phase-short-circuit-forming circuit can perform the three-phase short circuit control. Further, outputting the active check signal during the regenerating operation of the permanent magnet motor allows an increase in the number of opportunities of checking whether or not the three-phase short circuit control can be performed, as compared, for example, with the case where the active check signal is output only when the permanent magnet motor is performing no regenerating or powering operation. If the output of the active check signal locates failure of the three-phase-short-circuit-forming circuit, the control circuit in the inverter can handle the failure, for example, can guide the driver in such a way that the driver's greater safety is assured by conveying the abnormality, for example, to a high-level control unit of the vehicle, followed by the high-level control unit's issuing a warning to the driver, for example, in the form of display on a meter to prompt the driver to repair the abnormality. Potential failure of the three-phase short circuit control can therefore be located in the inverter at an early stage to increase the reliability of the vehicle driving apparatus. The content of the above description is described in Embodiment 3.

Furthermore, in a case where the three-phase short circuit torque is smaller than or equal to first specified torque, the control circuit may output the active check signal.

As described above, outputting the active check signal when the torque produced by the permanent magnet motor when the three-phase short circuit control is performed is not too large allows suppression of discomfort given to a user who uses the vehicle driving apparatus. Further, variation in the torque of the permanent magnet motor is unlikely to increase, for example, even in the case where the three-phase-short-circuit-forming circuit has failed, whereby the discomfort given to the user can be suppressed. The content of the above description is described in Embodiment 3.

Furthermore, the vehicle driving apparatus may further include a torque imparting apparatus configured to impart torque to one or more driving wheels of the vehicle. In a case where the three-phase short circuit torque is greater than or equal to second specified torque smaller than the first specified torque, the control circuit may further control the torque imparting apparatus in such a way that assistance torque according to a torque difference between regenerative torque produced when the permanent magnet motor is performing regenerating operation and the three-phase short circuit torque is imparted to the driving wheels.

As described above, imparting the assistance torque to the driving wheels by using the torque imparting apparatus allows decrease in the discomfort given to the user when the three-phase short circuit control is performed. The content of the above description is described in Embodiment 3.

Furthermore, the permanent magnet motor may be one drive source, the vehicle driving apparatus may further comprise an other drive source different from the one drive source, and in a case where the one drive source is not used and the other drive source is capable of driving the vehicle, the control circuit may output the active check signal to the check terminal.

As described above, the configuration in which the control circuit outputs the active check signal in the case where the other drive source can drive the vehicle allows the drive circuit to accept as appropriate the active check signal via the check terminal. The active check signal allows the vehicle driving apparatus to check as appropriate whether or not the three-phase-short-circuit-forming circuit can perform the three-phase short circuit control. Further, in the case where the other drive source can drive the vehicle, the one drive source is allowed to perform no powering or regenerating operation, whereby the vehicle driving apparatus can check whether or not the three-phase-short-circuit-forming circuit on the side where the one drive source is provided can perform the three-phase short circuit control. If the output of the active check signal locates failure of the three-phase-short-circuit-forming circuit, the control circuit in the inverter can handle the failure, for example, can guide the driver in such a way that the driver's greater safety is assured by conveying the abnormality, for example, to a high-level control unit of the vehicle, followed by the high-level control unit's issuing a warning to a driver, for example, in the form of display on a meter to prompt the driver to repair the abnormality. A reliable vehicle driving apparatus in which potential failure of the three-phase short circuit control is located in the inverter at an early stage can therefore be provided. The content of the above description is described in Embodiment 4.

Furthermore, the control circuit may output the active check signal after the control circuit determines that the one drive source and the other drive source are both performing powering operation.

As described above, outputting the active check signal during the powering operation of the permanent magnet motor allows an increase in the number of opportunities of checking whether or not the three-phase short circuit control can be performed, as compared, for example, with the case where the active check signal is output only when the permanent magnet motor is performing no regenerating or powering operation. A reliable vehicle driving apparatus in which potential failure of the three-phase short circuit control is located in the inverter at an early stage can therefore be provided. The content of the above description is described in Embodiment 4.

Furthermore, in a case where the other drive source is capable of outputting entire torque that is a combination of first torque output from the one drive source, second torque output from the other drive source, and three-phase short circuit torque that is torque produced in the permanent magnet motor when the three-phase short circuit control is performed in the one drive source, the control circuit may determine that the other drive source is capable of driving the vehicle.

According to the configuration described above, since the active check signal is output in the case where the other drive source can output the entire torque, the effect acting on the traveling state of the vehicle can be reduced when the three-phase short circuit control is performed. The content of the above description is described in Embodiment 4.

Furthermore, the other drive source may include at least one of an other permanent magnet motor different from the permanent magnet motor and an engine.

According to the configuration described above, appropriate torque can be imparted to the vehicle driving apparatus, whereby the effect acting on the traveling state of the vehicle can be reduced when the three-phase short circuit control is performed. The content of the above description is described in Embodiment 4.

Furthermore, the vehicle driving apparatus may further include two permanent magnet motors that are each the permanent magnet motor, one inverter that is the inverter and drives the one drive source that is one of the two permanent magnet motors, and an other inverter that is the inverter and drives the other drive source that is an other one of the two permanent magnet motors. In a case where the one drive source is not used and the other drive source is capable of driving the vehicle, the control circuit may output the active check signal to one check terminal that is the terminal provided in the one inverter, and in a case where the other drive source is not used and the one drive source is capable of driving the vehicle, the control circuit may output the active check signal to an other check terminal that is the terminal provided in the other inverter.

As described above, outputting the active check signal in the case where the vehicle can be driven without using the one drive source but by using the other drive source allows reduction in the effect on the traveling state of the vehicle when the three-phase short circuit control is performed in the permanent magnet motor that is the one drive source. Similarly, outputting the active check signal in the case where the vehicle can be driven without using the other drive source but by using the one drive source allows reduction in the effect on the traveling state of the vehicle when the three-phase short circuit control is performed in the permanent magnet motor that is the other drive source. The content of the above description is described in Embodiment 4.

Furthermore, when the vehicle is stationary, the control circuit may output the active check signal to the check terminal after current control is performed by using the three-phase bridge circuit in such a way that current that does not cause the vehicle to start traveling flows through the permanent magnet motor.

According to the configuration described above, the drive circuit can accept the active check signal as appropriate via the check terminal. The active check signal allows the vehicle driving apparatus to check as appropriate whether or not the three-phase-short-circuit-forming circuit can perform the three-phase short circuit control. If failure of the three-phase-short-circuit-forming circuit is located through the output of the active check signal, the control circuit in the inverter can handle the failure, for example, can guide a driver in such a way that the driver's greater safety is assured by conveying the abnormality, for example, to a high-level control unit of the vehicle, followed by the high-level control unit's issuing a warning to the driver, for example, in the form of display on a meter to prompt the driver to repair the abnormality. Potential failure of the three-phase short circuit control can therefore be located in the inverter at an early stage to increase the reliability of the vehicle driving apparatus.

Performing the current control in such a way that current that almost causes the vehicle to start traveling flows through the permanent magnet motor as in the configuration described above allows diagnosis of failure of the three-phase-short-circuit-forming circuit with the stationary state of the vehicle maintained. Further, outputting the active check signal when the vehicle is stationary allows an increase in the number of opportunities of checking whether or not the three-phase short circuit control can be performed as compared, for example, with the case where the active check signal is output only when the vehicle is in motion and predetermined conditions are satisfied. The content of the above description is described in Embodiment 5.

Furthermore, upon acceptance of the active check signal, the drive circuit may switch the current control performed by the permanent magnet motor to the three-phase short circuit control.

As described above, the drive circuit's switching of the current control performed in the permanent magnet motor to the three-phase short circuit control allows the vehicle driving apparatus to check whether or not the three-phase-short-circuit-forming circuit can perform the three-phase short circuit control. Potential failure of the three-phase short circuit control can therefore be located in the inverter at an early stage to increase the reliability of the vehicle driving apparatus. The content of the above description is described in Embodiment 5.

Furthermore, the control circuit may terminate the current control when the control circuit outputs the active check signal.

According to the configuration described above, the vehicle driving apparatus can check whether or not the three-phase-short-circuit-forming circuit can perform the three-phase short circuit control in a stable manner without newly inputting current from an external source when the three-phase short circuit control is performed. Potential failure of the three-phase short circuit control can therefore be located in the inverter at an early stage to increase the reliability of the vehicle driving apparatus. The content of the above description is described in Embodiment 5.

Furthermore, the control circuit may perform the current control by controlling the three-phase bridge circuit via the drive circuit in such a way that d-axis current flows through the permanent magnet motor.

According to the configuration described above, the three-phase-short-circuit-forming circuit can be diagnosed in terms of failure with the stationary state of the vehicle maintained and with no torque produced by the permanent magnet motor. The content of the above description is described in Embodiment 5.

Furthermore, in a case where torque of the permanent magnet motor produced when the three-phase short circuit control is performed is smaller than or equal to torque that does not affect a driven state of the vehicle driving apparatus, the control circuit may: 1) determine current expected to flow through the permanent magnet motor when the three-phase short circuit control is performed; 2) control the three-phase bridge circuit via the drive circuit in such a way that the current flows through the permanent magnet motor; and then 3) output the active check signal to the check terminal.

According to the configuration described above, the drive circuit can accept the active check signal as appropriate via the check terminal. The active check signal allows the vehicle driving apparatus to check as appropriate whether or not the three-phase-short-circuit-forming circuit can perform the three-phase short circuit control. If the output of the active check signal locates failure of the three-phase-short-circuit-forming circuit, the control circuit in the inverter can handle the failure, for example, can guide the driver in such a way that the driver's greater safety is assured by conveying the abnormality, for example, to a high-level control unit of the vehicle, followed by the high-level control unit's issuing a warning to the driver, for example, in the form of display on a meter to prompt the driver to repair the abnormality. Potential failure of the three-phase short circuit control can therefore be located in the inverter at an early stage to increase the reliability of the vehicle driving apparatus.

Outputting the active check signal after the current control so performed that the current produced when the three-phase short circuit control is performed flows through the permanent magnet motor as in the configuration described above allows suppression of torque variation and current variation that occur when the three-phase short circuit control is performed. Suppression of the torque variation and current variation can shorten the period required to check whether or not the three-phase-short-circuit-forming circuit has failed. The content of the above description is described in Embodiment 2.

Furthermore, when the permanent magnet motor is not performing powering or regenerating operation or performing regenerating operation at torque smaller than or equal to predetermined torque, the control circuit may determine that the torque of the permanent magnet motor produced when the three-phase short circuit control is performed is smaller than or equal to the torque that does not affect the driven state of the vehicle driving apparatus.

According to the configuration described above, the active check signal can be output when the permanent magnet motor is performing no powering or regenerating operation or performing the regenerating operation at torque smaller than or equal to predetermined torque, whereby the three-phase-short-circuit-forming circuit can be diagnosed in terms of failure with the effect on the driven state of the permanent magnet motor suppressed. The content of the above description is described in Embodiment 2.

Furthermore, the control circuit may determine the current based on a number of revolutions of the permanent magnet motor achieved when the three-phase short circuit control is performed.

According to the configuration described above, the active check signal can be output after the current determined based on the number of revolutions of the permanent magnet motor is caused to flow through the permanent magnet motor, whereby the torque variation and current variation that occur when the three-phase short circuit control is performed can be appropriately suppressed. Suppression of the torque variation and current variation can shorten the period required to check whether or not the three-phase-short-circuit-forming circuit has failed. The content of the above description is described in Embodiment 2.

Furthermore, the control circuit may include a failure evaluating unit configured to evaluate whether or not the three-phase-short-circuit-forming circuit has failed, and the failure evaluating unit may determine that the three-phase-short-circuit-forming circuit has failed in at least one of a case where a difference in d-axis current in the permanent magnet motor between before and after the active check signal is output does not fall within a specified range and a case where a difference in q-axis current in the permanent magnet motor between before and after the active check signal is output does not fall within a specified range.

According to the configuration described above, the failure evaluating unit can readily evaluate in advance whether or not the three-phase-short-circuit-forming circuit has failed. Potential failure of the three-phase short circuit control can therefore be located in the inverter at an early stage to increase the reliability of the vehicle driving apparatus. The content of the above description is described in Embodiment 2.

Furthermore, the vehicle driving apparatus may include: two permanent magnet motors that are each the permanent magnet motor, one inverter that is the inverter and drives one of the two permanent magnet motors, and an other inverter that is the inverter and drives an other one of the two permanent magnet motors. In a case where the one permanent magnet motor is performing powering or regenerating operation, and the three-phase short circuit control is performed in the other permanent magnet motor, and when torque of the other permanent magnet motor is smaller than or equal to torque that does not affect a driven state of the vehicle driving apparatus, the control circuit in the other inverter may: 1) determine current expected to flow through the other permanent magnet motor when the three-phase short circuit control is performed; 2) control the three-phase bridge circuit via the drive circuit in such a way that the current flows through the other permanent magnet motor; and then 3) output the active check signal to the check terminal.

As described above, when the one permanent magnet motor is performing powering or regenerating operation, outputting the active check signal for making the active check in the other permanent magnet motor allows an increase in the number of opportunities of checking whether or not the three-phase short circuit control can be performed, as compared, for example, with the case where the active check signal is output only when the permanent magnet motor is performing no powering or regenerating operation. A reliable vehicle driving apparatus in which potential failure of the three-phase short circuit control is located in the inverter at an early stage can therefore be provided. The content of the above description is described in Embodiment 2.

Furthermore, the drive circuit may perform the three-phase short circuit control in a case where the drive circuit accepts the active check signal output from the control circuit via the check terminal.

As described above, when the drive circuit performs the three-phase short circuit control based on the active check signal output from the control circuit, the vehicle driving apparatus can check whether or not the three-phase-short-circuit-forming circuit can perform the three-phase short circuit control. Potential failure of the three-phase short circuit control in the inverter can therefore be located at an early stage to increase the reliability of the vehicle driving apparatus. The content of the above description is described in Embodiments 1 to 5.

Furthermore, the control circuit may include a failure evaluating unit configured to evaluate whether or not the three-phase-short-circuit-forming circuit has failed.

According to the configuration described above, whether or not the three-phase-short-circuit-forming circuit has failed can be located in advance, whereby potential failure of the three-phase short circuit control in the inverter can be located at an early stage to increase the reliability of the vehicle driving apparatus. The content of the above description is described in Embodiments 1 to 5.

Furthermore, the failure evaluating unit may acquire information on a change that occurs in at least one of the following, when the three-phase short circuit control is performed: current flowing through the three phases of the permanent magnet motor; a current phase; and DC voltage applied to the three-phase bridge circuit, and evaluate whether or not the three-phase-short-circuit-forming circuit has failed based on the information.

According to the configuration described above, whether or not the three-phase-short-circuit-forming circuit has failed can be appropriately determined. Potential failure of the three-phase short circuit control in the inverter can therefore be located at an early stage to increase the reliability of the vehicle driving apparatus. The content of the above description is described in Embodiments 1 to 5.

Furthermore, after the control circuit determines that the three-phase-short-circuit-forming circuit has failed, and in a case where abnormality occurs in the inverter, the control circuit may use a program stored in a memory in the control circuit to output a control signal for performing the three-phase short circuit control to the drive circuit.

According to the configuration described above, even if failure that requires the three-phase short circuit control occurs, for example, in the middle of operation of detecting that the three-phase-short-circuit-forming circuit has failed, notifying the abnormality to an upper-level control unit of the vehicle, and guiding the driver for safety assurance, the program can be used to perform the three-phase short circuit control. The configuration described above can improve the reliability of the vehicle driving apparatus that performs the three-phase short circuit control when the inverter experiences abnormality. The content of the above description is described in Embodiments 1 to 5.

Furthermore, the control circuit may stop outputting the active check signal in a case where the permanent magnet motor performs powering or regenerating operation during the output of the active check signal.

The configuration in which the active check signal is not output when the permanent magnet motor is performing powering or regenerating operation prevents the driven state of the vehicle driving apparatus from being affected, for example, prevents torque variation due to the three-phase short circuit control performed when the vehicle driving apparatus is driven. The content of the above description is described in Embodiments 1 to 5.

Hereinafter, Embodiments 1 to 5 will be described in detail with reference to the drawings.

Each of Embodiments 1 to 5 described below shows a generic or specific example of the present disclosure. The numerical values, shapes, materials, elements, the arrangement and connection of the elements, steps, the processing order of the steps, etc. shown in subsequent Embodiments 1 to 5 are mere examples, and thus are not intended to limit the present disclosure. Furthermore, among the elements described in the following embodiments, elements not recited in any of the independent claims that indicate the broadest concepts are described as optional structural components.

Moreover, the respective figures are schematic diagrams and are not necessarily precise illustrations. Furthermore, in each of the figures, the same reference signs are assigned to the same elements.

Furthermore, forms realized by arbitrarily combining two or more embodiments among Embodiments 1 to 5 are included in the present disclosure.

Embodiment 1

A vehicle driving apparatus according to Embodiment 1 will be described with reference to FIGS. 1 to 7.

[1-1. Configuration of Vehicle Driving Apparatus]

The configuration of vehicle driving apparatus 5A according to Embodiment 1 will first be described with reference to FIGS. 1 to 3.

FIG. 1 shows an example of electric vehicle 1 including vehicle driving apparatus 5A according to Embodiment 1. Electric vehicle 1 includes driving wheels 2, power transmission mechanism 3, permanent magnet motor M1, inverter 10, and battery P1. Out of the components described above, vehicle driving apparatus 5A includes permanent magnet motor M1, inverter 10, and battery P1. Permanent magnet motor M1 is hereinafter referred to as motor M1 in some cases.

Motor M1 is a three-phase AC motor that drives driving wheels 2 of electric vehicle 1 and uses, for example, a motor such as a magnet embedded synchronous motor, a surface mounted magnet synchronous motor, or the like.

Power transmission mechanism 3 is formed, for example, of a differential gear and a drive shaft and transmits power between motor M1 and driving wheels 2. The rotational force produced by motor M1 is transmitted to driving wheels 2 via power transmission mechanism 3. Similarly, the rotational force produced by driving wheels 2 is transmitted to motor M1 via power transmission mechanism 3. Electric vehicle 1 may not include power transmission mechanism 3 and may have a structure in which motor M1 is directly connected to driving wheels 2.

Battery P1 is, for example, a DC power source, such as a lithium ion battery. Battery P1 supplies electric power for driving motor M1 and accumulates the electric power.

Inverter 10 converts the DC electric power supplied from battery P1, for example, Into three-phase AC electric power and supplies motor M1 with the AC electric power. As described above, vehicle driving apparatus 5A is configured to drive three-phase AC motor M1 by using the electric power from battery P1.

Figure 2:
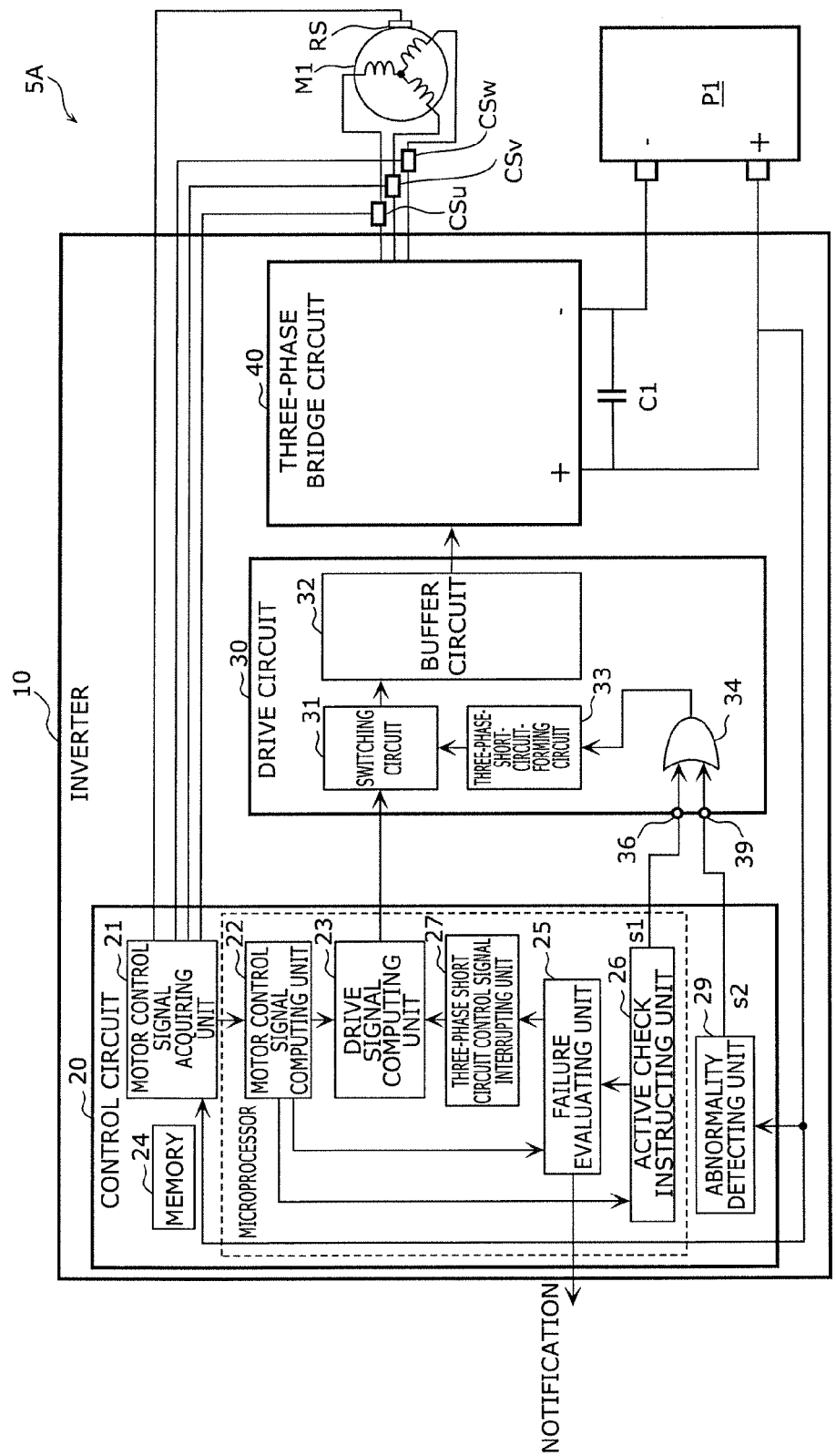
FIG. 2 is a circuit diagram showing an example of an inverter, a permanent magnet motor, and a battery of the vehicle driving apparatus according to Embodiment 1.

FIG. 2 is a circuit diagram showing an example of inverter 10, permanent magnet motor M1, and battery P1 of vehicle driving apparatus 5A.

Vehicle driving apparatus 5A includes motor M1, inverter 10, and battery P1, as shown in FIG. 2. Inverter 10 includes three-phase bridge circuit 40, drive circuit 30, and control circuit 20. FIG. 2 also shows smoothing capacitor C1, which smoothens voltage applied to three-phase bridge circuit 40.

Three-phase bridge circuit 40 is a circuit that performs a switching action to convert the DC electric power supplied from battery P1 into three-phase AC electric power and supplies motor M1 with the AC electric power to drive motor M1. Three-phase bridge circuit 40 has a switching action control input side connected to drive circuit 30, an electric power input side connected to battery P1, and an output side connected to motor M1. It is noted that when motor M1 performs regeneration, regenerative current is introduced from the output side of three-phase bridge circuit 40 and flows toward the electric power input side. In the description, however, the side to which battery P1 is connected is defined as the input side, and the side to which motor M1 is connected is defined as the output side.

Figure 3:
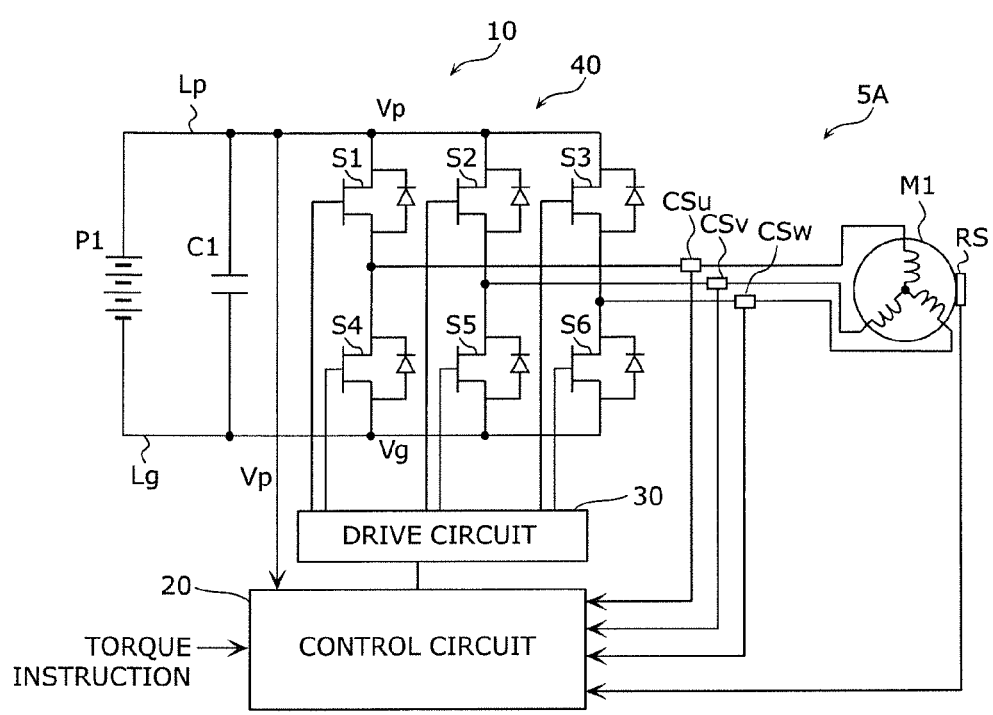
FIG. 3 is a circuit diagram showing an example of a three-phase bridge circuit provided in the inverter of the vehicle driving apparatus according to Embodiment 1.

FIG. 3 is a circuit diagram showing an example of three-phase bridge circuit 40 provided in inverter 10 of vehicle driving apparatus 5A. In FIG. 3, voltage Vp is power source voltage, and voltage Vg is ground voltage.

Three-phase bridge circuit 40 includes switch elements S1, S2, and S3, which are provided in an upper arm group located on the upper side of FIG. 3, and switch elements S4, S5, and S6, which are provided in a lower arm group located on the lower side of FIG. 3. For example, switch elements S1 to S6 are each formed, for example, of a field effect transistor (FET) or an insulated gate bipolar transistor (IGBT). Switch elements S1 to S6 may instead each be made of a wide bandgap semiconductor.

Switch elements S1, S2, and S3 are connected to three output wires drawn from three terminals of motor M1 and to power source wire Lp connected to the anode of battery P1 and are located between the three output wires and power source wire Lp. Switch elements S4, S5, and S6 are connected to the three output wires described above and to ground wire Lg connected to the cathode of battery P1 and located therebetween. A freewheel diode is connected to each of switch elements S1 to S6 in parallel thereto. The freewheel diodes may instead be parasitic diodes parasitic on switch elements S1 to S6.

Switch elements S1 to S6 are connected to drive circuit 30 and driven by signals output from drive circuit 30. Motor M1 is driven, for example, in the form of powering, regenerating, or coasting operation based on the driven states of switch elements S1 to S6.

Drive circuit 30 will next be described with reference to FIG. 2.

Drive circuit 30 is a circuit that drives switch elements S1 to S6 in three-phase bridge circuit 40 to perform the three-phase PWM control and the three-phase short circuit control. Drive circuit 30 has an input side connected to control circuit 20 and an output side connected to three-phase bridge circuit 40.

Drive circuit 30 includes switching circuit 31, buffer circuit 32, three-phase-short-circuit-forming circuit 33, and OR circuit 34. Drive circuit 30 further includes check terminal 36 and abnormality accepting terminal 39.

Abnormality accepting terminal 39 is a terminal that accepts abnormality accepting terminal s2, which notifies an abnormal state of inverter 10. Abnormality signal s2 is output from abnormality detecting unit 29, which will be described later, to drive circuit 30.

Check terminal 36 is a terminal that accepts active check signal s1, which causes three-phase-short-circuit-forming circuit 33 to perform the three-phase short circuit control. Active check signal s1 is output from control circuit 20 to drive circuit 30. In the following description, causing three-phase-short-circuit-forming circuit 33 to attempt the three-phase short circuit control and checking whether or not three-phase-short-circuit-forming circuit 33 can perform the three-phase short circuit control is called an active check. Making the active check allows diagnosis of whether or not three-phase-short-circuit-forming circuit 33 has failed.

The signals input to check terminal 36 and abnormality accepting terminal 39 are input to OR circuit 34. OR circuit 34 outputs a signal to three-phase-short-circuit-forming circuit 33 in a case where at least one of check terminal 36 and abnormality accepting terminal 39 has accepted the corresponding signal.

Three-phase-short-circuit-forming circuit 33 is driven based on the signal output from OR circuit 34. In other words, three-phase-short-circuit-forming circuit 33 is driven based on the abnormality detection input signal and the active check input signal.

Three-phase-short-circuit-forming circuit 33 is a circuit used to cause the three phases of motor M1 to form short circuits.

Specifically, three-phase-short-circuit-forming circuit 33 is a circuit that causes, out of switch elements S1 to S3 in the upper arm group and switch elements S4 to S6 in the lower arm group of three-phase bridge circuit 40, the switch elements in one of the arm groups to form short circuits and the switch elements in the other arm group to open based on the signal output from OR circuit 34. Causing the three phases of motor M1 to form short circuits as described above allows the induced voltage from the gap between the winding coils of motor M1 to be zero. As a result, for example, in a case where overvoltage is detected in three-phase bridge circuit 40, three-phase-short-circuit-forming circuit 33 can be caused to operate and perform the three-phase short circuit control to lower the overvoltage applied to three-phase bridge circuit 40.

Switching circuit 31 is a circuit that switches a state in which three-phase bridge circuit 40 is driven based on a drive signal output from drive signal computing unit 23, which will be described later, to a state in which three-phase bridge circuit 40 is driven by using a signal output from three-phase-short-circuit-forming circuit 33 and vice versa. The drive signal output from drive signal computing unit 23 contains a variety of signals, such as a signal that causes three-phase PWM control to be performed on three-phase bridge circuit 40. The switching performed by switching circuit 31 is achieved, for example, by a hardware logic circuit. Switching circuit 31 in the present embodiment switches switching control, etc., performed by motor M1 to the three-phase short circuit control performed by three-phase-short-circuit-forming circuit 33 when drive circuit 30 accepts active check signal s1 via check terminal 36.

Buffer circuit 32 is a circuit that amplifies an output signal to be output to three-phase bridge circuit 40 in such a way that three-phase bridge circuit 40 can drive switch elements S1 to S6. The output signal amplified by buffer circuit 32 can drive three-phase bridge circuit 40.

Control circuit 20 will next be described with reference to FIG. 2.

Control circuit 20 includes a microprocessor that performs, for example, a variety of type of computation and memory 24, which stores, for example, a program or information for operating the microprocessor.

Control circuit 20 includes motor control signal acquiring unit 21, motor control signal computing unit 22, drive signal computing unit 23, active check instructing unit 26, failure evaluating unit 25, and three-phase short circuit control signal interrupting unit 27, as shown in FIG. 2. Control circuit 20 further includes abnormality detecting unit 29.

Motor control signal acquiring unit 21 acquires information sensed by a variety of sensors, such as current sensors CSu, CSv, and CSw, which each sense current flowing through motor M1, and rotational position sensor RS, which detects the magnetic pole positions of motor M1 to sense the rotational position. Current sensors CSu, CSv, and CSw are sensors that sense the current values in the phases u, v, and w of motor M1. Motor control signal acquiring unit 21 further acquires information on voltage Vp across power source wire Lp. Motor control signal acquiring unit 21 still further acquires control instruction information, such as a torque instruction output from a component external to control circuit 20, for example, an electronic control unit (ECU) of electric vehicle 1.

Motor control signal computing unit 22 converts the value of the torque instruction into current through computation based on the information acquired by motor control signal acquiring unit 21 and outputs a control signal for performing current control on motor M1.

For example, motor control signal computing unit 22 outputs the control signal for performing current control on motor M1 in such a way that the torque produced by motor M1 when vehicle driving apparatus 5A is driven is equal to target torque indicated by the torque instruction information (for example, torque according to the amount of operated accelerator pedal or brake pedal of electric vehicle 1).

Further, motor control signal computing unit 22 converts the information acquired by motor control signal acquiring unit 21 through computation and outputs a control signal for making the active check and failure evaluation. For example, motor control signal computing unit 22 converts the control instruction information, such as the torque instruction, into the control signal described above and outputs the control signal to drive signal computing unit 23 and active check instructing unit 26. Moreover, motor control signal computing unit 22 converts information, such as current flowing through motor M1, the rotational positions of the magnetic poles of motor M1, and voltage Vp across power source wire Lp, into control signals and outputs the control signal to drive signal computing unit 23 and failure evaluating unit 25.

Active check instructing unit 26 is a circuit that outputs active check signal s1 to check terminal 36. The active check refers to causing three-phase-short-circuit-forming circuit 33 to attempt the three-phase short circuit control and checking whether or not three-phase-short-circuit-forming circuit 33 can perform the three-phase short circuit control, as described above. Active check instructing unit 26 evaluates based on the control signals output from motor control signal computing unit 22 whether or not the active check made at the current timing affects the driven state of vehicle driving apparatus 5A.

For example, active check instructing unit 26 determines that the active check is made when motor M1 is performing no powering or regenerating operation and determines that the active check is not made when motor M1 is performing powering or regenerating operation. The state in which motor M1 is performing no powering or regenerating operation corresponds, for example, to the state in which the degree of acceleration or deceleration of electric vehicle 1 is small and motor M1 is performing coasting operation. Evaluation of whether or not the active check can be made is performed at regular time intervals. Active check instructing unit 26 further outputs a busy signal representing that the active check is being made simultaneously with outputting active check signal s1 to failure evaluating unit 25.

Failure evaluating unit 25 is a circuit that evaluates whether or not three-phase-short-circuit-forming circuit 33 has failed. Failure evaluating unit 25 acquires information on a change that occurs when the three-phase short circuit control is performed in at least one of current flowing through the three phases of motor M1, the current phase, and DC voltage applied to three-phase bridge circuit 40. A change in the current can be determined based on a current value detected with each of current sensors CSu, CSv, and CSw. A change in the current phase can be determined based, for example, on d-axis current and q-axis current of motor M1. The d-axis current and q-axis current can be determined based on a current value detected with each of current sensors CSu, CSv, and CSw and the rotational positions of the magnetic poles detected with rotational position sensor RS. A change in the DC voltage can be determined by detecting voltage Vp across power source wire Lp.

Failure evaluating unit 25 evaluates whether or not the three-phase-short-circuit-forming circuit has failed based on the acquired information described above. For example, failure evaluating unit 25 determines that three-phase-short-circuit-forming circuit 33 has failed in at least one of a case where the current does not fall within a specified range, a case where the current phase does not fall within a specified range, and a case where the DC voltage does not fall within a specified range. Having determined that three-phase-short-circuit-forming circuit 33 has failed, failure evaluating unit 25 outputs a notification signal that notifies an external component of information on the failure.

Abnormality detecting unit 29 is a circuit that detects abnormality that occurs in inverter 10, such as overvoltage. The following description will be made on the assumption that abnormality detecting unit 29 is a circuit that detects overvoltage that occurs due, for example, to a defect, such as disconnection of power source wire Lp, or failure of switch elements S1 to S6, current sensors CSu, CSv, and CSw, rotational position sensor RS, and other components. Abnormality detecting unit 29 is connected to power source wire Lp of three-phase bridge circuit 40 on the positive side of battery P1. When abnormality detecting unit 29 detects abnormality (overvoltage in the description), abnormality signal s2 is output to abnormality accepting terminal 39. Since abnormality signal s2 causes three-phase-short-circuit-forming circuit 33 to perform the three-phase short circuit control, the overvoltage applied to three-phase bridge circuit 40 can be suppressed. The overvoltage presented in the description, which is abnormality detected by abnormality detecting unit 29, can occur, for example, when the positive-side wiring of battery P1 comes off or is disconnected or a main relay that is not shown but is provided in battery P1 is opened. Since abnormality detecting unit 29 and drive circuit 30 (including three-phase-short-circuit-forming circuit 33) are each formed of hardware, emergency actions from detection of abnormality by abnormality detecting unit 29 to the three-phase short circuit control by three-phase-short-circuit-forming circuit 33 are automatically and quickly performed. Abnormality detecting unit 29 need not necessarily be provided inside control circuit 20 and may be so provided externally of control circuit 20. Abnormality detecting unit 29 does not necessarily have the overvoltage detecting configuration and may have a configuration that directly detects output abnormality (such as output voltage that does not fall within predetermined range) of any of current sensors CSu, CSv, and CSw, rotational position sensor RS, and other sensors.

Drive signal computing unit 23 computes a drive signal required to drive motor M1 based on the control signals output from motor control signal computing unit 22 and outputs the drive signal to drive circuit 30. Drive signal computing unit 23 outputs a drive signal for performing the three-phase PWM control when vehicle driving apparatus 5A is normally driven.

When abnormality of inverter 10 is detected and when failure evaluating unit 25, which will be described later, determines that three-phase-short-circuit-forming circuit 33 has failed, drive signal computing unit 23 outputs a drive signal for performing the three-phase short circuit control based on the program stored in memory 24.

The three-phase short circuit control performed based on the program is performed by three-phase short circuit control signal interrupting unit 27. Specifically, once failure information is received from failure evaluating unit 25 indicating that three-phase-short-circuit-forming circuit 33 has failed, three-phase short circuit control signal interrupting unit 27 outputs an interrupt signal for performing the three-phase short circuit control to drive signal computing unit 23 when abnormality of inverter 10 is detected. Upon reception of the interrupt signal, drive signal computing unit 23 changes a three-phase PWM control drive signal to a three-phase short circuit control drive signal and outputs the drive signal to drive circuit 30.

As described above, control circuit 20 outputs drive signals for performing the three-phase PWM control and the three-phase short circuit control to drive circuit 30. Drive circuit 30 selects one of the drive signal output from control circuit 20 and the signal output from three-phase-short-circuit-forming circuit 33 and outputs the selected signal to three-phase bridge circuit 40. Three-phase bridge circuit 40 drives motor M1 based on a signal output from drive circuit 30.

Vehicle driving apparatus 5A according to Embodiment 1 includes inverter 10, which drives permanent magnet motor M1. Inverter 10 includes three-phase bridge circuit 40 including the plurality of switch elements S1 to S6, drive circuit 30 connected to three-phase bridge circuit 40, and control circuit 20 connected to drive circuit 30. Drive circuit 30 includes three-phase-short-circuit-forming circuit 33, which causes the three phases of permanent magnet motor M1 to form short circuits, abnormality accepting terminal 39, which accepts abnormality signal s2 output from abnormality detecting unit 29, and check terminal 36, which accepts active check signal s1 for performing the three-phase short circuit control performed by three-phase-short-circuit-forming circuit 33.

According to the configuration described above, drive circuit 30 can accept active check signal s1 as appropriate via check terminal 36. Active check signal s1 allows vehicle driving apparatus 5A to check as appropriate whether or not three-phase-short-circuit-forming circuit 33 can perform the three-phase short circuit control. Reliable vehicle driving apparatus 5A in which potential failure of the three-phase short circuit control is located in inverter 10 at an early stage can therefore be provided.

[1-2. Action of Vehicle Driving Apparatus]

The action of vehicle driving apparatus 5A will next be described with reference to FIGS. 4 and 5.

Figure 4:
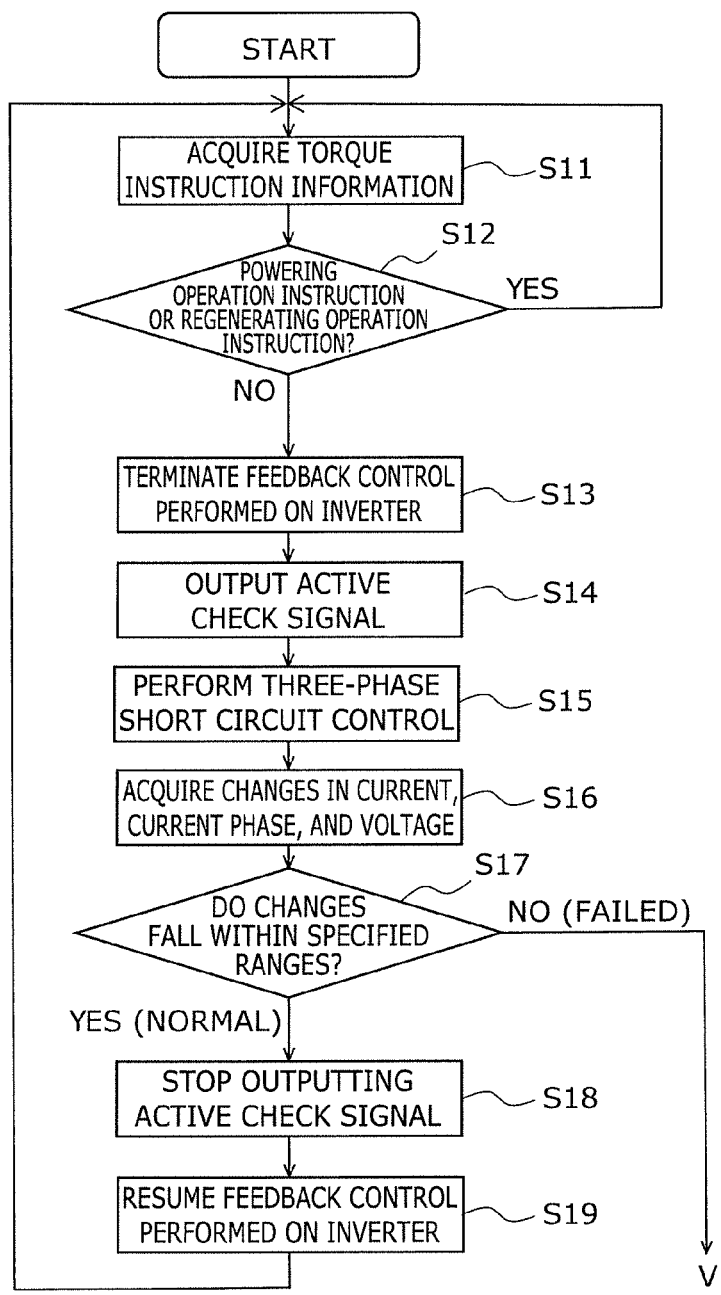
FIG. 4 is a flowchart showing an example of the action of the vehicle driving apparatus according to Embodiment 1.

FIG. 4 is a flowchart showing an example of the action of vehicle driving apparatus 5A. FIG. 5 is a flowchart showing the example of the action of vehicle driving apparatus 5A following the flowchart of FIG. 4.

Vehicle driving apparatus 5A is first activated and is in operation.

In this state, control circuit 20 acquires the torque instruction information from an external component (step S11). Specifically, motor control signal acquiring unit 21 acquires the torque instruction information output from the ECU of electric vehicle 1. The torque instruction information is converted by motor control signal computing unit 22 and output as a control signal to active check instructing unit 26 and drive signal computing unit 23.

Control circuit 20 then evaluates whether or not vehicle driving apparatus 5A has received a powering operation instruction or a regenerating operation instruction (step S12). Specifically, control circuit 20 evaluates whether or not vehicle driving apparatus 5A has received a powering operation instruction or a regenerating operation instruction based on whether or not variation per unit period in torque of motor M1 based on the torque instruction information falls within a predetermined range.

For example, when the torque variation does not fall within the predetermined range, control circuit 20 determines that motor M1 has received the powering or regenerating operation instruction (Yes in S12). In this case, control circuit 20 determines that diagnosis of failure of three-phase-short-circuit-forming circuit 33 is not performed at the current timing and returns to step S11. On the other hand, when the torque variation falls within the predetermined range, control circuit 20 determines that motor M1 has not received the powering or regenerating operation instruction (No in S12). In this case, control circuit 20 determines that diagnosis of failure of three-phase-short-circuit-forming circuit 33 is performed at the current timing and proceeds to the following step.

Control circuit 20 then terminates feedback control performed on inverter 10 (step S13). Specifically, drive signal computing unit 23 stops outputting the drive signal for performing the three-phase PWM control.

Control circuit 20 outputs active check signal s1 (step S14). Specifically, active check instructing unit 26 outputs active check signal s1 to check terminal 36 of drive circuit 30. Active check signal s1 is continuously output until it is stopped in step S18 or S21, which will be described later.

Inverter 10 then performs the three-phase short circuit control using three-phase-short-circuit-forming circuit 33 (step S15). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5A (step S16). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S17). Specifically, failure evaluating unit 25 evaluates whether or not the current does not fall within the specified range thereof, the current phase does not fall within the specified range thereof, and the DC voltage does not fall within the specified range thereof.

In a case where failure evaluating unit 25 determines that the changes in the current, the current phase, and the voltage all fall within the specified ranges (Yes in S17), failure evaluating unit 25 determines that three-phase-short-circuit-forming circuit 33 has not failed and is normally operating. Control circuit 20 then stops outputting active check signal s1 output from active check instructing unit 26 (step S18) and resumes the feedback control performed on inverter 10 (step S19). Control circuit 20 then returns to step S11 and repeats the active check. The active check is repeatedly performed at predetermined time intervals.

On the other hand, when at least one of the changes in the current, the current phase, and the voltage does not fall within the corresponding specified range (No in step S17), control circuit 20 determines that three-phase-short-circuit-forming circuit 33 has failed. Control circuit 20 then performs actions to be performed when three-phase-short-circuit-forming circuit 33 has failed, as shown in FIG. 5.

Figure 5:
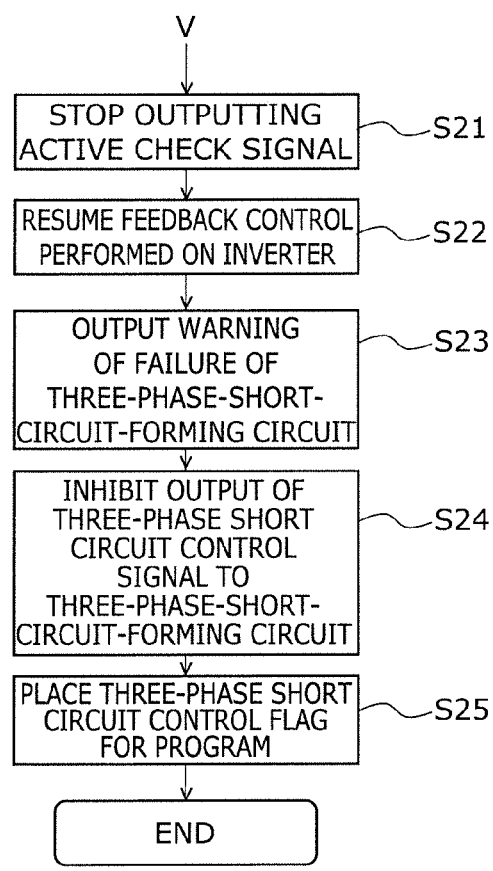
FIG. 5 is a flowchart showing the example of the action of the vehicle driving apparatus following the flowchart of FIG. 4.

Control circuit 20 stops outputting active check signal s1 output from active check instructing unit 26 (step S21) and resumes the feedback control performed on inverter 10 (step S22), as shown in FIG. 5.

Control circuit 20 then outputs a failure warning representing that three-phase-short-circuit-forming circuit 33 has failed to an external component, for example, the ECU (upper-level control unit) of electric vehicle 1 (step S23). Failure evaluating unit 25 may notify a user of the failure information by displaying the failure information on a monitor or outputting a sound that informs the failure information via a loudspeaker.

Further, control circuit 20 inhibits output of a three-phase short circuit control signal to three-phase-short-circuit-forming circuit 33 (step S24). Specifically, control circuit 20 inhibits active check instructing unit 26 from outputting active check signal s1. Control circuit 20 places a flag representing the three-phase short circuit control (step S25). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5A.

Further, in the case where it is determined that three-phase-short-circuit-forming circuit 33 has failed and in the middle of operation of outputting active check signal s1, control circuit 20 may use the program stored in memory 24 in control circuit 20 to output a control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1 performs powering or regenerating operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[1-3. Variation of Embodiment 1]

Vehicle driving apparatus 5A according to a variation of Embodiment 1 will next be described with reference to FIGS. 6 and 7. In the variation, the description will be made of the active check made in a case where the number of revolutions of motor M1 falls within a predetermined threshold range.

Figure 6:
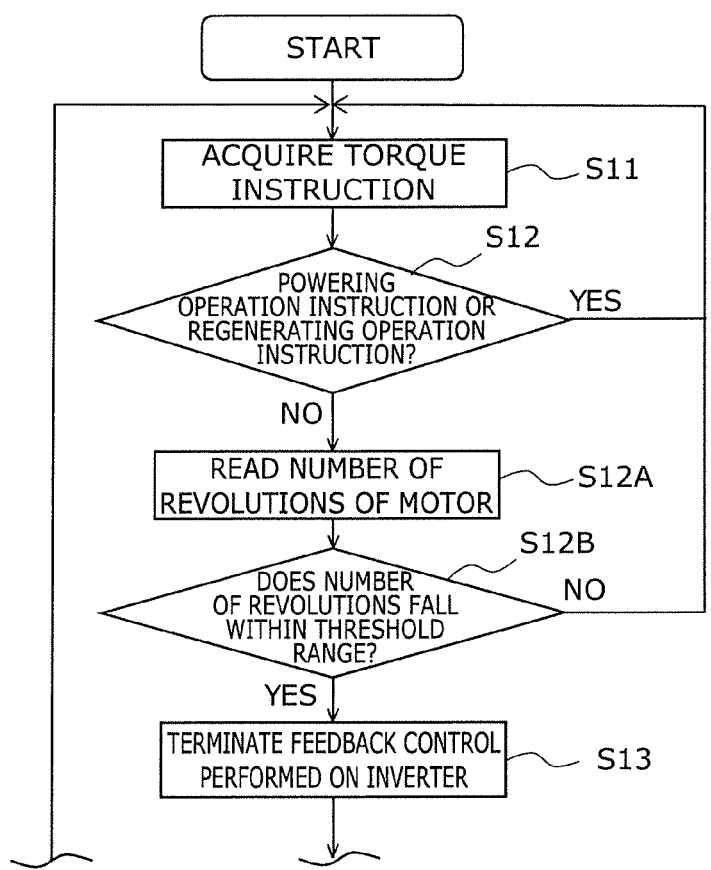
FIG. 6 is a flowchart showing an example of the action of the vehicle driving apparatus according to a variation of Embodiment 1.
Figure 7:
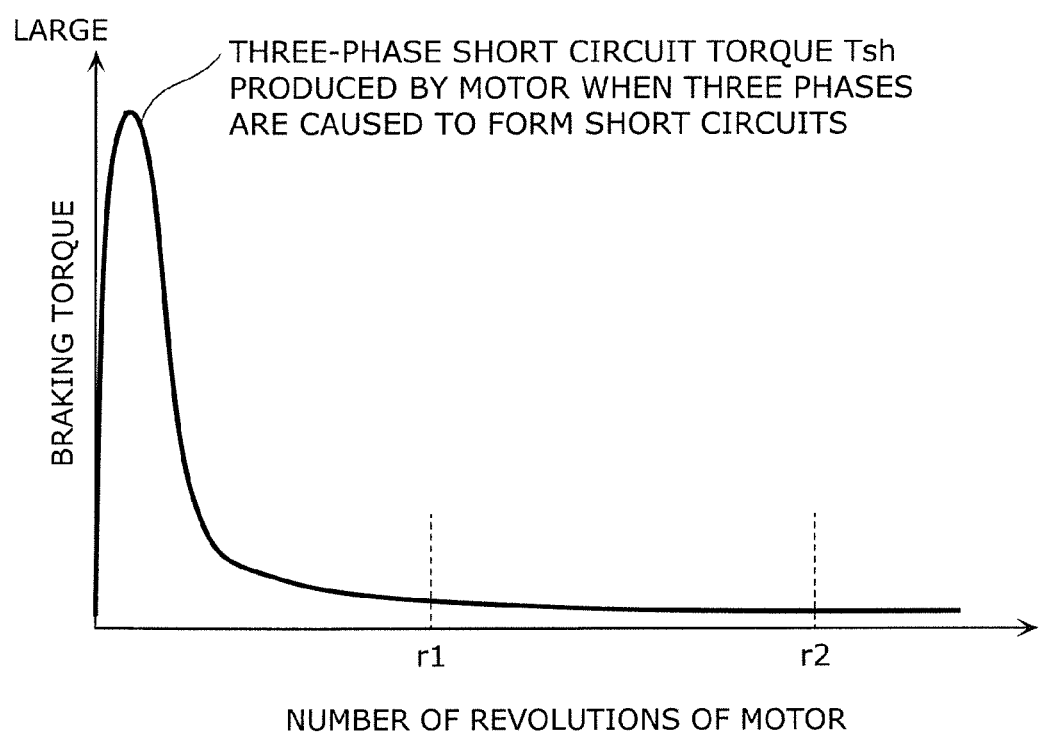
FIG. 7 is a graph showing the torque produced when the three phases of the permanent magnet motor in the vehicle driving apparatus according to a variation of Embodiment 1 are caused to form short circuits.

FIG. 6 is a flowchart showing an example of the action of vehicle driving apparatus 5A according to the variation of Embodiment 1. FIG. 7 shows the torque produced when the three phases of permanent magnet motor M1 in vehicle driving apparatus 5A according to the variation are caused to form short circuits. FIG. 7 shows that braking torque increases in the direction toward the positive side (upper side) of the vertical axis of FIG. 7.

A method for operating vehicle driving apparatus 5A according to the variation of Embodiment 1 includes the step of evaluating the number of revolutions of motor M1 to determine whether or not the active check is made. The step is located between step S12 of evaluating whether or not motor M1 has received the powering operation instruction or the regenerating operation instruction and step S13 of terminating the feedback control performed on inverter 10.

Specifically, after the result of the evaluation in step S12 shows Yes, the number of revolutions of motor M1 is read (step S12A), as shown in FIG. 6. The number of revolutions of motor M1 can be determined based on the result of the sensing performed by rotational position sensor RS.

It is then evaluated whether or not the number of revolutions of motor M1 falls within the predetermined threshold range (step S12B). Specifically, first threshold r1, which is a threshold of the number of revolutions of motor M1, and second threshold r2, which is greater than first threshold r1, are set, and it is evaluated whether or not the number of revolutions of motor M1 is greater than or equal to first threshold r1 but smaller than or equal to second threshold r2. In a case where the number of revolutions is greater than or equal to first threshold r1 but smaller than or equal to second threshold r2 (Yes in S12B), control circuit 20 proceeds to the steps where the active check is made. On the other hand, in a case where the number of revolutions is not greater than or equal to first threshold r1 but smaller than or equal to second threshold r2 (No in S12B), control circuit 20 returns to step S11.

The reason why whether or not the active check can be made is determined based on the number of revolutions of motor M1 is as follows: When the active check is made when the number of revolutions of motor M1 is smaller than first threshold r1, large braking torque is abruptly produced in some cases, as shown in FIG. 7. To avoid the situation described above, the active check is made in the present variation in the case where the number of revolutions of motor M1 is greater than or equal to first threshold r1.

Further, when the active check is made when the number of revolutions of motor M1 is greater than second threshold r2, that is, when it is estimated that relatively wild driving is being performed, an abrupt change in torque instruction issued to motor M1 cannot be handled in some cases. In view of the fact described above, the active check is made in the present variation when the number of revolutions of motor M1 is smaller than or equal to second threshold r2.

As described above, in vehicle driving apparatus 5A according to the variation of Embodiment 1, whether or not the active check can be made is determined in accordance with the number of revolutions of motor M1. Abrupt torque variation that may occur when vehicle driving apparatus 5A is driven can thus be suppressed.

Embodiment 1 described above is an essentially preferable example and is not intended to limit the scope of the present disclosure, an object to which the present disclosure is applied, or the application of the present disclosure.

For example, the control circuit described above may include an active check instructing unit that outputs the active check signal.

According to the configuration described above, the control circuit can actively output the active check signal by using the active check instructing unit. The check terminal can accept the active check signal as appropriate, and the vehicle driving apparatus can check as appropriate whether or not the three-phase-short-circuit-forming circuit can perform the three-phase short circuit control. Potential failure of the three-phase short circuit control can therefore be located in the inverter at an early stage to increase the reliability of the vehicle driving apparatus.

In at least one of the case where the current described above does not fall within the specified range thereof, the case the current phase described above does not fall within the specified range thereof, and the case where the DC voltage described above does not fall within the specified range thereof, the failure evaluating unit may determine that the three-phase-short-circuit-forming circuit described above has failed.

The failure evaluating unit can thus readily evaluate whether or not the three-phase-short-circuit-forming circuit has failed. Potential failure of the three-phase short circuit control can therefore be located in the inverter at an early stage to increase the reliability of the vehicle driving apparatus.

Having evaluated whether or not the three-phase-short-circuit-forming circuit has failed, the control circuit described above may stop outputting the active check signal described above.

The control circuit can thus promptly terminate the three-phase short circuit control for checking whether or not the three-phase-short-circuit-forming circuit has failed and cause the drive circuit to perform usual control different from the three-phase short circuit control. The control circuit can therefore promptly perform the following powering operation instruction or regenerating operation instruction.

Having determined that the three-phase-short-circuit-forming circuit has failed, the control circuit described above may not newly output the active check signal.

The control circuit can thus prevent the active check signal from being output more than necessary. A situation in which the three-phase-short-circuit-forming circuit having failed is used to control the inverter can thus be avoided.

Having determined that the three-phase-short-circuit-forming circuit has failed, the control circuit described above may control the three-phase bridge circuit in such a way that the number of revolutions of the permanent magnet motor is restricted.

Restricting the number of revolutions of the permanent magnet motor as described above can prevent abnormality, such as overvoltage, from occurring in the three-phase bridge circuit in advance.

Having determined that the three-phase-short-circuit-forming circuit has failed and in the middle of operation of outputting active check signal described above, the control circuit described above may use the program stored in the memory in the control circuit to output the control signal for performing the three-phase short circuit control to the drive circuit described above.

The configuration described above can suppress overvoltage applied to the three-phase bridge circuit that occurs when the three-phase-short-circuit-forming circuit having failed drives the three-phase bridge circuit in the middle of operation of outputting active check signal.

In the case where the number of revolutions of the permanent magnet motor described above is greater than or equal to the first threshold, the control circuit described above may output the active check signal described above.

The active check signal is thus not output, for example, in a case the number of revolutions of the permanent magnet motor is smaller than the first threshold, whereby abrupt occurrence of large braking torque can be avoided. Abrupt torque variation that may occur when the vehicle driving apparatus is driven can thus be suppressed.

In a case where the number of revolutions of the permanent magnet motor described above is smaller than or equal to the second threshold, which is greater than the first threshold described above, the control circuit described above may output the active check signal described above.

The active check signal is therefore not output, for example, in the case where the number of revolutions of the permanent magnet motor is greater than the second threshold, that is, in the case where it is estimated that relatively wild driving operation is being performed, whereby the situation in which abrupt variation in the motor torque instruction cannot be handled can be avoided. Abrupt torque variation that may occur when the vehicle driving apparatus is driven can thus be suppressed.

In the case where the output of the active check signal described above is terminated, the control circuit described above may nullify the result of the evaluation of whether or not the three-phase-short-circuit-forming circuit has failed.

A situation in which the evaluation of whether or not the three-phase-short-circuit-forming circuit has failed is not fully performed and wrong failure determination is made can thus be avoided. Potential failure of the three-phase short circuit control can therefore be located in the inverter at an early stage to increase the reliability of the vehicle driving apparatus.

Embodiment 2

A vehicle driving apparatus according to Embodiment 2 will be described with reference to FIGS. 8 to 20.

The state of the permanent magnet motor in the vehicle driving apparatus during traveling is broadly classified into a powering state, a regenerating state, and a no powering or regenerating state (a state in which the vehicle is coasting, and in a case where the vehicle includes another drive source, such as an engine and an another permanent magnet motor, a state in which the vehicle travels based only on the other drive source). In Embodiment 2 below, the description will be made of a case where whether or not the three-phase-short-circuit-forming circuit has failed is checked in the following two states: a state in which the permanent magnet motor is performing no powering or regenerating operation; and a state in which the permanent magnet motor is performing regenerating operation at torque smaller than or equal to predetermined torque.

[2-1. Configuration of Vehicle Driving Apparatus]

The configuration of vehicle driving apparatus 5B according to Embodiment 2 will first be described with reference to FIGS. 8 to 10.

Figure 8:
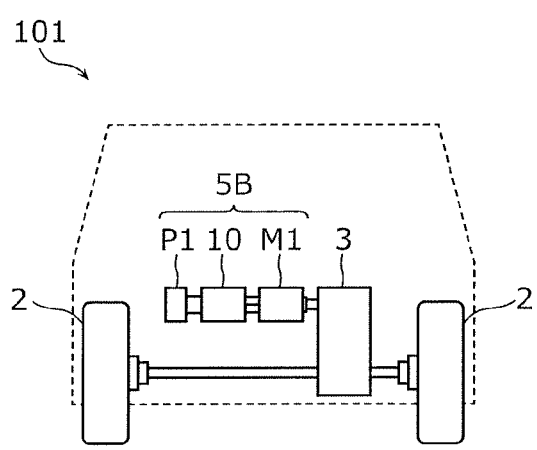
FIG. 8 is an outline diagram showing an example of an electric vehicle including a vehicle driving apparatus according to Embodiment 2.

FIG. 8 shows an example of electric vehicle 101 including vehicle driving apparatus 5B according to Embodiment 2. Electric vehicle 101 includes driving wheels 2, power transmission mechanism 3, permanent magnet motor M1, inverter 10, and battery P1. Out of the components described above, vehicle driving apparatus 5B includes permanent magnet motor M1, inverter 10, and battery P1. Permanent magnet motor M1 is hereinafter referred to as motor M1 in some cases.

Motor M1 is a three-phase AC motor that drives driving wheels 2 of electric vehicle 101 and uses, for example, a motor such as a magnet embedded synchronous motor, a surface mounted magnet synchronous motor, or the like.

Power transmission mechanism 3 is formed, for example, of a differential gear and a drive shaft and transmits power between motor M1 and driving wheels 2. The rotational force produced by motor M1 is transmitted to driving wheels 2 via power transmission mechanism 3. Similarly, the rotational force produced by driving wheels 2 is transmitted to motor M1 via power transmission mechanism 3. Electric vehicle 101 may not include power transmission mechanism 3 and may have a structure in which motor M1 is directly connected to driving wheels 2.

Battery P1 is, for example, a DC power source, such as a lithium ion battery. Battery P1 supplies electric power for driving motor M1 and accumulates the electric power.

Inverter 10 converts the DC electric power supplied from battery P1, for example, into three-phase AC electric power and supplies motor M1 with the AC electric power. As described above, vehicle driving apparatus 5B is configured to drive three-phase AC motor M1 by using the electric power from battery P1.

Figure 9:
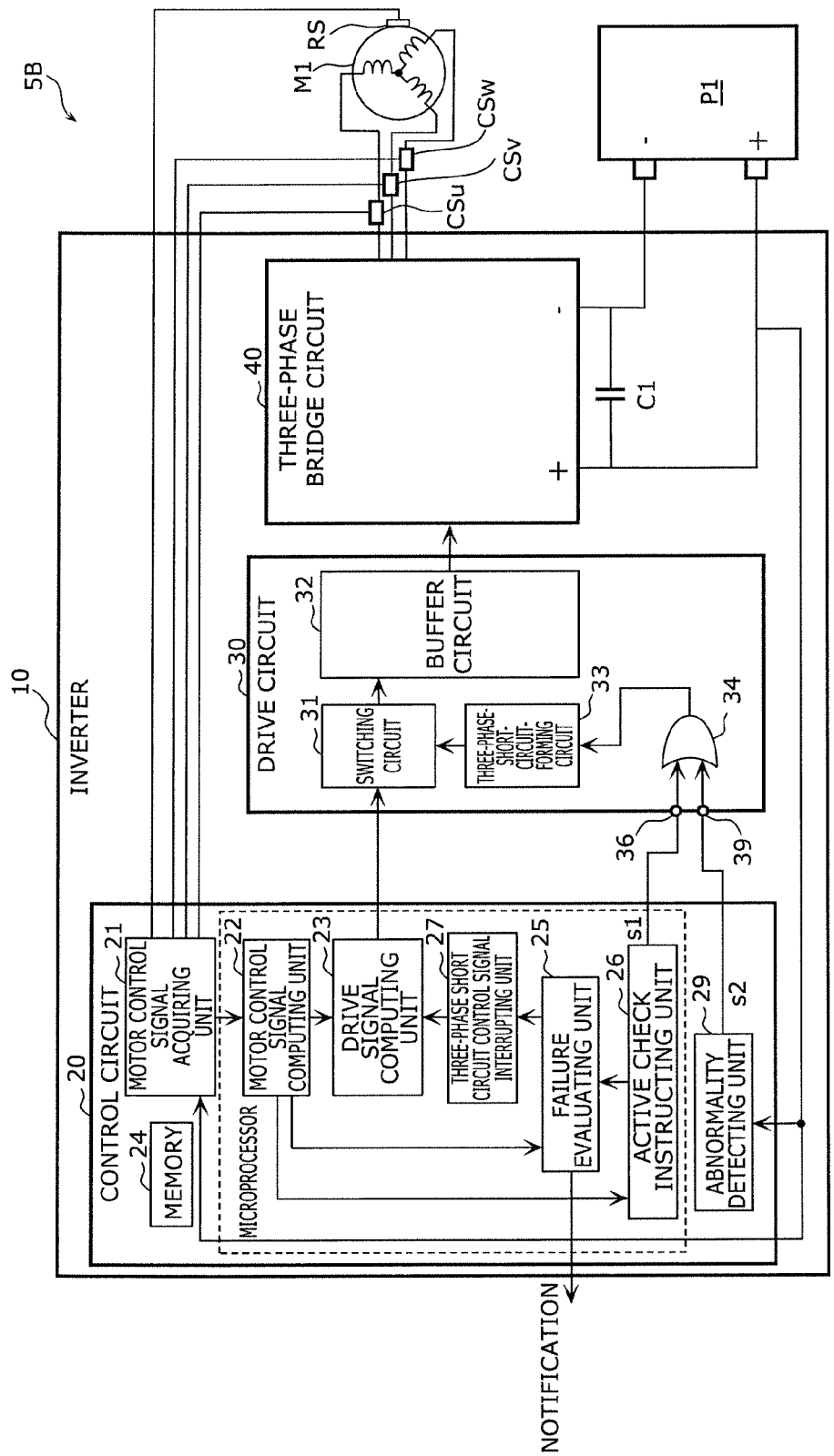
FIG. 9 is a circuit diagram showing an example of an inverter, a permanent magnet motor, and a battery of the vehicle driving apparatus according to Embodiment 2.

FIG. 9 is a circuit diagram showing an example of inverter 10, permanent magnet motor M1, and battery P1 of vehicle driving apparatus 5B.

Vehicle driving apparatus 5B includes motor M1, inverter 10, and battery P1, as shown in FIG. 9. Inverter 10 includes three-phase bridge circuit 40, drive circuit 30, and control circuit 20. FIG. 9 also shows smoothing capacitor C1, which smoothens voltage applied to three-phase bridge circuit 40.

Three-phase bridge circuit 40 is a circuit that performs a switching action to convert the DC electric power supplied from battery P1 into three-phase AC electric power and supplies motor M1 with the AC electric power to drive motor M1. Three-phase bridge circuit 40 has a switching action control input side connected to drive circuit 30, an electric power input side connected to battery P1, and an output side connected to motor M1. It is noted that when motor M1 performs regeneration, regenerative current is introduced from the output side of three-phase bridge circuit 40 and flows toward the electric power input side. In the description, however, the side to which battery P1 is connected is defined as the input side, and the side to which motor M1 is connected is defined as the output side.

Figure 10:
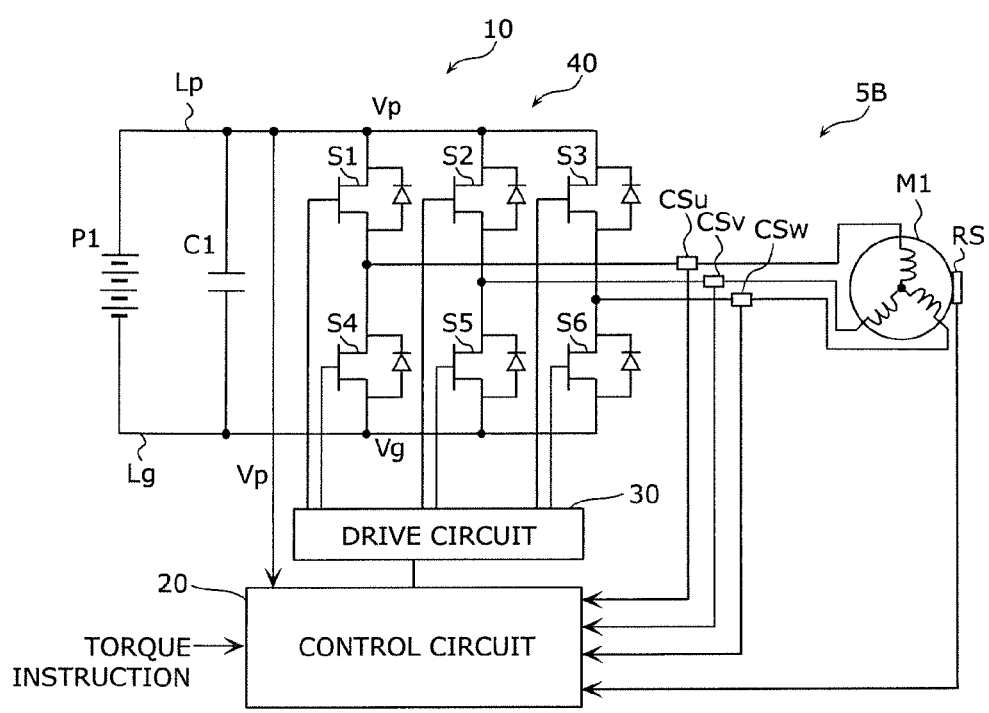
FIG. 10 is a circuit diagram showing an example of a three-phase bridge circuit provided in the inverter of the vehicle driving apparatus according to Embodiment 2.

FIG. 10 is a circuit diagram showing an example of three-phase bridge circuit 40 provided in inverter 10 of vehicle driving apparatus 5B. In FIG. 10, voltage Vp is power source voltage, and voltage Vg is ground voltage.

Three-phase bridge circuit 40 includes switch elements S1, S2, and S3, which are provided in an upper arm group located on the upper side of FIG. 10, and switch elements S4, S5, and S6, which are provided in a lower arm group located on the lower side of FIG. 10. For example, switch elements S1 to S6 are each formed, for example, of a field effect transistor (FET) or an insulated gate bipolar transistor (IGBT). Switch elements S1 to S6 may instead each be made of a wide bandgap semiconductor.

Switch elements S1, S2, and S3 are connected to three output wires drawn from three terminals of motor M1 and to power source wire Lp connected to the anode of battery P1 and are located between the three output wires and power source wire Lp. Switch elements S4, S5, and S6 are connected to the three output wires described above and to ground wire Lg connected to the cathode of battery P1 and located therebetween. A freewheel diode is connected to each of switch elements S1 to S6 in parallel thereto. The freewheel diodes may instead be parasitic diodes parasitic on switch elements S1 to S6.

Switch elements S1 to S6 are connected to drive circuit 30 and driven by signals output from drive circuit 30. Motor M1 is driven, for example, in the form of powering, regenerating, or coasting operation based on the driven states of switch elements S1 to S6.

Drive circuit 30 will next be described with reference to FIG. 9.

Drive circuit 30 is a circuit that drives switch elements S1 to S6 in three-phase bridge circuit 40 to perform the three-phase PWM control and the three-phase short circuit control. Drive circuit 30 has an input side connected to control circuit 20 and an output side connected to three-phase bridge circuit 40.

Drive circuit 30 includes switching circuit 31, buffer circuit 32, three-phase-short-circuit-forming circuit 33, and OR circuit 34. Drive circuit 30 further includes check terminal 36 and abnormality accepting terminal 39.

Abnormality accepting terminal 39 is a terminal that accepts abnormality accepting terminal s2, which notifies an abnormal state of inverter 10. Abnormality signal s2 is output from abnormality detecting unit 29, which will be described later, to drive circuit 30.

Check terminal 36 is a terminal that accepts active check signal s1, which causes three-phase-short-circuit-forming circuit 33 to perform the three-phase short circuit control. Active check signal s1 is output from control circuit 20 to drive circuit 30. In the following description, causing three-phase-short-circuit-forming circuit 33 to attempt the three-phase short circuit control and checking whether or not three-phase-short-circuit-forming circuit 33 can perform the three-phase short circuit control is called an active check. Making the active check allows diagnosis of whether or not three-phase-short-circuit-forming circuit 33 has failed.

The signals input to check terminal 36 and abnormality accepting terminal 39 are input to OR circuit 34. OR circuit 34 outputs a signal to three-phase-short-circuit-forming circuit 33 in a case where at least one of check terminal 36 and abnormality accepting terminal 39 has accepted the corresponding signal. Three-phase-short-circuit-forming circuit 33 is driven based on the signal output from OR circuit 34. In other words, three-phase-short-circuit-forming circuit 33 is driven based on the abnormality detection input signal and the active check input signal.

Three-phase-short-circuit-forming circuit 33 is a circuit used to cause the three phases of motor M1 to form short circuits. Specifically, three-phase-short-circuit-forming circuit 33 is a circuit that causes, out of switch elements S1 to S3 in the upper arm group and switch elements S4 to S6 in the lower arm group of three-phase bridge circuit 40, the switch elements in one of the arm groups to form short circuits and the switch elements in the other arm group to open based on the signal output from OR circuit 34. Causing the three phases of motor M1 to form short circuits as described above allows the induced voltage from the gap between the winding coils of motor M1 to be zero. As a result, for example, in a case where overvoltage is detected in three-phase bridge circuit 40, three-phase-short-circuit-forming circuit 33 can be caused to operate and perform the three-phase short circuit control to lower the overvoltage applied to three-phase bridge circuit 40.

Switching circuit 31 is a circuit that switches a state in which three-phase bridge circuit 40 is driven based on a drive signal output from drive signal computing unit 23, which will be described later, to a state in which three-phase bridge circuit 40 is driven by using a signal output from three-phase-short-circuit-forming circuit 33 and vice versa. The drive signal output from drive signal computing unit 23 contains a variety of signals, such as a signal that causes three-phase PWM control to be performed on three-phase bridge circuit 40. The switching performed by switching circuit 31 is achieved, for example, by a hardware logic circuit. Switching circuit 31 in the present embodiment switches switching control, etc., performed by motor M1 to the three-phase short circuit control performed by three-phase-short-circuit-forming circuit 33 when drive circuit 30 accepts active check signal s1 via check terminal 36.

Buffer circuit 32 is a circuit that amplifies an output signal to be output to three-phase bridge circuit 40 in such a way that three-phase bridge circuit 40 can drive switch elements S1 to S6. The output signal amplified by buffer circuit 32 can drive three-phase bridge circuit 40.

Control circuit 20 will next be described with reference to FIG. 9.

Control circuit 20 includes a microprocessor that performs, for example, a variety of type of computation and memory 24, which stores, for example, a program or information for operating the microprocessor.

Control circuit 20 includes motor control signal acquiring unit 21, motor control signal computing unit 22, drive signal computing unit 23, active check instructing unit 26, failure evaluating unit 25, and three-phase short circuit control signal interrupting unit 27, as shown in FIG. 9. Control circuit 20 further includes abnormality detecting unit 29.

Motor control signal acquiring unit 21 acquires information sensed by a variety of sensors, such as current sensors CSu, CSv, and CSw, which each sense current flowing through motor M1, and rotational position sensor RS, which detects the magnetic pole positions of motor M1 to sense the rotational position. Current sensors CSu, CSv, and CSw are sensors that sense the current values in the phases u, v, and w of motor M1. Motor control signal acquiring unit 21 further acquires information on voltage Vp across power source wire Lp. Motor control signal acquiring unit 21 still further acquires control instruction information, such as a torque instruction output from a component external to control circuit 20, for example, an electronic control unit (ECU) of electric vehicle 101.

Motor control signal computing unit 22 converts the value of the torque instruction into current through computation based on the information acquired by motor control signal acquiring unit 21 and outputs a control signal for performing current control on motor M1. For example, motor control signal computing unit 22 outputs the control signal for performing current control on motor M1 in such a way that the torque produced by motor M1 when vehicle driving apparatus 5B is driven is equal to target torque indicated by the torque instruction information (for example, torque according to the amount of operated accelerator pedal or brake pedal of electric vehicle 101).

Further, motor control signal computing unit 22 converts the information acquired by motor control signal acquiring unit 21 through computation and outputs a control signal for making the active check and failure evaluation. For example, motor control signal computing unit 22 converts the control instruction information, such as the torque instruction, into the control signal described above and outputs the control signal to drive signal computing unit 23 and active check instructing unit 26. Moreover, motor control signal computing unit 22 converts information, such as current flowing through motor M1, the rotational positions of the magnetic poles of motor M1, and voltage Vp across power source wire Lp, into control signals and outputs the control signal to drive signal computing unit 23 and failure evaluating unit 25.

Active check instructing unit 26 is a circuit that outputs active check signal s1 to check terminal 36. The active check refers to causing three-phase-short-circuit-forming circuit 33 to attempt the three-phase short circuit control and checking whether or not three-phase-short-circuit-forming circuit 33 can perform the three-phase short circuit control, as described above. Active check instructing unit 26 evaluates based on the control signals output from motor control signal computing unit 22 whether or not the active check made at the current timing affects the driven state of vehicle driving apparatus 5B.

For example, active check instructing unit 26 determines that the active check is made when the torque of motor M1 produced when the three-phase short circuit control is performed is smaller than or equal to torque that does not affect the driven state of vehicle driving apparatus 5B. Evaluation of whether or not the active check can be made is performed at regular time intervals. Evaluation of whether or not the active check is made may not necessarily be performed by active check instructing unit 26 and may instead be performed by a circuit different from active check instructing unit 26 but is provided in control circuit 20.

Processes carried out by control circuit 20 before active check signal s1 is output will now be described. The processes are carried out in the following order (1), (2), and (3) in the case where the torque of motor M1 produced when the three-phase short circuit control is performed is smaller than or equal to torque that does not affect the driven state of vehicle driving apparatus 5B:

(1) Current Id (also called d-axis current) and current Iq (also called q-axis current) expected to flow through motor M1 when the three-phase short circuit control is performed are determined;
(2) Three-phase bridge circuit 40 is so controlled via drive circuit 30 that current Id and current Iq flow through motor M1; and
(3) Active check signal s1 is output to check terminal 36.

Control circuit 20 first evaluates based on the control signals output from motor control signal computing unit 22 whether or not the torque of motor M1 produced when the three-phase short circuit control is performed is smaller than or equal to torque that does not affect the driven state of vehicle driving apparatus 5B. Specifically, control circuit 20 determines that the torque of motor M1 is smaller than or equal to torque that does not affect the driven state of vehicle driving apparatus 5B when motor M1 is not performing powering or regenerating operation or performing regenerating operation at torque smaller than or equal to predetermined torque. The predetermined torque described above is, for example, torque produced when the braking acceleration acting on electric vehicle 101 is −0.03 times the gravitational acceleration (−0.03 G).

Control circuit 20 then determines current Id and current Iq expected to flow through motor M1 when the three-phase short circuit control is performed, as indicated in (1) described above. Current Id and current Iq are determined by (Expression 1) and (Expression 2) shown below.

[Math. 1]

$$I_d = \frac{-\omega^2 \phi_a L_q}{\omega^2 L_d L_q + R_a^2} \quad \text{(Expression 1)}$$

[Math. 2]

$$I_q = \frac{-\omega \phi_a R_a}{\omega^2 L_d L_q + R_a^2} \quad \text{(Expression 2)}$$

In (Expression 1) and (Expression 2), ω represents the angular velocity (number of revolutions, rotational speed), $\phi_a$ represents the armature interlinkage magnetic flux produced by the permanent magnet, Lq represents the q-axis inductance, Ld represents the d-axis inductance, and Ra represents the phase resistance. The value ω is determined based on the value from rotational position sensor RS. The value ω is converted into the rotational speed of motor M1 by multiplying ω by 60/(2π·Pn) (Pn is the number of pole pairs). The values $\phi_a$, Lq, Ld, and Ra are each a characteristic value of motor M1. A method for deriving (Expression 1) and (Expression 2) will be described later. (Expression 1) and (Expression 2) are stored in memory 24 and read as required.

Current Id and current Iq are values dependent on the number of revolutions of motor M1, as shown in (Expression 1) and (Expression 2). Control circuit 20 determines current Id and current Iq based on the number of revolutions of motor M1 at which motor M1 operates when the three-phase short circuit control is performed.

Control circuit 20 then controls three-phase bridge circuit 40 via drive circuit 30 in such a way that current Id and current Iq described above flow through motor M1, as indicted in (2) described above. In the control, control circuit 20 changes the d-axis current (current Id) and the q-axis current (current Iq) flowing through motor M1 at a predetermined change rate based, for example, on proportional integral (PI) control to cause the d-axis current and the q-axis current to approach the current Id and current Iq determined by using (Expression 1) and (Expression 2).

Figure 11:
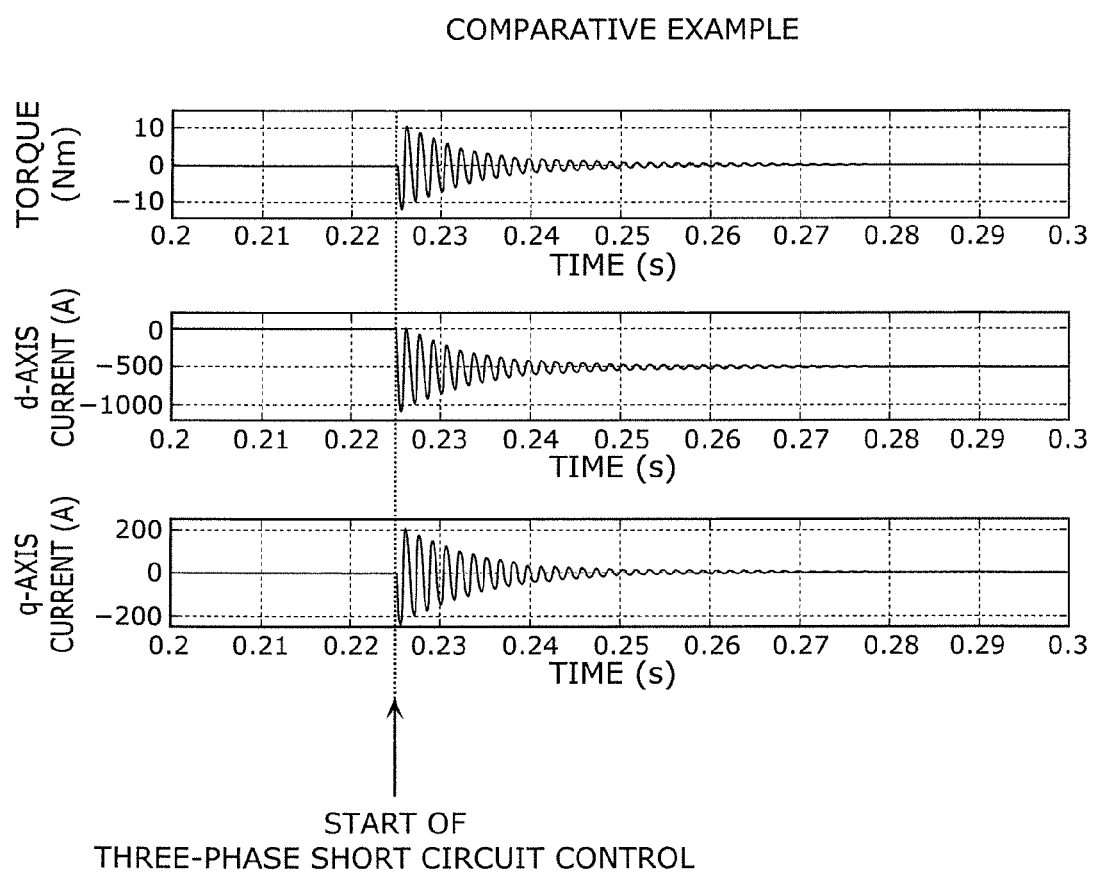
FIG. 11 is a diagram showing the torque, d-axis current, and q-axis current produced in a permanent magnet motor when a vehicle driving apparatus according to a Comparative Example performs three-phase short circuit control.
Figure 12:
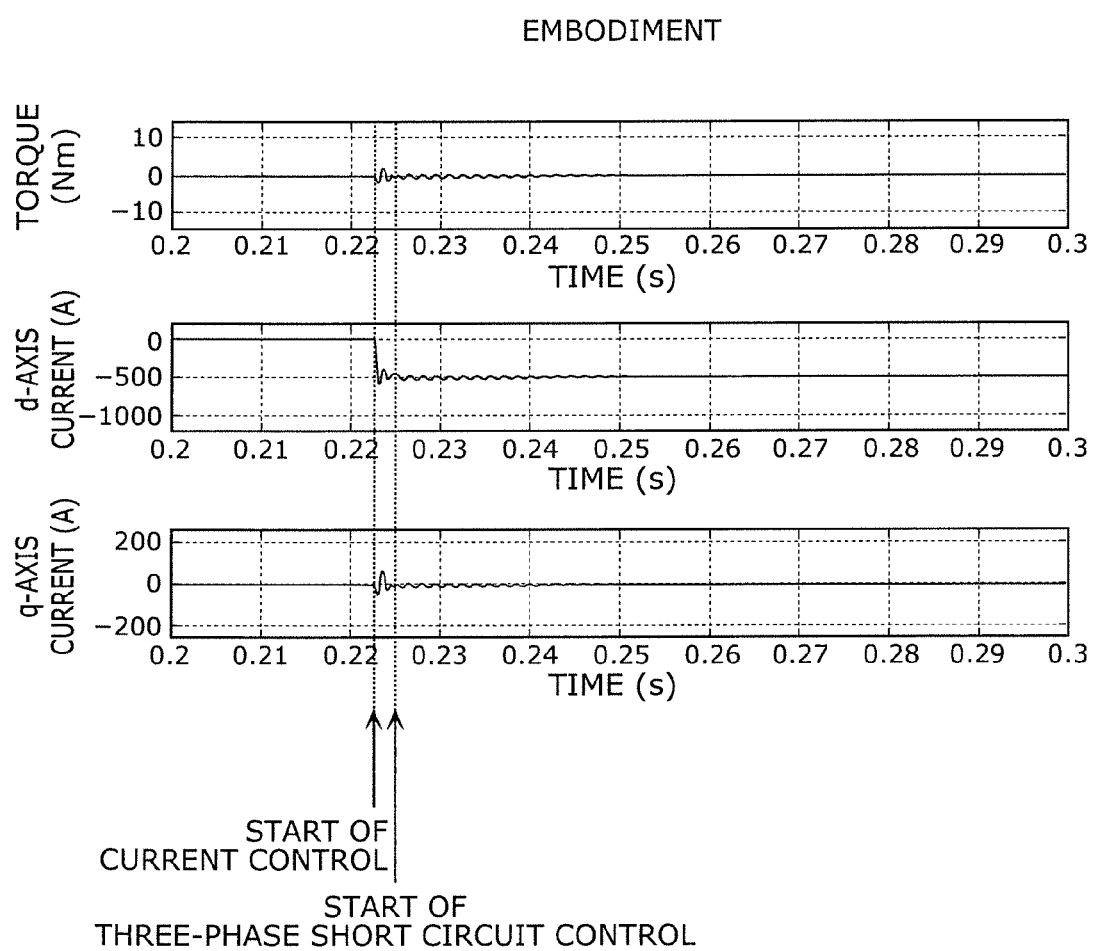
FIG. 12 is a diagram showing the torque, the d-axis current, and q-axis current produced in the permanent magnet motor when the vehicle driving apparatus according to Embodiment 2 performs the three-phase short circuit control.

FIG. 11 shows the torque, the d-axis current, and q-axis current produced in a permanent magnet motor when a vehicle driving apparatus according to Comparative Example performs the three-phase short circuit control. FIG. 12 shows the torque, the d-axis current, and q-axis current produced in permanent magnet motor M1 when vehicle driving apparatus 5B according to Embodiment 2 performs the three-phase short circuit control.

FIGS. 11 and 12 show changes in the torque, the d-axis current, and the q-axis current in the case where the three-phase short circuit control is performed in the state in which motor M1 is performing no powering or regenerating operation. The rotational speed of motor M1 is 10,000 rpm (number of revolutions/minute). The d-axis current is determined by (Expression 1), and the torque and the q-axis current are determined by (Expression 11), which will be described later, and (Expression 2), respectively.

In Comparative Example shown in FIG. 11, the current control described above is not performed, and the d-axis current is abruptly changed from 0 A to −500 A at the start of the three-phase short circuit control. The torque, the d-axis current, and the q-axis current after the start of the three-phase short circuit control greatly deflect, and it takes about 30 ms (milliseconds) before the deflected values fall within predetermined ranges.

In contrast, in the embodiment shown in FIG. 12, the three-phase short circuit control is performed after current control that changes the d-axis current and the q-axis current at the predetermined change rate is performed. In FIG. 12, in a case where the current value of the d-axis current is 0 A and the current Id determined by using (Expression 1) is −500 A, current control that changes the d-axis current, which is 0 A, to −500 A is performed for a period longer than or equal to 1 ms but shorter than or equal to 3 ms. Similarly, current control that changes the q-axis current to current Iq determined by using (Expression 2) is performed for a period longer than or equal to 1 ms but shorter than or equal to 3 ms. The three-phase short circuit control is then performed. As a result, the deflected torque, d-axis current, and q-axis current fall within the predetermined ranges in about 10 ms after the point of time when the current control is performed. As described above, performing the current control in such a way that the current Id and the current Iq flow through motor M1 before the three-phase short circuit control is performed allows suppression of the torque variation and the current variation that occur when the three-phase short circuit control is performed. The period required to check whether or not three-phase-short-circuit-forming circuit 33 has failed can thus be shortened.

After the current control is completed, control circuit 20 outputs active check signal s1 to check terminal 36 (performs three-phase short circuit control), as indicated in (3) described above. Control circuit 20 outputs the busy signal representing that the active check is being made simultaneously with outputting active check signal s1 to failure evaluating unit 25.

The configuration of control circuit 20 will continuously be described with reference to FIG. 9.

Failure evaluating unit 25 is a circuit that evaluates whether or not three-phase-short-circuit-forming circuit 33 has failed. Failure evaluating unit 25 acquires information on a change that occurs when the three-phase short circuit control is performed in at least one of current flowing through the three phases of motor M1, the current phase, and DC voltage applied to three-phase bridge circuit 40. A change in the current can be determined based on a current value detected with each of current sensors CSu, CSv, and CSw. A change in the current phase can be determined based, for example, on d-axis current and q-axis current of motor M1. The d-axis current and q-axis current can be determined based on a current value detected with each of current sensors CSu, CSv, and CSw and the rotational positions of the magnetic poles detected with rotational position sensor RS. A change in the DC voltage can be determined by detecting voltage Vp across power source wire Lp.

Failure evaluating unit 25 evaluates whether or not the three-phase-short-circuit-forming circuit has failed based on the acquired information described above. For example, failure evaluating unit 25 determines that three-phase-short-circuit-forming circuit 33 has failed in at least one of a case where the current does not fall within a specified range, a case where the current phase does not fall within a specified range, and a case where the DC voltage does not fall within a specified range. Having determined that three-phase-short-circuit-forming circuit 33 has failed, failure evaluating unit 25 outputs a notification signal that notifies an external component of information on the failure.

Abnormality detecting unit 29 is a circuit that detects abnormality that occurs in inverter 10, such as overvoltage. The following description will be made on the assumption that abnormality detecting unit 29 is a circuit that detects overvoltage that occurs due, for example, to a defect, such as disconnection of power source wire Lp, or failure of switch elements S1 to S6, current sensors CSu, CSv, and CSw, rotational position sensor RS, and other components. Abnormality detecting unit 29 is connected to power source wire Lp of three-phase bridge circuit 40 on the positive side of battery P1. When abnormality detecting unit 29 detects abnormality (overvoltage in the description), abnormality signal s2 is output to abnormality accepting terminal 39. Since abnormality signal s2 causes three-phase-short-circuit-forming circuit 33 to perform the three-phase short circuit control, the overvoltage applied to three-phase bridge circuit 40 can be suppressed. The overvoltage presented in the description, which is abnormality detected by abnormality detecting unit 29, can occur, for example, when the positive-side wiring of battery P1 comes off or is disconnected or a main relay that is not shown but is provided in battery P1 is opened. Since abnormality detecting unit 29 and drive circuit 30 (including three-phase-short-circuit-forming circuit 33) are each formed of hardware, emergency actions from detection of abnormality by abnormality detecting unit 29 to the three-phase short circuit control by three-phase-short-circuit-forming circuit 33 are automatically and quickly performed. Abnormality detecting unit 29 need not necessarily be provided inside control circuit 20 and may be so provided externally of control circuit 20. Abnormality detecting unit 29 does not necessarily have the overvoltage detecting configuration and may have a configuration that directly detects output abnormality (such as output voltage that does not fall within predetermined range) of any of current sensors CSu, CSv, and CSw, rotational position sensor RS, and other sensors.

Drive signal computing unit 23 computes a drive signal required to drive motor M1 based on the control signals output from motor control signal computing unit 22 and outputs the drive signal to drive circuit 30. Drive signal computing unit 23 outputs a drive signal for performing the three-phase PWM control when vehicle driving apparatus 5B is normally driven.

When abnormality of inverter 10 is detected and when failure evaluating unit 25, which will be described later, determines that three-phase-short-circuit-forming circuit 33 has failed, drive signal computing unit 23 outputs a drive signal for performing the three-phase short circuit control based on the program stored in memory 24.

The three-phase short circuit control performed based on the program is performed by three-phase short circuit control signal interrupting unit 27. Specifically, once failure information is received from failure evaluating unit 25 indicating that three-phase-short-circuit-forming circuit 33 has failed, three-phase short circuit control signal interrupting unit 27 outputs an interrupt signal for performing the three-phase short circuit control to drive signal computing unit 23 when abnormality of inverter 10 is detected. Upon reception of the interrupt signal, drive signal computing unit 23 changes a three-phase PWM control drive signal to a three-phase short circuit control drive signal and outputs the drive signal to drive circuit 30.

As described above, control circuit 20 outputs drive signals for performing the three-phase PWM control and the three-phase short circuit control to drive circuit 30. Drive circuit 30 selects one of the drive signal output from control circuit 20 and the signal output from three-phase-short-circuit-forming circuit 33 and outputs the selected signal to three-phase bridge circuit 40. Three-phase bridge circuit 40 drives motor M1 based on a signal output from drive circuit 30.

Part of the processes carried out by control circuit 20 before active check signal s1 described above is output may be carried out by drive signal computing unit 23. For example, drive signal computing unit 23 may determine current Id and current Iq expected to flow through motor M1 when the three-phase short circuit control is performed and control three-phase bridge circuit 40 via drive circuit 30 in such a way that determined current Id and current Iq flow through motor M1.

Vehicle driving apparatus 5B according to Embodiment 2 includes inverter 10, which drives motor M1. Inverter 10 includes three-phase bridge circuit 40 including the plurality of switch elements S1 to S6, drive circuit 30 connected to three-phase bridge circuit 40, control circuit 20 connected to drive circuit 30, and abnormality detecting unit 29, which detects abnormality of inverter 10. Drive circuit 30 includes three-phase-short-circuit-forming circuit 33, which causes the three phases of motor M1 to form short circuits, abnormality accepting terminal 39, which accepts abnormality signal s2 output from abnormality detecting unit 29, and check terminal 36, which accepts active check signal s1 for performing the three-phase short circuit control performed by three-phase-short-circuit-forming circuit 33. In the case where the torque of motor M1 produced when the three-phase short circuit control is performed is smaller than or equal to torque that does not affect the driven state of vehicle driving apparatus 5B, control circuit 20 (1) determines current Id and current Iq expected to flow through motor M1 when the three-phase short circuit control is performed, (2) controls three-phase bridge circuit 40 via drive circuit 30 in such a way that current Id and current Iq flow through motor M1, and (3) outputs active check signal s1 to check terminal 36.

According to the configuration described above, drive circuit 30 can accept active check signal s1 as appropriate via check terminal 36. Active check signal s1 allows vehicle driving apparatus 5B to check as appropriate whether or not three-phase-short-circuit-forming circuit 33 can perform the three-phase short circuit control. Reliable vehicle driving apparatus 5B in which potential failure of the three-phase short circuit control is located in inverter 10 at an early stage can therefore be provided.

Further, the torque variation and the current variation that occur when the three-phase short circuit control is performed can be suppressed by controlling three-phase bridge circuit 40 via drive circuit 30 in such a way that current Id and current Iq flow through motor M1 and then outputting active check signal s1 to check terminal 36. Suppression of the torque variation and the current variation allows reduction in the period required to check whether or not three-phase-short-circuit-forming circuit 33 has failed.

[2-2. Method for Deriving d-Axis Current and q-Axis Current]

The process of deriving (Expression 1) and (Expression 2) relating to the current Id and current Iq will now be described. The equation of the voltage applied to motor M1 is well known and expressed by (Expression 3).

[Math. 3]

$$\begin{bmatrix} v_d \\ v_q \end{bmatrix} = \begin{bmatrix} R_a + pL_d & -\omega L_q \\ \omega L_d & R_a + pL_q \end{bmatrix} \begin{bmatrix} i_d \\ i_q \end{bmatrix} + \begin{bmatrix} 0 \\ \omega \phi_a \end{bmatrix} \quad \text{(Expression 3)}$$

In (Expression 3), Vd represents the d-axis voltage, Vq represents the q-axis voltage, p represents a differential operator, Ld represents the d-axis inductance, Lq represents the q-axis inductance, id represent the d-axis current, iq represent the q-axis current, and φ a represents the armature interlinkage magnetic flux produced by the permanent magnet.

(Expression 3) is rewritten by coordinate conversion into (Expression 4).

[Math. 4]

$$\begin{bmatrix} v_d \\ v_q \end{bmatrix} = \sqrt{\frac{2}{3}} \begin{bmatrix} \cos\theta & \sin\theta \\ -\sin\theta & \cos\theta \end{bmatrix} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_u \\ v_v \\ v_w \end{bmatrix} \quad \text{(Expression 4)}$$

In (Expression 4), Vu represents the u-phase voltage, Vv represents the v-phase voltage, and Vw represents the w-phase voltage.

Since the u-phase voltage, the v-phase voltage, and the w-phase voltage produced when the three-phase short circuit control is performed in motor M1 are equal to one another, the relationship expressed by (Expression 5) is satisfied.

[Math. 5]

$$v_u = 2v_v = v_w \quad \text{(Expression 5)}$$

Substituting (Expression 5) into (Expression 4) provides the result expressed by (Expression 6).

[Math. 6]

$$v_d = v_q = 0 \quad \text{(Expression 6)}$$

Substituting (Expression 6) into (Expression 3) causes (Expression 3) to be rewritten into (Expression 7) and (Expression 8).

[Math. 7]

$$R_a I_d - \omega L_q I_q = 0 \quad \text{(Expression 7)}$$

[Math. 8]

$$\omega L_d I_d + R_a I_q + \omega \phi_a = 0 \quad \text{(Expression 8)}$$

(Expression 7) and (Expression 8) are solved to determine (Expression 9) and (Expression 10).

[Math. 9]

$$I_d = \frac{-\omega \phi_a R_a}{\omega^2 L_d L_q + R_a^2} \quad \text{(Expression 9)}$$

-continued

[Math. 10]

$$I_d = \frac{\omega L_q}{R_a}I_q = \frac{-\omega^2 \phi_a R_a}{\omega^2 L_d L_q + R_a^2} \quad \text{(Expression 10)}$$

(Expression 9) and (Expression 10) derive (Expression 2) and (Expression 1) relating to current Iq and current Id.

A general expression for determining the torque of a motor is expressed by (Expression 11).

[Math. 11]

$$T = P_n\{\varphi_a I_q + (L_d - L_q)I_d I_q\} \quad \text{(Expression 11)}$$

In (Expression 11), Pn represents the number of pole pairs and is a characteristic value of motor M1.

Substituting (Expression 9) and (Expression 10) into (Expression 11) to delete Ld and Lq derives (Expression 12) relating to three-phase short circuit torque Tsh.

[Math. 12]

$$T_{sh} = -\frac{P_n R_a}{\omega}(I_d^2 + I_q^2) \quad \text{(Expression 12)}$$

[2-3. Action of Vehicle Driving Apparatus]

The action of vehicle driving apparatus 5B will next be described with reference to FIGS. 13 and 14.

Figure 13:
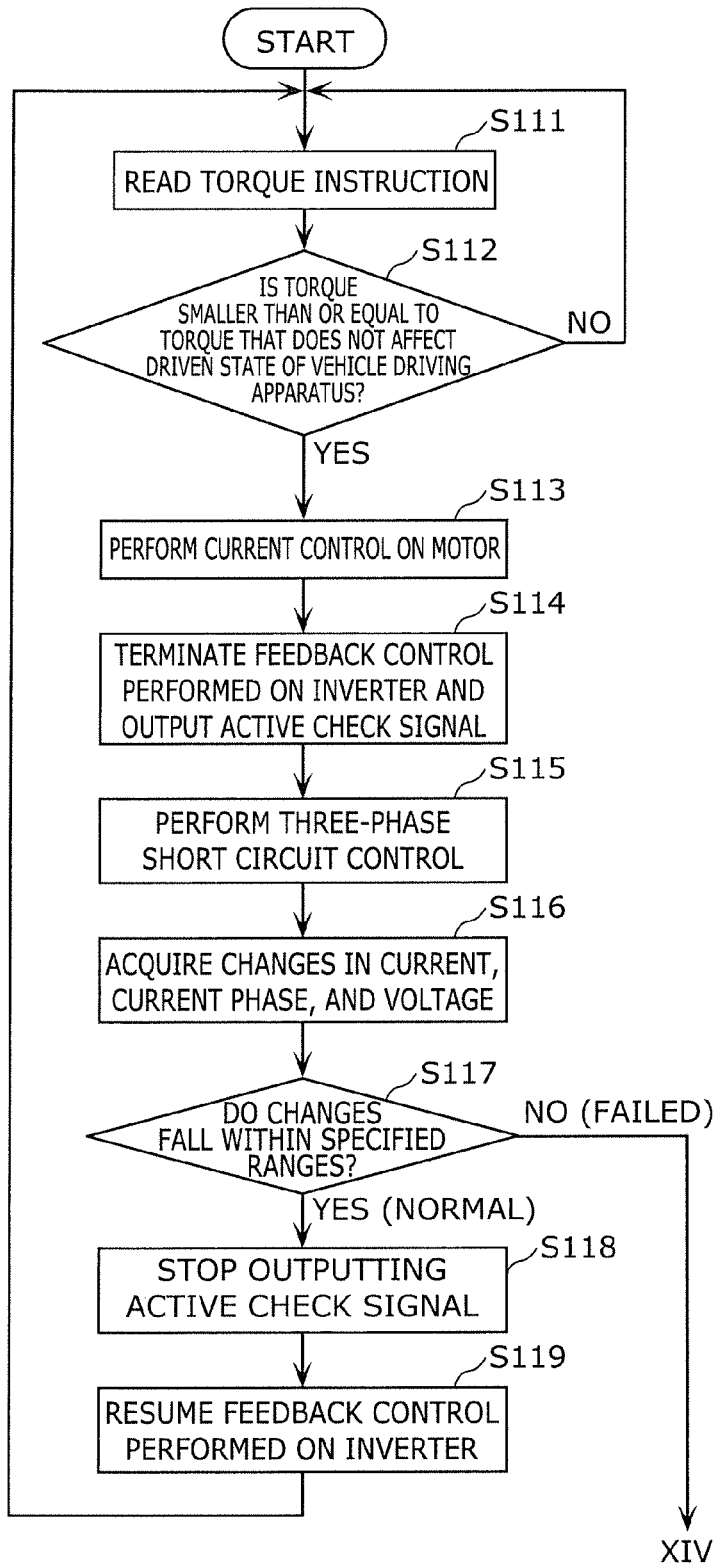
FIG. 13 is a flowchart showing an example of the action of the vehicle driving apparatus according to Embodiment 2.

FIG. 13 is a flowchart showing an example of the action of vehicle driving apparatus 5B. FIG. 14 is a flowchart showing the example of the action of vehicle driving apparatus 5B following the flowchart of FIG. 13.

Vehicle driving apparatus 5B is first activated and is in operation.

In this state, control circuit 20 reads the torque instruction from an external component (step S111). Specifically, motor control signal acquiring unit 21 reads the torque instruction information output from the ECU of electric vehicle 101. The torque instruction information is converted by motor control signal computing unit 22 and output as a control signal to active check instructing unit 26 and drive signal computing unit 23.

Control circuit 20 then evaluates whether or not the torque contained in the read torque instruction information is smaller than or equal to torque that does not affect the driven state of vehicle driving apparatus 5B (step S112). Specifically, active check instructing unit 26 determines that the torque of motor M1 is smaller than or equal to torque that does not affect the driven state of vehicle driving apparatus 5B when motor M1 is not performing powering or regenerating operation or performing regenerating operation at torque smaller than or equal to predetermined torque.

When control circuit 20 determines that the acquired torque is not smaller than or equal to torque that does not affect the driven state of vehicle driving apparatus 5B (No in S112), control circuit 20 determines that diagnosis of failure of three-phase-short-circuit-forming circuit 33 is not performed at the current timing and returns to step S111. On the other hand, when control circuit 20 determines that the acquired torque is smaller than or equal to torque that does not affect the driven state of vehicle driving apparatus 5B (Yes in S112), control circuit 20 determines that diagnosis of failure of three-phase-short-circuit-forming circuit 33 is performed at the current timing and proceeds to the following step.

Control circuit 20 then performs the current control on motor M1 (step S113). Specifically, control circuit 20 determines current Id and current Iq expected to flow through motor M1 when the three-phase short circuit control is performed and feedback-controls three-phase bridge circuit 40 via drive circuit 30 in such a way that current Id and current Iq flow through motor M1 in advance.

After the current control described above, control circuit 20 terminates the feedback control performed on inverter 10 and outputs active check signal s1 (step S114). Specifically, active check instructing unit 26 outputs active check signal s1 to check terminal 36 of drive circuit 30. Active check signal s1 is continuously output until it is stopped in step S118 or S121, which will be described later.

Inverter 10 then performs the three-phase short circuit control using three-phase-short-circuit-forming circuit 33 (step S115). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5B (step S116). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S117). Specifically, failure evaluating unit 25 evaluates whether or not the current does not fall within the specified range thereof, the current phase does not fall within the specified range thereof, and the DC voltage does not fall within the specified range thereof.

In a case where failure evaluating unit 25 determines that the changes in the current, the current phase, and the voltage all fall within the specified ranges (Yes in S117), failure evaluating unit 25 determines that three-phase-short-circuit-forming circuit 33 has not failed and is normally operating. Control circuit 20 then stops outputting active check signal s1 output from active check instructing unit 26 (step S118) and resumes the feedback control performed on inverter 10 (step S119). Control circuit 20 then returns to step S111 and repeats the active check. The active check is repeatedly performed at predetermined time intervals.

On the other hand, when at least one of the changes in the current, the current phase, and the voltage does not fall within the corresponding specified range (No in step S117), control circuit 20 determines that three-phase-short-circuit-forming circuit 33 has failed. Control circuit 20 then performs actions to be performed when three-phase-short-circuit-forming circuit 33 has failed, as shown in FIG. 14.

Figure 14:
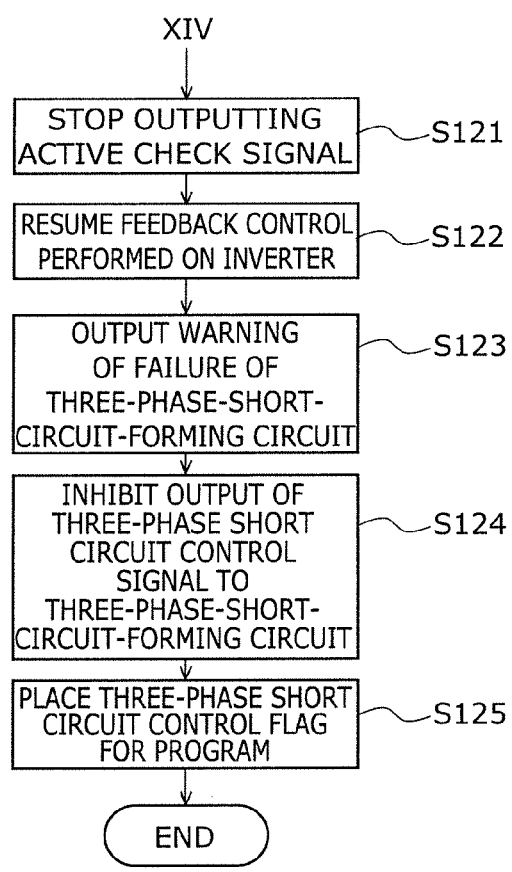
FIG. 14 is a flowchart showing the example of the action of vehicle driving apparatus following the flowchart of FIG. 13.

Control circuit 20 stops outputting active check signal s1 output from active check instructing unit 26 (step S121) and resumes the feedback control performed on inverter 10 (step S122), as shown in FIG. 14. The current control may be performed in advance in step S121 so that the torque variation and the current variation are not too large when the feedback control performed on inverter 10 is resumed. For example, control circuit 20 may determine current expected to flow through motor M1 when step S122 is carried out, control three-phase bridge circuit 40 via drive circuit 30 in such a way that the current flows through motor M1, and then carry out step S122.

Control circuit 20 then outputs a failure warning representing that three-phase-short-circuit-forming circuit 33 has failed to an external component, for example, the ECU (upper-level control unit) of electric vehicle 101 (step S123). Failure evaluating unit 25 may notify a user of the failure information by displaying the failure information on a monitor or outputting a sound that informs the failure information via a loudspeaker.

Further, control circuit 20 inhibits output of a three-phase short circuit control signal to three-phase-short-circuit-forming circuit 33 (step S124). Specifically, control circuit 20 inhibits active check instructing unit 26 from outputting active check signal s1. Control circuit 20 places a flag representing the three-phase short circuit control (step S125). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5B.

Further, in the case where it is determined that three-phase-short-circuit-forming circuit 33 has failed and in the middle of operation of outputting active check signal s1, control circuit 20 may use the program stored in memory 24 in control circuit 20 to output a control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1 performs powering or regenerating operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[2-4. Another Example of Failure Diagnosis]

In Embodiment 2 described above, failure evaluating unit 25 determines that three-phase-short-circuit-forming circuit 33 has failed in at least one of the case where the current does not fall within a specified range, the case where the current phase does not fall within a specified range, and the case where the DC voltage does not fall within a specified range, but failure evaluating unit 25 does not necessarily make the determination as described above.

For example, failure evaluating unit 25 of control circuit 20 may determine that three-phase-short-circuit-forming circuit 33 has failed in at least one of a case where the difference in d-axis current in motor M1 between before and after active check signal s1 is output does not fall within a specified range and a case where the difference in q-axis current in motor M1 between before and after active check signal s1 is output does not fall within a specified range.

Figure 15:
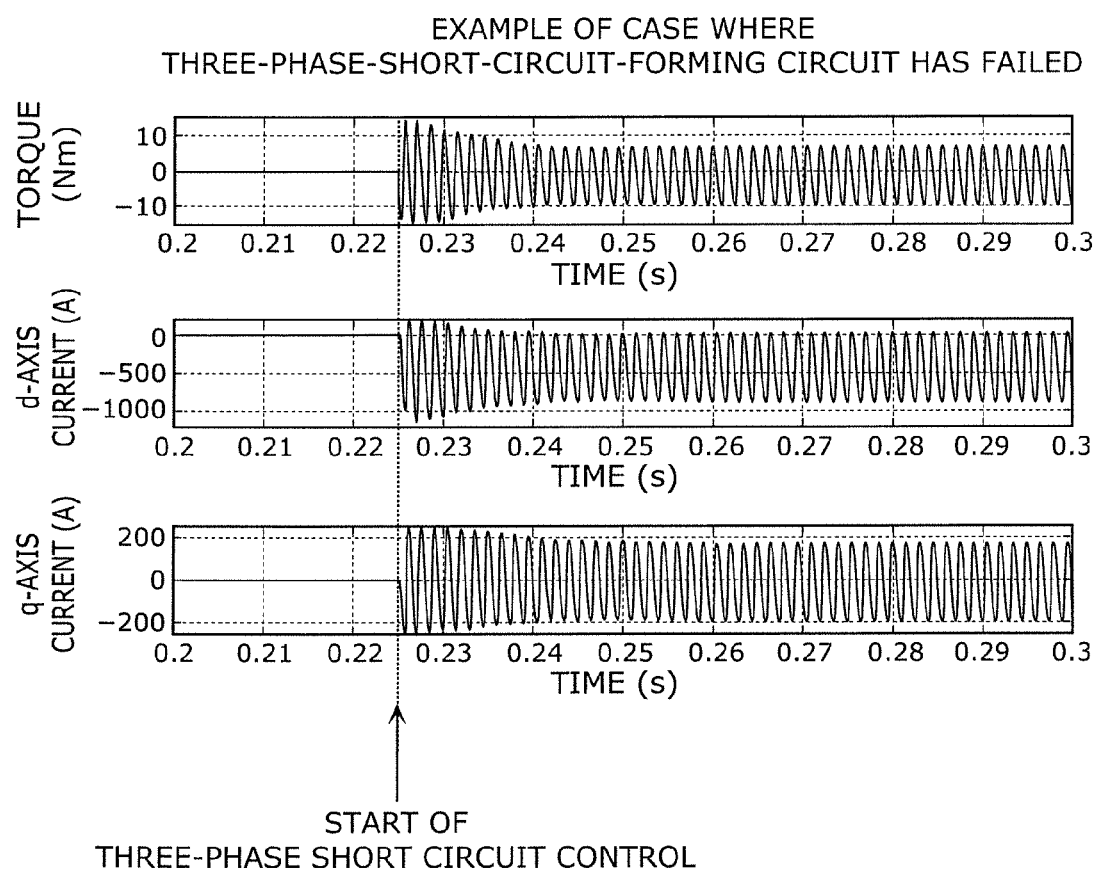
FIG. 15 is a diagram showing an example of the case where a three-phase-short-circuit-forming circuit of the vehicle driving apparatus according to Embodiment 2 has failed.
Figure 16:
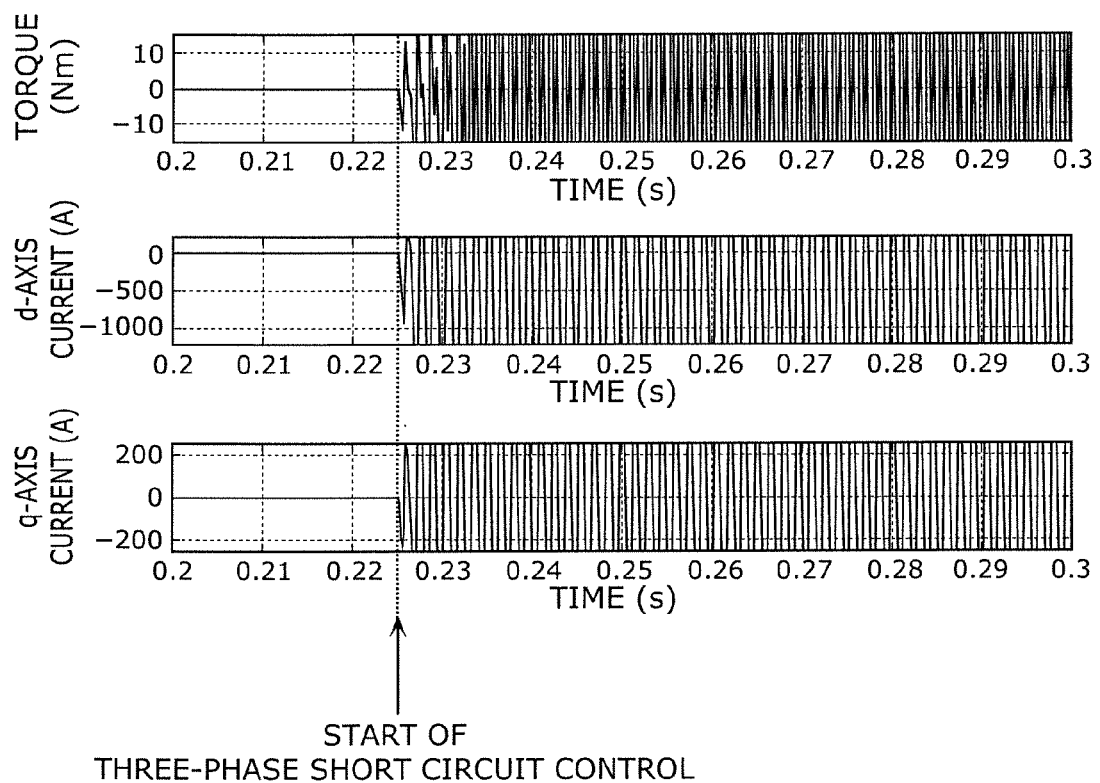
FIG. 16 shows another example of the case where the three-phase-short-circuit-forming circuit of the vehicle driving apparatus according to Embodiment 2 has failed.

FIG. 15 shows an example of the case where three-phase-short-circuit-forming circuit 33 of vehicle driving apparatus 5B has failed. FIG. 16 shows another example of the case where three-phase-short-circuit-forming circuit 33 of vehicle driving apparatus 5B has failed. FIGS. 15 and 16 show changes in the torque, the d-axis current, and the q-axis current in the case where the three-phase short circuit control is performed in the state in which motor M1 is performing no powering or regenerating operation. The rotational speed of motor M1 is 10,000 rpm (number of revolutions/minute). The torque, the d-axis current, and the q-axis current are determined by (Expression 12), (Expression 1), and (Expression 2), respectively.

FIG. 15 shows a case where two of the three phases of motor M1 each form a short circuit but the remaining one phase does not form a short circuit. FIG. 16 shows a case where one of the three phases of motor M1 form a short circuit but the remaining two phases do not form short circuits. If at least one phase of motor M1 does not form a short circuit when the three-phase short circuit control is performed, the d-axis current and the q-axis current greatly deflect and show different behaviors as compared with the case where the three phases each normally form a short circuit (see FIG. 12, for example), as shown in FIGS. 15 and 16. Determining the difference in d-axis current and the difference in q-axis current between before and after the three-phase short circuit control is performed therefore allows failure evaluating unit 25 to evaluate whether or not three-phase-short-circuit-forming circuit 33 has failed.

In a case where none of the three phases of motor M1 form a short circuit (not shown), current flowing toward battery P1 is generated. The d-axis current produced from the current detected with current sensors CSu, CSv, and CSw therefore differs from current Id determined from (Expression 1). The same holds true for the q-axis current. Therefore, in the case where the current does not fall within the specified range, failure evaluating unit 25 can determine that three-phase-short-circuit-forming circuit 33 has failed.

[2-5. Variation 1 of Embodiment 2]

The configuration of vehicle driving apparatus 5Ba according to Variation 1 of Embodiment 2 will next be described with reference to FIGS. 17 and 18. In Variation 1, the description will be made of a case where vehicle driving apparatus 5Ba is provided with a plurality of permanent magnet motors M1.

Figure 17:
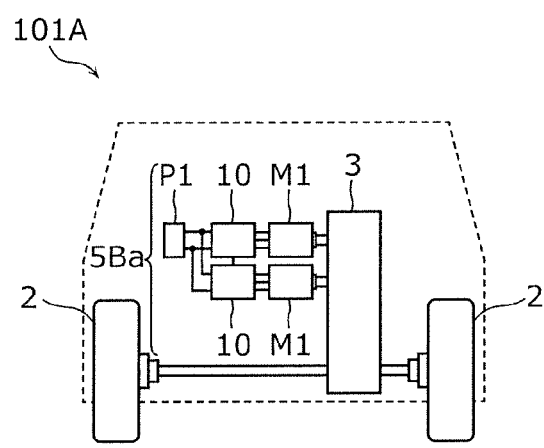
FIG. 17 is a diagram showing an example of an electric vehicle including a vehicle driving apparatus according to Variation 1 of Embodiment 2.

FIG. 17 shows an example of electric vehicle 101A including vehicle driving apparatus 5Ba according to Variation 1. Electric vehicle 101A includes driving wheels 2, power transmission mechanism 3, two permanent magnet motors M1, two inverters 10, and battery P1. Out of the components described above, vehicle driving apparatus 5Ba includes two permanent magnet motors M1, two inverters 10, and battery P1.

Figure 18:
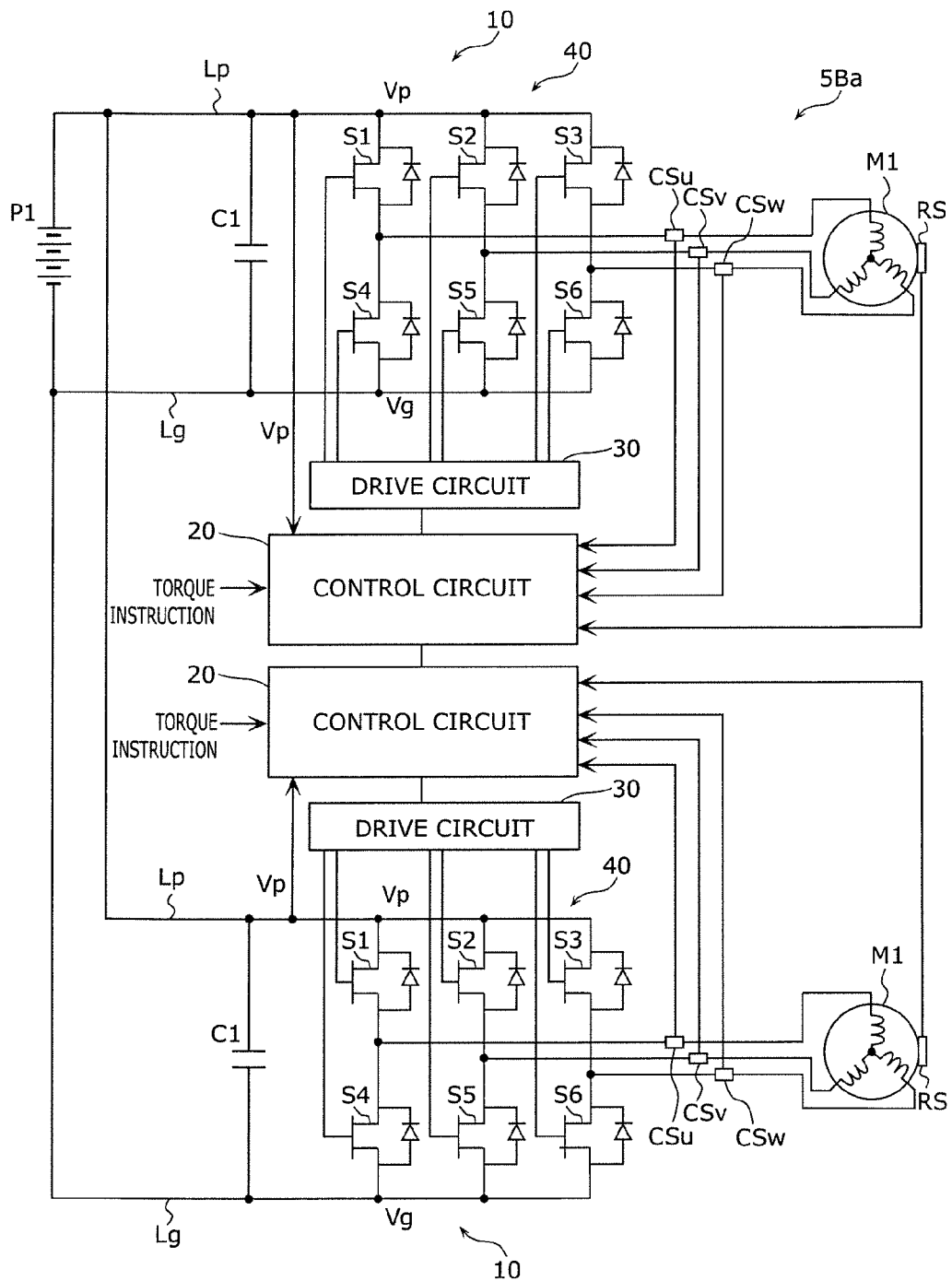
FIG. 18 is a circuit diagram showing an example of inverters, permanent magnet motors, and a battery of the vehicle driving apparatus according to Variation 1 of Embodiment 2.

FIG. 18 is a circuit diagram showing an example of inverters 10, permanent magnet motors M1, and battery P1 of vehicle driving apparatus 5Ba.

Vehicle driving apparatus 5Ba includes two motors M1, two inverters 10, and battery P1, as shown in FIG. 18. Inverters 10 each include three-phase bridge circuit 40, drive circuit 30, and control circuit 20.

Control circuits 20 each include motor control signal acquiring unit 21, motor control signal computing unit 22, drive signal computing unit 23, active check instructing unit 26, failure evaluating unit 25, and three-phase short circuit control signal interrupting unit 27. Control circuits 20 each further include abnormality detecting unit 29 (not shown). Control circuits 20 of inverters 10 are communicably connected to each other. FIG. 18 shows two control circuits 20, but not necessarily, and the control circuits may be replaced with one control circuit having the functions of two control circuits 20.

Drive circuit 30 has an input side connected to control circuit 20 and an output side connected to three-phase bridge circuit 40. Drive circuits 30 each include switching circuit 31, buffer circuit 32, three-phase-short-circuit-forming circuit 33, and OR circuit 34. Drive circuits 30 each further include check terminal 36 and abnormality accepting terminal 39 (not shown).

Three-phase bridge circuits 40 each include switch elements S1, S2, and S3 provided in an upper arm group and switch elements S4, S5, and S6 provided in a lower arm group. Switch elements S1 to S6 are connected to drive circuit 30 and driven by signals output from drive circuit 30. Motors M1 are each driven, for example, in the form of powering, regenerating, or coasting operation based on the driven states of switch elements S1 to S6.

Vehicle driving apparatus 5Ba according to Variation 1 includes two motors M1, one inverter 10 that drives one of two motors M1, and another inverter 10 that drives the other one of two motors M1. In a case where the one motor M1 is performing the powering or regenerating operation and the torque of the other motor M1 produced when the three-phase short circuit control is performed in the other motor M1 is smaller than or equal to torque that does not affect the driven state of vehicle driving apparatus 5Ba, control circuit 20 of the other inverter 10 (1) determines current Id and current Iq expected to flow through the other motor M1 when the three-phase short circuit control described above is performed, (2) controls three-phase bridge circuit 40 via drive circuit 30 in such a way that current Id and current Iq flow through the other motor M1, and (3) then outputs active check signal s1 to check terminal 36.

As described above, when the one motor M1 is performing powering or regenerating operation, outputting active check signal s1 for making the active check in the other motor M1 allows an increase in the number of opportunities of checking whether or not the three-phase short circuit control can be performed, as compared, for example, with the case where active check signal s1 is output only when motor M1 is performing no powering or regenerating operation. Reliable vehicle driving apparatus 5Ba in which potential failure of the three-phase short circuit control is located in inverter 10 at an early stage can therefore be provided.

[2-6. Variation 2 of Embodiment 2]

Vehicle driving apparatus 5B according to Variation 2 of Embodiment 2 will next be described with reference to FIGS. 19 and 20. In Variation 2, the description will be made of the active check made in the case where the number of revolutions of motor M1 falls within a predetermined threshold range.

Figure 19:
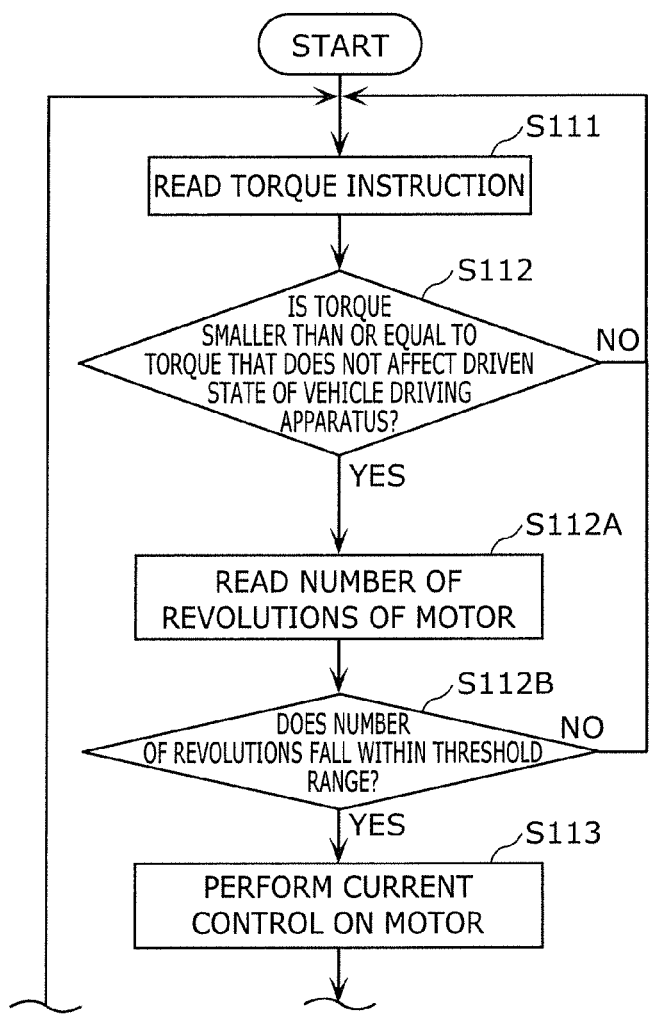
FIG. 19 is a flowchart showing an example of the action of the vehicle driving apparatus according to Variation 2 of Embodiment 2.
Figure 20:
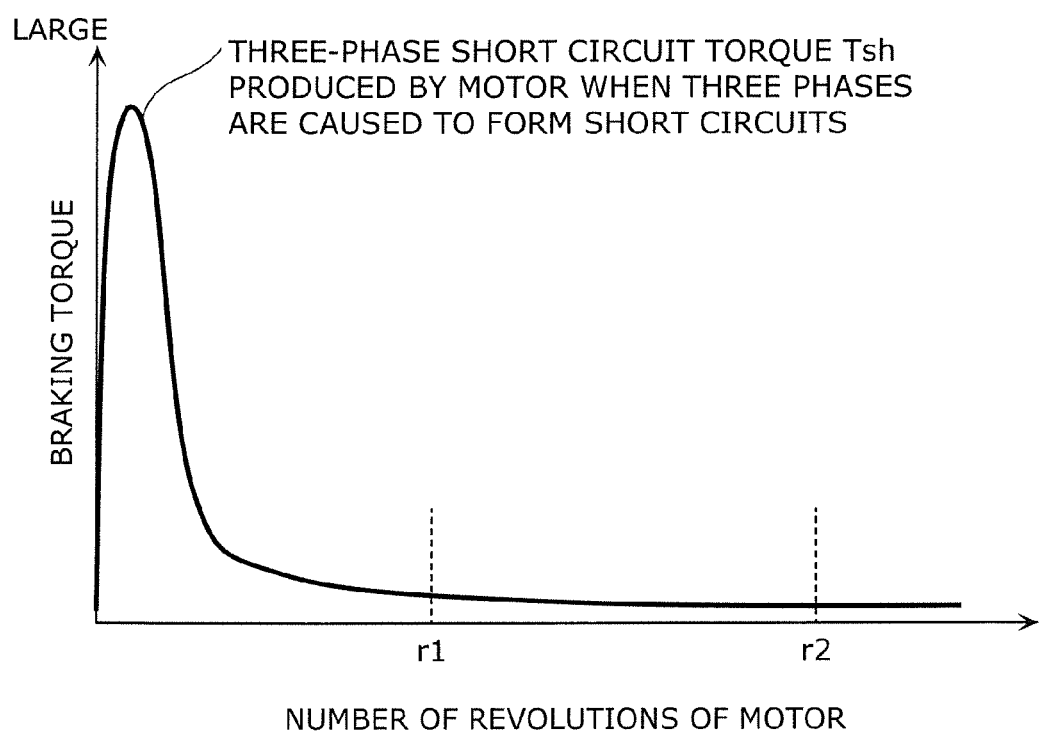
FIG. 20 graph showing the torque produced when the three phases of the permanent magnet motor in the vehicle driving apparatus according to Variation 2 of Embodiment 2 are caused to form short circuits.

FIG. 19 is a flowchart showing an example of the action of vehicle driving apparatus 5B according to Variation 2 of Embodiment 2. FIG. 20 shows the torque produced when the three phases of permanent magnet motor M1 in vehicle driving apparatus 5B according to Variation 2 are caused to form short circuits. FIG. 20 shows that braking torque increases in the direction toward the positive side (upper side) of the vertical axis in FIG. 20.

A method for operating vehicle driving apparatus 5B according to Variation 2 of Embodiment 2 includes the step of evaluating the number of revolutions of motor M1 to determine whether or not the active check is made. The step is located between step S112 of evaluating whether or not motor M1 has received the powering operation instruction or the regenerating operation instruction and step S113 of performing the current control on motor M1.

Specifically, after the result of the evaluation in step S112 shows Yes, the number of revolutions of motor M1 is read (step S112A), as shown in FIG. 19. The number of revolutions of motor M1 can be determined based on the result of the sensing performed by rotational position sensor RS.

It is then evaluated whether or not the number of revolutions of motor M1 falls within the predetermined threshold range (step S112B). Specifically, first threshold r1, which is a threshold of the number of revolutions of motor M1, and second threshold r2, which is greater than first threshold r1, are set, and it is evaluated whether or not the number of revolutions of motor M1 is greater than or equal to first threshold r1 but smaller than or equal to second threshold r2. In a case where the number of revolutions is greater than or equal to first threshold r1 but smaller than or equal to second threshold r2 (Yes in S112B), control circuit 20 proceeds to the steps where the active check is made. On the other hand, in a case where the number of revolutions is not greater than or equal to first threshold r1 but smaller than or equal to second threshold r2 (No in S112B), control circuit 20 returns to step S111.

The reason why whether or not the active check can be made is determined based on the number of revolutions of motor M1 is as follows: When the active check is made when the number of revolutions of motor M1 is smaller than first threshold r1, large braking torque is abruptly produced in some cases, as shown in FIG. 20. To avoid the situation described above, the active check is made in Variation 2 in the case where the number of revolutions of motor M1 is greater than or equal to first threshold r1. Further, when the active check is made when the number of revolutions of motor M1 is greater than second threshold r2, that is, when it is estimated that relatively wild driving is being performed, an abrupt change in torque instruction issued to motor M1 cannot be handled in some cases. In view of the fact described above, the active check is made in Variation 2 when the number of revolutions of motor M1 is smaller than or equal to second threshold r2.

As described above, in vehicle driving apparatus 5B according to Variation 2 of Embodiment 2, whether or not the active check can be made is determined in accordance with the number of revolutions of motor M1. Abrupt torque variation that may occur when vehicle driving apparatus 5B is driven can thus be suppressed. Variation 2 is not limited to vehicle driving apparatus 5B and is also applicable to vehicle driving apparatus 5Ba.

Embodiment 2 described above is an essentially preferable example and is not intended to limit the scope of the present disclosure, an object to which the present disclosure is applied, or the application of the present disclosure.

For example, when the drive circuit described above accepts the active check signal described above, the drive circuit may switch the control performed in the permanent magnet motor described above to the three-phase short circuit control performed by the three-phase-short-circuit-forming circuit described above.

The drive circuit's switching of the control performed in the permanent magnet motor to the three-phase short circuit control performed by the three-phase-short-circuit-forming circuit allows the vehicle driving apparatus to check whether or not the three-phase-short-circuit-forming circuit can perform the three-phase short circuit control. Potential failure of the three-phase short circuit control can therefore be located in the inverter at an early stage to increase the reliability of the vehicle driving apparatus.

Embodiment 3

A vehicle driving apparatus according to Embodiment 3 will be described with reference to FIGS. 21 to 34.

The state of the permanent magnet motor in the vehicle driving apparatus during traveling is broadly classified into the powering state, the regenerating state, and the no powering or regenerating state (the state in which the vehicle is coasting, and in the case where the vehicle includes another drive source, such as an engine and an another permanent magnet motor, the state in which the vehicle travels based only on the other drive source). In Embodiment 3 below, the description will be made of a case where whether or not the three-phase-short-circuit-forming circuit has failed is checked in the state in which the permanent magnet motor is performing regenerating operation. Further, in Variation 3 of Embodiment 3, a description will be made of a case where whether or not the three-phase-short-circuit-forming circuit has failed is checked in the state in which the permanent magnet motor is performing no powering or regenerating operation.

[3-1. Configuration of Vehicle Driving Apparatus]

The configuration of vehicle driving apparatus 5C according to Embodiment 3 will first be described with reference to FIGS. 21 to 23.

Figure 21:
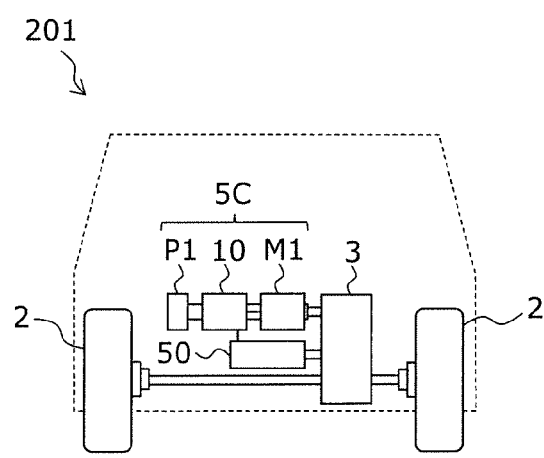
FIG. 21 is a diagram showing an example of an electric vehicle including a vehicle driving apparatus according to Embodiment 3.

FIG. 21 shows an example of electric vehicle 201 including vehicle driving apparatus 5C according to Embodiment 3. Electric vehicle 201 includes driving wheels 2, power transmission mechanism 3, and vehicle driving apparatus 5C. Vehicle driving apparatus 5C includes permanent magnet motor M1, inverter 10, and battery P1. Vehicle driving apparatus 5C further includes torque imparting apparatus 50, which includes at least one of an engine, such as an internal combustion engine, a transmission, and a brake. The following description will be made of a case where torque imparting apparatus 50 is an engine. Permanent magnet motor M1 is hereinafter referred to as motor M1 in some cases.

Motor M1 is a three-phase AC motor that drives driving wheels 2 of electric vehicle 201 and uses, for example, a motor such as a magnet embedded synchronous motor, a surface mounted magnet synchronous motor, or the like.

Power transmission mechanism 3 is formed, for example, of a differential gear and a drive shaft and transmits power between motor M1 and torque imparting apparatus 50 (engine) and driving wheels 2. The rotational force produced by motor M1 and torque imparting apparatus 50 is transmitted to driving wheels 2 via power transmission mechanism 3. Similarly, the rotational force produced by driving wheels 2 is transmitted to motor M1 and torque imparting apparatus 50 via power transmission mechanism 3.

Battery P1 is, for example, a DC power source, such as a lithium ion battery. Battery P1 supplies electric power for driving motor M1 and accumulates the electric power.

Inverter 10 converts the DC electric power supplied from battery P1, for example, Into three-phase AC electric power and supplies motor M1 with the AC electric power to drive and control motor M1.

Torque imparting apparatus 50 is an apparatus for imparting torque to driving wheels 2 and is an engine in the description. An engine control unit (not shown) provided in torque imparting apparatus 50 is communicably connected to inverter 10. The engine control unit in torque imparting apparatus 50 may instead be connected to inverter 10 via an engine control unit (ECU) of electric vehicle 201.

In a case where torque imparting apparatus 50 is a brake, inverter 10 is communicably connected to a brake control unit. In this case, the brake is so controlled that braking torque is output to driving wheels 2. In a case where torque imparting apparatus 50 is a transmission, inverter 10 is communicably connected to a transmission control unit. In this case, the transmission is so controlled (a gear in the transmission is so changed to a lower gear) that braking torque is output to driving wheels 2.

For example, when the three-phase short circuit control is performed in motor M1 that is performing regenerating operation, torque imparting apparatus 50 outputs torque for braking (engine braking) In response to an instruction from inverter 10. The torque output from torque imparting apparatus 50 is transmitted to driving wheels 2 via power transmission mechanism 3. Since torque imparting apparatus 50 is linked to motor M1 via power transmission mechanism 3, the sum of the regenerative torque from motor M1 that is performing regenerating operation and the braking torque from torque imparting apparatus 50 is output to driving wheels 2.

Vehicle driving apparatus 5C does not necessarily have the configuration described above. For example, vehicle driving apparatus 5C may include only motor M1, and inverter 10, battery P1, and torque imparting apparatus 50 may be provided as components external to vehicle driving apparatus 5C. Further, electric vehicle 201 does not necessarily have the linkage structure described above. For example, electric vehicle 201 may not include power transmission mechanism 3 but may have a structure in which motor M1 is directly linked to driving wheels 2 or a structure in which torque imparting apparatus 50 is directly linked to driving wheels 2.

Inverter 10, which drives and controls motor M1, will be described below in detail.

Figure 22:
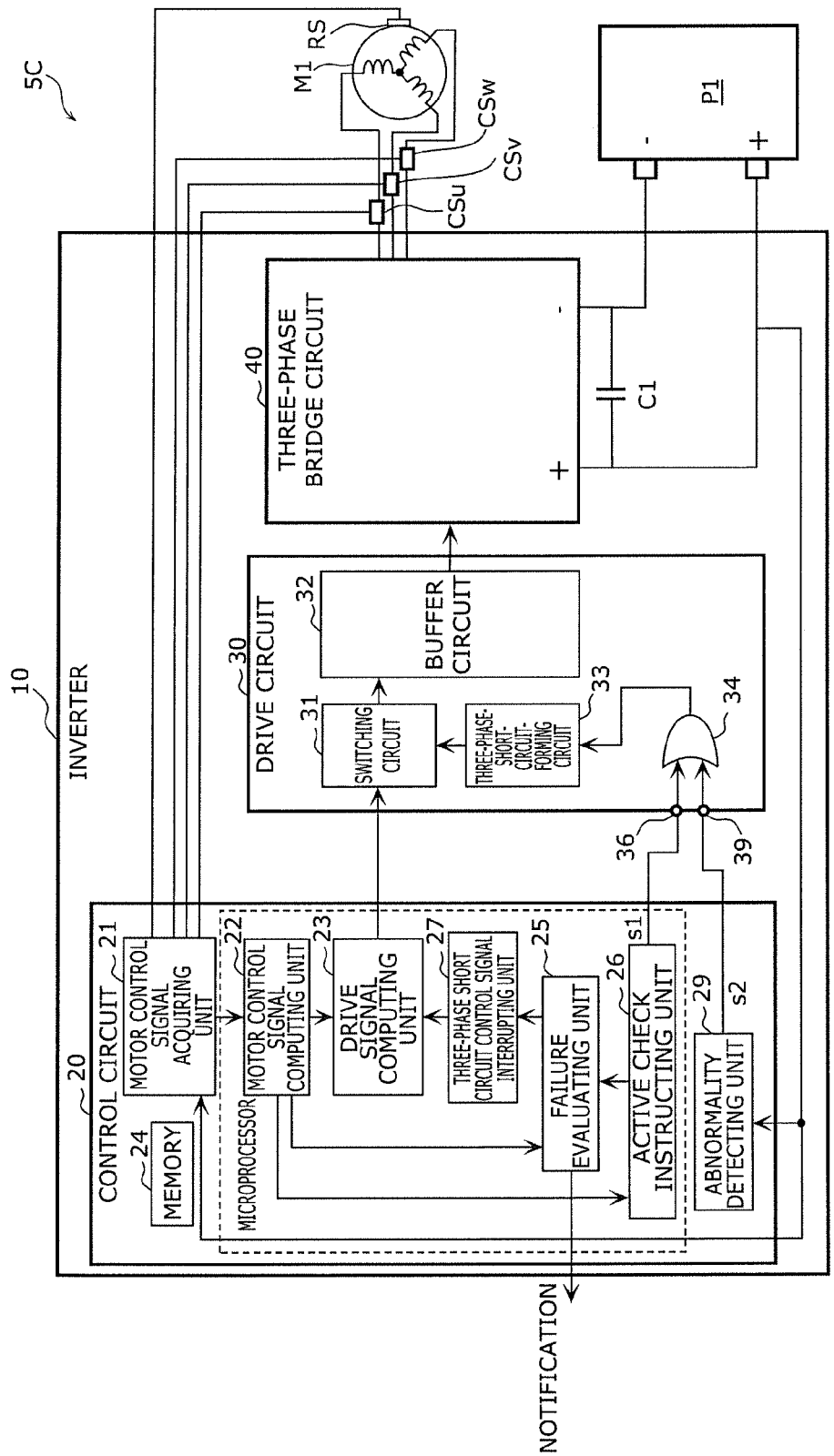
FIG. 22 is a circuit diagram showing an example of an inverter, a permanent magnet motor, and a battery of the vehicle driving apparatus according to Embodiment 3.

FIG. 22 is a circuit diagram showing an example of inverter 10, permanent magnet motor M1, and battery P1 of vehicle driving apparatus 5C.

Vehicle driving apparatus 5C includes motor M1, inverter 10, and battery P1, as shown in FIG. 22. Inverter 10 includes three-phase bridge circuit 40, drive circuit 30, and control circuit 20. FIG. 22 also shows smoothing capacitor C1, which smoothens voltage applied to three-phase bridge circuit 40.

Three-phase bridge circuit 40 is a circuit that performs a switching action to convert the DC electric power supplied from battery P1 Into three-phase AC electric power and supplies motor M1 with the AC electric power to drive motor M1. Three-phase bridge circuit 40 has a switching action control Input side connected to drive circuit 30, an electric power Input side connected to battery P1, and an output side connected to motor M1. It is noted that when motor M1 performs regeneration, regenerative current is introduced from the output side of three-phase bridge circuit 40 and flows toward the electric power input side. In the description, however, the side to which battery P1 is connected is defined as the input side, and the side to which motor M1 is connected is defined as the output side.

Figure 23:
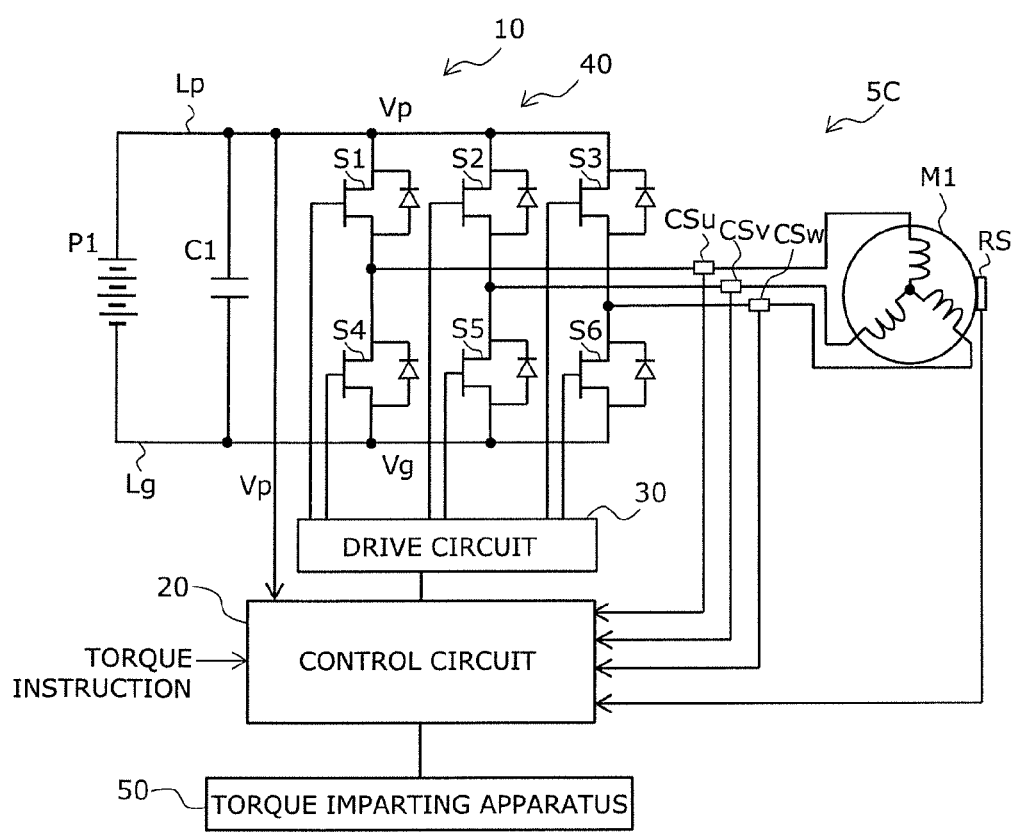
FIG. 23 is a circuit diagram showing an example of a three-phase bridge circuit provided in the inverter of the vehicle driving apparatus according to Embodiment 3.

FIG. 23 is a circuit diagram showing an example of three-phase bridge circuit 40 provided in inverter 10 of vehicle driving apparatus 5C. In FIG. 23, voltage Vp is power source voltage, and voltage Vg is ground voltage.

Three-phase bridge circuit 40 includes switch elements S1, S2, and S3, which are provided in an upper arm group located on the upper side of FIG. 23, and switch elements S4, S5, and S6, which are provided in a lower arm group located on the lower side of FIG. 23. For example, switch elements S1 to S6 are each formed, for example, of a field effect transistor (FET) or an insulated gate bipolar transistor (IGBT). Switch elements S1 to S6 may Instead each be made of a wide bandgap semiconductor.

Switch elements S1, S2, and S3 are connected to three output wires drawn from three terminals of motor M1 and to power source wire Lp connected to the anode of battery P1 and are located between the three output wires and power source wire Lp. Switch elements S4, S5, and S6 are connected to the three output wires described above and to ground wire Lg connected to the cathode of battery P1 and located therebetween. A freewheel diode is connected to each of switch elements S1 to S6 in parallel thereto. The freewheel diodes may Instead be parasitic diodes parasitic on switch elements S1 to S6.

Switch elements S1 to S6 are connected to drive circuit 30 and driven by signals output from drive circuit 30. Motor M1 is driven, for example, in the form of powering, regenerating, or coasting operation based on the driven states of switch elements S1 to S6.

Drive circuit 30 will next be described with reference to FIG. 22.

Drive circuit 30 is a circuit that drives switch elements S1 to S6 In three-phase bridge circuit 40 to perform the three-phase PWM control and the three-phase short circuit control. Drive circuit 30 has an input side connected to control circuit 20 and an output side connected to three-phase bridge circuit 40.

Drive circuit 30 includes switching circuit 31, buffer circuit 32, three-phase-short-circuit-forming circuit 33, and OR circuit 34. Drive circuit 30 further includes check terminal 36 and abnormality accepting terminal 39.

Abnormality accepting terminal 39 is a terminal that accepts abnormality accepting terminal s2, which notifies an abnormal state of inverter 10. Abnormality signal s2 is output from abnormality detecting unit 29, which will be described later, to drive circuit 30.

Check terminal 36 is a terminal that accepts active check signal s1, which causes three-phase-short-circuit-forming circuit 33 to perform the three-phase short circuit control. Active check signal s1 is output from control circuit 20 to drive circuit 30. In the following description, causing three-phase-short-circuit-forming circuit 33 to attempt the three-phase short circuit control and checking whether or not three-phase-short-circuit-forming circuit 33 can perform the three-phase short circuit control is called an active check. Making the active check allows diagnosis of whether or not three-phase-short-circuit-forming circuit 33 has failed.

The signals input to check terminal 36 and abnormality accepting terminal 39 are input to OR circuit 34. OR circuit 34 outputs a signal to three-phase-short-circuit-forming circuit 33 in a case where at least one of check terminal 36 and abnormality accepting terminal 39 has accepted the corresponding signal. Three-phase-short-circuit-forming circuit 33 is driven based on the signal output from OR circuit 34. In other words, three-phase-short-circuit-forming circuit 33 is driven based on the abnormality detection input signal and the active check input signal.

Three-phase-short-circuit-forming circuit 33 is a circuit used to cause the three phases of motor M1 to form short circuits. Specifically, three-phase-short-circuit-forming circuit 33 is a circuit that causes, out of switch elements S1 to S3 in the upper arm group and switch elements S4 to S6 in the lower arm group of three-phase bridge circuit 40, the switch elements in one of the arm groups to form short circuits and the switch elements in the other arm group to open based on the signal output from OR circuit 34. Causing the three phases of motor M1 to form short circuits as described above allows the induced voltage from the gap between the winding coils of motor M1 to be zero. As a result, for example, in a case where overvoltage is detected in three-phase bridge circuit 40, three-phase-short-circuit-forming circuit 33 can be caused to operate and perform the three-phase short circuit control to lower the overvoltage applied to three-phase bridge circuit 40.

Switching circuit 31 is a circuit that switches a state in which three-phase bridge circuit 40 is driven based on a drive signal output from drive signal computing unit 23, which will be described later, to a state in which three-phase bridge circuit 40 is driven by using a signal output from three-phase-short-circuit-forming circuit 33 and vice versa. The drive signal output from drive signal computing unit 23 contains a variety of signals, such as a signal that causes three-phase PWM control to be performed on three-phase bridge circuit 40. The switching performed by switching circuit 31 is achieved, for example, by a hardware logic circuit. Switching circuit 31 in the present embodiment switches switching control performed by motor M1 to the three-phase short circuit control performed by three-phase-short-circuit-forming circuit 33 when drive circuit 30 accepts active check signal s1 via check terminal 36.

Buffer circuit 32 is a circuit that amplifies an output signal to be output to three-phase bridge circuit 40 in such a way that three-phase bridge circuit 40 can drive switch elements S1 to S6. The output signal amplified by buffer circuit 32 can drive three-phase bridge circuit 40.

Control circuit 20 will next be described with reference to FIG. 22.

Control circuit 20 includes a microprocessor that performs, for example, a variety of type of computation and memory 24, which stores, for example, a program or information for operating the microprocessor.

Control circuit 20 includes motor control signal acquiring unit 21, motor control signal computing unit 22, drive signal computing unit 23, active check instructing unit 26, failure evaluating unit 25, and three-phase short circuit control signal interrupting unit 27, as shown in FIG. 22. Control circuit 20 further includes abnormality detecting unit 29.

Motor control signal acquiring unit 21 acquires information sensed by a variety of sensors, such as current sensors CSu, CSv, and CSw, which each sense current flowing through motor M1, and rotational position sensor RS, which detects the magnetic pole positions of motor M1 to sense the rotational position. Current sensors CSu, CSv, and CSw are sensors that sense the current values in the phases u, v, and w of motor M1. Motor control signal acquiring unit 21 further acquires information on voltage Vp across power source wire Lp. Motor control signal acquiring unit 21 still further acquires control instruction information, such as a torque Instruction output from a component external to control circuit 20, for example, an electronic control unit (ECU) of electric vehicle 201.

Motor control signal computing unit 22 converts the value of the torque instruction into current through computation based on the information acquired by motor control signal acquiring unit 21 and outputs a control signal for performing current control on motor M1. For example, motor control signal computing unit 22 outputs the control signal for performing current control on motor M1 in such a way that the torque produced by motor M1 when vehicle driving apparatus 5C is driven is equal to target torque indicated by the torque instruction information (for example, torque according to the amount of operated accelerator pedal or brake pedal of electric vehicle 201).

Further, motor control signal computing unit 22 converts the information acquired by motor control signal acquiring unit 21 through computation and outputs a control signal for making the active check and failure evaluation. For example, motor control signal computing unit 22 converts the control instruction information, such as the torque instruction, into the control signal described above and outputs the control signal to drive signal computing unit 23 and active check instructing unit 26. Moreover, motor control signal computing unit 22 converts information, such as current flowing through motor M1, the rotational positions of the magnetic poles of motor M1, and voltage Vp across power source wire Lp, into control signals and outputs the control signal to drive signal computing unit 23 and failure evaluating unit 25.

Active check instructing unit 26 is a circuit that outputs active check signal s1 to check terminal 36. The active check refers to causing three-phase-short-circuit-forming circuit 33 to attempt the three-phase short circuit control and checking whether or not three-phase-short-circuit-forming circuit 33 can perform the three-phase short circuit control, as described above. Active check instructing unit 26 evaluates based on the control signals output from motor control signal computing unit 22 whether or not the active check made at the current timing affects the driven state of vehicle driving apparatus 5C.

For example, active check instructing unit 26 determines that the active check is made when motor M1 is performing the regenerating operation and the following conditions are satisfied. Evaluation of whether or not the active check can be made is performed at regular time intervals. Evaluation of whether or not the active check is made may not necessarily be performed by active check instructing unit 26 and may instead be performed by a circuit different from active check instructing unit 26 but is provided in control circuit 20.

Processes carried out by control circuit 20 before active check signal s1 is output will now be described with reference to FIGS. 24 and 25. The processes are carried out to prevent the torque produced in the three-phase short circuit control from causing the user to feel discomfort.

Figure 24:
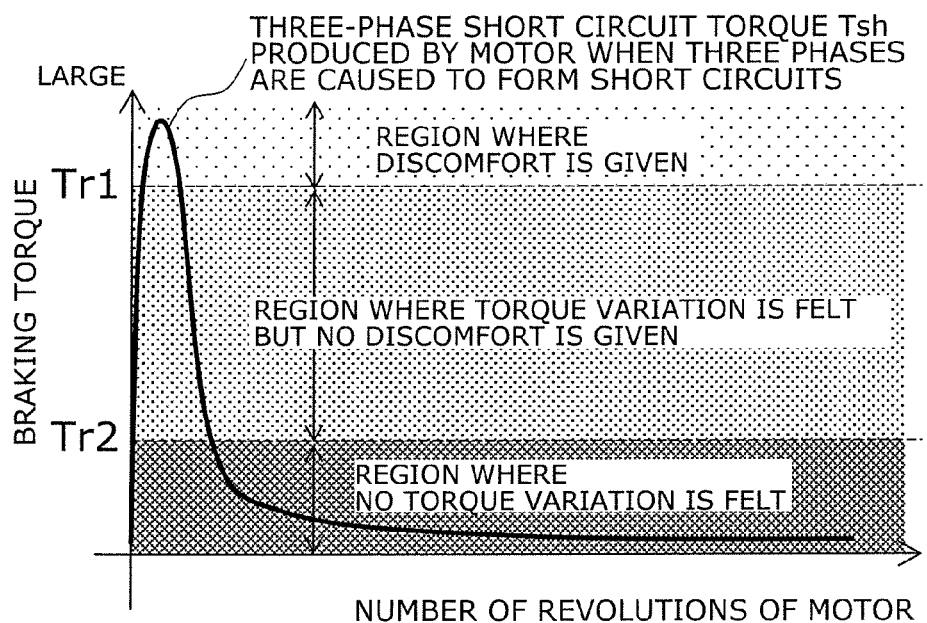
FIG. 24 is a graph showing the torque produced when the three phases of permanent magnet motor in the vehicle driving apparatus according to Embodiment 3 are caused to form short circuits.

FIG. 24 shows the torque produced when the three phases of permanent magnet motor M1 In vehicle driving apparatus 5C are caused to form short circuits. FIG. 25 shows assistance torque Tas Imparted to vehicle driving apparatus 5C. FIGS. 24 and 25 each show that braking torque increases in the direction toward the positive side (upper side) of the vertical axis of FIGS. 24 and 25. The vertical axes of FIGS. 24 and 25 show first specified torque Tr1 and second specified torque Tr2, which is smaller than first specified torque Tr1.

FIG. 24 shows that when the torque produced by motor M1 is smaller than second specified torque Tr2, the user feels no torque variation, that when the torque produced by motor M1 is greater than or equal to second specified torque Tr2 but smaller than or equal to first specified torque Tr1, the user feels the torque variation but feels no discomfort, and that when the torque produced by motor M1 is greater than first specified torque Tr1, the user feels discomfort. First specified torque Tr1 and second specified torque Tr2 each have a value determined based on the braking acceleration acting on electric vehicle 201 with respect to the gravitational acceleration (G). For example, first specified torque Tr1 is torque produced when the braking acceleration acting on electric vehicle 201 is −0.05 times the gravitational acceleration (−0.05 G: in the following description, it is hereinafter defined that the sign is negative because the situation of Interest is a braking situation), and second specified torque Tr2 is torque produced when the braking acceleration acting on electric vehicle 201 is −0.03 times the gravitational acceleration (−0.03 G).

Figure 25:
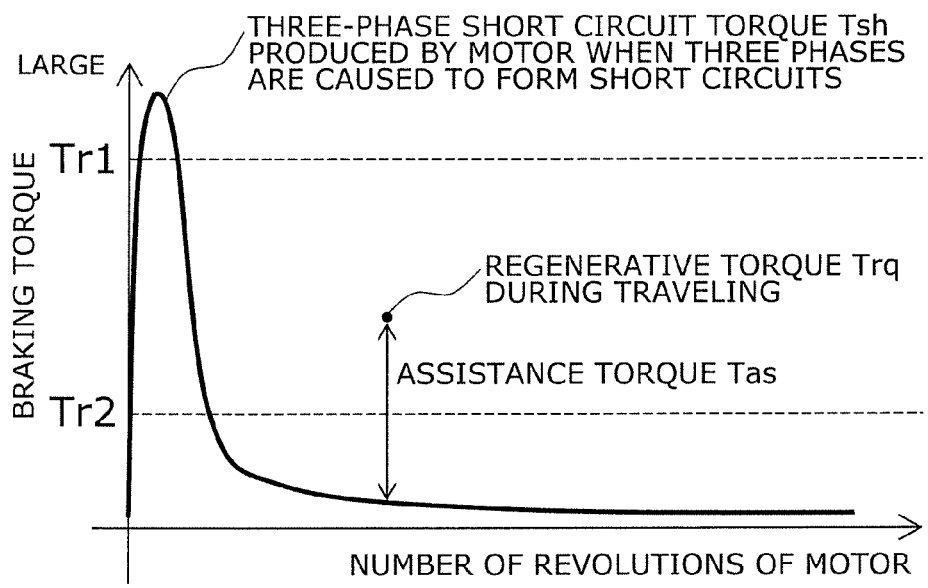
FIG. 25 is a graph showing assistance torque imparted to the vehicle driving apparatus according to Embodiment 3.

FIGS. 24 and 25 further show three-phase short circuit torque Tsh, which is torque produced by motor M1 when the three-phase short circuit control is performed. Three-phase short circuit torque Tsh is expressed by (Expression 12) described above.

[Math. 13]

$$T_{sh} = -\frac{P_n R_a}{\omega}(I_d^2 + I_q^2) \qquad \text{(Expression 12)}$$

In (Expression 12), Pn represents the number of pole pair, Ra represents the phase resistance, a represents the angular velocity (number of revolutions, rotational speed), Id represent the d-axis current, and Iq represent the q-axis current. The values Pn and Ra are each a characteristic value of motor M1. The value ω is determined based on the value from rotational position sensor RS. The value ω is converted into the rotational speed (number of revolutions) of motor M1 by multiplying ω by 60/(2π·Pn). The values Id and Iq are determined based on (Expression 1) and (Expression 2) described above. (Expression 12) is stored in memory 24 and read as required.

Three-phase short circuit torque Tsh depends on the number of revolutions of motor M1 so that three-phase short circuit torque Tsh is small in a region where the number of revolutions of motor M1 is large and three-phase short circuit torque Tsh has a local maximum in a region where the number of revolutions of motor M1 is small, as shown in FIGS. 24 and 25. In Embodiment 3, the value of three-phase short circuit torque Tsh is used to evaluate whether or not the active check should be made at the current timing.

For example, when control circuit 20 determines that the active check should be made based on three-phase short circuit torque Tsh during the regenerating operation of motor M1, control circuit 20 outputs active check signal s1. Specifically, control circuit 20 outputs active check signal s1 when three-phase short circuit torque Tsh is smaller than or equal to first specified torque Tr1. Vehicle driving apparatus 5C is configured to make the active check after performing the three-phase short circuit control when the torque produced when the three-phase short circuit control is performed is not too large. Vehicle driving apparatus 5C, which outputs active check signal s1 when three-phase short circuit torque Tsh is smaller than or equal to first specified torque Tr1, has a configuration in which variation in the torque of motor M1 is unlikely to Increase, for example, even in the case where three-phase-short-circuit-forming circuit 33 has failed.

In Embodiment 3, when the active check is made, assistance torque Tas is so output that the variation in torque of motor M1 decreases. Assistance torque Tas is a torque intended to reduce the variation in the torque of motor M1 produced when the three-phase short circuit control is performed. Specifically, when three-phase short circuit torque Tsh is greater than or equal to second specified torque Tr2 but smaller than or equal to first specified torque Tr1, control circuit 20 controls torque imparting apparatus 50 in such a way that assistance torque Tas according to the torque difference between regenerative torque Trq produced when motor M1 is performing regenerating operation (see FIG. 25) and the three-phase short circuit torque Tsh described above is imparted to motor M1.

For example, when three-phase short circuit torque Tsh is smaller than regenerative torque Trq, control circuit 20 controls torque imparting apparatus 50 in such a way that assistance torque Tas (braking torque) that is the result of subtraction of three-phase short circuit torque Tsh from regenerative torque Trq is imparted to motor M1, as shown in FIG. 25. The position of regenerative torque Trq shown in FIG. 25 is determined by the torque instruction output from the ECU and the number of revolutions of motor M1. When three-phase short circuit torque Tsh is greater than regenerative torque, control circuit 20 controls torque imparting apparatus 50 in such a way that assistance torque (braking torque) that is the result of subtraction of regenerative torque from three-phase short circuit torque Tsh is Imparted to motor M1 (not shown). Vehicle driving apparatus 5C is configured to reduce variation in the torque produced by motor M1 when the three-phase short circuit control is performed.

As described above, control circuit 20 evaluates whether or not the active check is made and outputs active check signal s1 after control circuit 20 determines that the active check should be made. Control circuit 20 outputs the busy signal representing that the active check is being made simultaneously with outputting active check signal s1 to failure evaluating unit 25.

The configuration of control circuit 20 will continuously be described with reference to FIG. 22.

Failure evaluating unit 25 is a circuit that evaluates whether or not three-phase-short-circuit-forming circuit 33 has failed. Failure evaluating unit 25 acquires information on a change that occurs when the three-phase short circuit control is performed in at least one of current flowing through the three phases of motor M1, the current phase, and DC voltage applied to three-phase bridge circuit 40. A change in the current can be determined based on a current value detected with each of current sensors CSu, CSv, and CSw. A change in the current phase can be determined based, for example, on d-axis current and q-axis current of motor M1. The d-axis current and q-axis current can be determined based on a current value detected with each of current sensors CSu, CSv, and CSw and the rotational positions of the magnetic poles detected with rotational position sensor RS. A change in the DC voltage can be determined by detecting voltage Vp across power source wire Lp.

Failure evaluating unit 25 evaluates whether or not the three-phase-short-circuit-forming circuit has failed based on the acquired information described above. For example, failure evaluating unit 25 determines that three-phase-short-circuit-forming circuit 33 has failed in at least one of a case where the current does not fall within a specified range, a case where the current phase does not fall within a specified range, and a case where the DC voltage does not fall within a specified range. Having determined that three-phase-short-circuit-forming circuit 33 has failed, failure evaluating unit 25 outputs a notification signal that notifies an external component of information on the failure.

Abnormality detecting unit 29 is a circuit that detects abnormality that occurs in inverter 10, such as overvoltage. The following description will be made on the assumption that abnormality detecting unit 29 is a circuit that detects overvoltage that occurs due, for example, to a defect, such as disconnection of power source wire Lp, or failure of switch elements S1 to S6, current sensors CSu, CSv, and CSw, rotational position sensor RS, and other components. Abnormality detecting unit 29 is connected to power source wire Lp of three-phase bridge circuit 40 on the positive side of battery P1. When abnormality detecting unit 29 detects abnormality (overvoltage in the description), abnormality signal s2 is output to abnormality accepting terminal 39. Since abnormality signal s2 causes three-phase-short-circuit-forming circuit 33 to perform the three-phase short circuit control, the overvoltage applied to three-phase bridge circuit 40 can be suppressed.

The overvoltage presented in the description, which is abnormality detected by abnormality detecting unit 29, can occur, for example, when the positive-side wiring of battery P1 comes off or is disconnected or a main relay that is not shown but is provided in battery P1 is opened. Since abnormality detecting unit 29 and drive circuit 30 (including three-phase-short-circuit-forming circuit 33) are each formed of hardware, emergency actions from detection of abnormality by abnormality detecting unit 29 to the three-phase short circuit control by three-phase-short-circuit-forming circuit 33 are automatically and quickly performed. Abnormality detecting unit 29 need not necessarily be provided inside control circuit 20 and may be so provided externally of control circuit 20. Abnormality detecting unit 29 does not necessarily have the overvoltage detecting configuration and may have a configuration that directly detects output abnormality (such as output voltage that does not fall within predetermined range) of any of current sensors CSu, CSv, and CSw, rotational position sensor RS, and other sensors.

Drive signal computing unit 23 computes a drive signal required to drive motor M1 based on the control signals output from motor control signal computing unit 22 and outputs the drive signal to drive circuit 30. Drive signal computing unit 23 outputs a drive signal for performing the three-phase PWM control when vehicle driving apparatus 5C is normally driven.

When abnormality of inverter 10 is detected and when failure evaluating unit 25 determines that three-phase-short-circuit-forming circuit 33 has failed, drive signal computing unit 23 outputs a drive signal for performing the three-phase short circuit control based on the program stored in memory 24.

The three-phase short circuit control performed based on the program is performed by three-phase short circuit control signal interrupting unit 27. Specifically, once failure information is received from failure evaluating unit 25 indicating that three-phase-short-circuit-forming circuit 33 has failed, three-phase short circuit control signal Interrupting unit 27 outputs an interrupt signal for performing the three-phase short circuit control to drive signal computing unit 23 when abnormality of inverter 10 is detected. Upon reception of the interrupt signal, drive signal computing unit 23 changes a three-phase PWM control drive signal to a three-phase short circuit control drive signal and outputs the drive signal to drive circuit 30.

As described above, control circuit 20 outputs drive signals for performing the three-phase PWM control and the three-phase short circuit control to drive circuit 30. Drive circuit 30 selects one of the drive signal output from control circuit 20 and the signal output from three-phase-short-circuit-forming circuit 33 and outputs the selected signal to three-phase bridge circuit 40. Three-phase bridge circuit 40 drives motor M1 based on a signal output from drive circuit 30.

Part of the processes carried out by control circuit 20 before active check signal s1 described above is output may be carried out by drive signal computing unit 23. For example, drive signal computing unit 23 may compute assistance torque Tas according to the torque difference between regenerative torque Trq and three-phase short circuit torque Tsh. Drive signal computing unit 23 may convert computed assistance torque Tas into a drive signal for controlling torque imparting apparatus 50 and output the drive signal to torque imparting apparatus 50 as required.

Vehicle driving apparatus 5C according to Embodiment 3 includes inverter 10, which drives permanent magnet motor M1. Inverter 10 includes three-phase bridge circuit 40 including the plurality of switch elements S1 to S6, drive circuit 30 connected to three-phase bridge circuit 40, control circuit 20 connected to drive circuit 30, and abnormality detecting unit 29, which detects abnormality of inverter 10. Drive circuit 30 includes three-phase-short-circuit-forming circuit 33, which causes the three phases of permanent magnet motor M1 to form short circuits, abnormality accepting terminal 39, which accepts abnormality signal s2 output from abnormality detecting unit 29, and check terminal 36, which accepts active check signal s1 for performing the three-phase short circuit control performed by three-phase-short-circuit-forming circuit 33. Control circuit 20 outputs active check signal s1 to check terminal 36 based on three-phase short circuit torque Tsh, which is the torque produced by permanent magnet motor M1 when the three-phase short circuit control is performed during the regenerating operation of permanent magnet motor M1.

As described above, the configuration in which control circuit 20 outputs active check signal s1 based on three-phase short circuit torque Tsh allows drive circuit 30 to accept as appropriate active check signal s1 via check terminal 36. Active check signal s1 allows vehicle driving apparatus 5C to check as appropriate whether or not three-phase-short-circuit-forming circuit 33 can perform the three-phase short circuit control. Further, outputting active check signal s1 during the regenerating operation of motor M1 allows an increase in the number of opportunities of checking whether or not the three-phase short circuit control can be performed, as compared, for example, with the case where active check signal s1 is output only when motor M1 is performing no regenerating operation. Reliable vehicle driving apparatus 5C in which potential failure of the three-phase short circuit control is located in inverter 10 at an early stage can therefore be provided.

[3-2. Action of Vehicle Driving Apparatus]

The action of vehicle driving apparatus 5C will next be described with reference to FIGS. 26 to 28.

Figure 26:
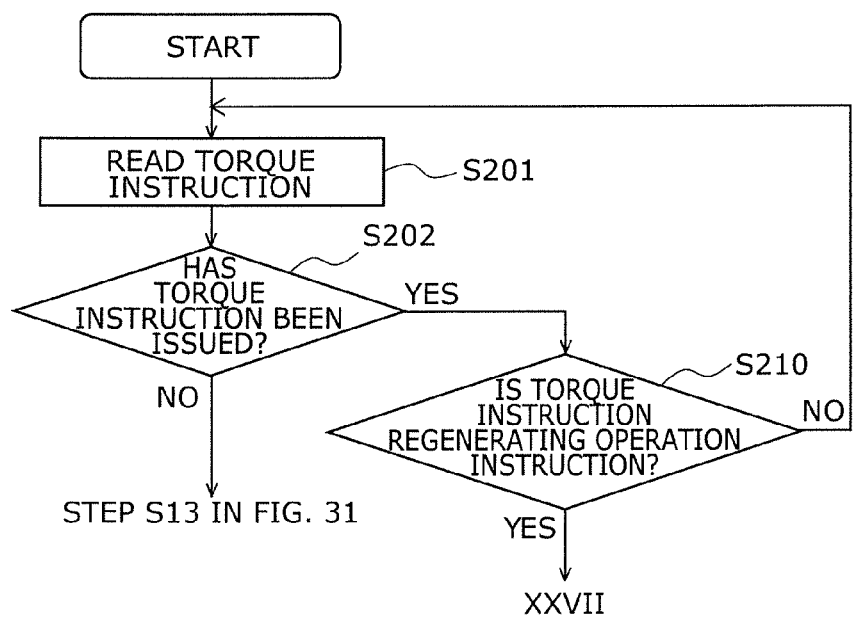
FIG. 26 is a flowchart showing an example of the action of the vehicle driving apparatus according to Embodiment 3.

FIG. 26 is a flowchart showing an example of the action of vehicle driving apparatus 5C. FIG. 27 is a flowchart showing the example of the action of vehicle driving apparatus 5C following the flowchart of FIG. 26. FIG. 28 is a flowchart showing the example of the action of vehicle driving apparatus 5C following the flowchart of FIG. 27.

The active check in vehicle driving apparatus 5C according to Embodiment 3 can be made during the regenerating operation of motor M1. Vehicle driving apparatus 5C computes the torque produced when the three phases are caused to form short circuits before the active check is made and evaluates whether or not the active check should be performed at the current timing. The active check is then made after it is determined that making the active check causes no problem. The action of vehicle driving apparatus 5C will be sequentially described below.

Vehicle driving apparatus 5C is first activated and is in operation.

In this state, control circuit 20 reads the torque instruction from an external component (step S201). Specifically, motor control signal acquiring unit 21 reads the torque instruction information output from the ECU of electric vehicle 201.

Control circuit 20 then evaluates whether or not the torque instruction has been issued (step S202). A case where the result of the evaluation in step S202 shows that no torque instruction has been issued corresponds to the state in which vehicle driving apparatus 5C is performing no powering or regenerating operation, and control circuit 20 proceeds to the three-phase short circuit control shown in Variation 2 of Embodiment 3 (step S13 and the following steps in FIG. 31). On the other hand, a case where the result of the evaluation in step S202 shows that the torque instruction has been issued corresponds to the state in which vehicle driving apparatus 5C is performing the powering or regenerating operation, and control circuit 20 proceeds to step S210.

Control circuit 20 then evaluates whether or not vehicle driving apparatus 5C has received the regenerating operation instruction (step S210). Specifically, control circuit 20 evaluates whether vehicle driving apparatus 5C has received the regenerating operation instruction (negative) or the powering operation instruction (positive) based, for example, on the sign of the torque instruction, positive or negative.

For example, when control circuit 20 determines that vehicle driving apparatus 5C has received no regenerating operation instruction (No in S210), control circuit 20 determines that diagnosis of failure of three-phase-short-circuit-forming circuit 33 is not performed at the current timing and returns to step S201. On the other hand, when control circuit 20 determines that vehicle driving apparatus 5C has received the regenerating operation instruction, control circuit 20 determines that diagnosis of failure of three-phase-short-circuit-forming circuit 33 is performed at the current timing and proceeds to the following step.

Control circuit 20 then computes three-phase short circuit torque Tsh produced when the three phases are caused to form short circuits (step S211). Three-phase short circuit torque Tsh is computed by using (Expression 12) described above.

Control circuit 20 may not necessarily compute three-phase short circuit torque Tsh by using (Expression 12). For example, control circuit 20 may store a table that is a collection of actually measured data representing the relationship between the number of revolutions of motor M1 and three-phase short circuit torque Tsh in memory 24, and may determine three-phase short circuit torque Tsh according to the number of revolutions of motor M1 based on the collection table.

Control circuit 20 then computes assistance torque Tas according to the torque difference between regenerative torque Trq, which is the torque produced during regeneration performed by motor M1, and three-phase short circuit torque Tsh (step S212). Specifically, the torque difference between regenerative torque Trq and three-phase short circuit torque Tsh is determined, and the absolute value of the difference in torque is set to be assistance torque Tas. Step S212 may be carried out between steps S212A and S212B, which will be described later, or may be carried out between steps S212B and S212C, which will be described later.

Control circuit 20 then evaluates whether or not three-phase short circuit torque Tsh is smaller than or equal to first specified torque Tr1 (step S212A). In a case where three-phase short circuit torque Tsh is greater than first specified torque Tr1 (No in S212A), performing the three-phase short circuit control results in large braking acceleration acting on electric vehicle 201 due to three-phase short circuit torque Tsh. Since the large braking acceleration causes the user who uses vehicle driving apparatus 5C to feel discomfort, no failure diagnosis is therefore performed at the current timing, and control circuit 20 returns to step S201. On the other hand, in a case where three-phase short circuit torque Tsh is smaller than or equal to first specified torque Tr1 (Yes in S212A), performing the three-phase short circuit control does not cause the user to feel discomfort, and control circuit 20 therefore proceeds to the following step.

Control circuit 20 then evaluates whether or not three-phase short circuit torque Tsh is greater than or equal to second specified torque Tr2 (step S212B). For example, in a case where three-phase short circuit torque Tsh is greater than or equal to second specified torque Tr2 (Yes in S212B), control circuit 20 performs controlled output of assistance torque Tas determined in step S212 (step S212C) and proceeds to step S213. The controlled output of assistance torque Tas is performed by control circuit 20 outputting a drive signal based on assistance torque Tas to torque imparting apparatus 50.

On the other hand, in a case where three-phase short circuit torque Tsh is smaller than second specified torque Tr2 (No in S212B), performing the three-phase short circuit control causes the user to feel no torque variation, and control circuit 20 performs no controlled output of assistance torque Tas and proceeds to step S213.

Control circuit 20 then terminates feedback control performed on inverter 10 (step S213). Specifically, drive signal computing unit 23 stops outputting the drive signal for performing the three-phase PWM control. The controlled output of assistance torque Tas shown in step S212C may be performed simultaneously with step S213.

Control circuit 20 outputs active check signal s1 (step S214). Specifically, active check instructing unit 26 outputs active check signal s1 to check terminal 36 of drive circuit 30. Active check signal s1 is continuously output until it is stopped in step S218 or S221, which will be described later.

Inverter 10 then performs the three-phase short circuit control using three-phase-short-circuit-forming circuit 33 (step S215). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5C (step S216). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S217). Specifically, failure evaluating unit 25 evaluates whether or not the current does not fall within the specified range thereof, the current phase does not fall within the specified range thereof, and the DC voltage does not fall within the specified range thereof.

In a case where failure evaluating unit 25 determines that the changes in the current, the current phase, and the voltage all fall within the specified ranges (Yes in S217), failure evaluating unit 25 determines that three-phase-short-circuit-forming circuit 33 has not failed and is normally operating. Control circuit 20 then stops outputting active check signal s1 output from active check instructing unit 26 (step S218). In the case where the controlled output of assistance torque Tas has been performed in step S212C, the controlled output of assistance torque Tas is terminated at this timing (step S218A), and the feedback control performed on inverter 10 is resumed (step S219). Control circuit 20 then returns to step S201 and repeats the active check. The active check is repeatedly performed at predetermined time intervals when motor M1 is performing the regenerating operation.

On the other hand, at least one of the changes in the current, the current phase, and the voltage does not fall within the corresponding specified range in step S217 (No in step S217), control circuit 20 determines that three-phase-short-circuit-forming circuit 33 has failed. Control circuit 20 then performs actions to be performed when three-phase-short-circuit-forming circuit 33 has failed, as shown in FIG. 28.

Figure 28:
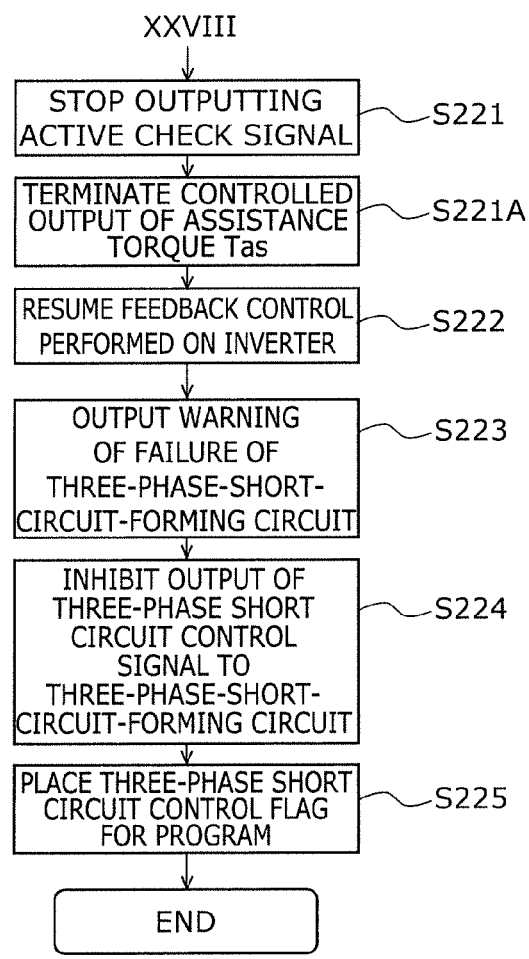
FIG. 28 is a flowchart showing the example of the action of the vehicle driving apparatus following the flowchart of FIG. 27.

Control circuit 20 stops outputting active check signal s1 output from active check instructing unit 26 (step S221), as shown in FIG. 28. In the case where the controlled output of assistance torque Tas has been performed in step S212C, the controlled output of assistance torque Tas is terminated (step S221A), and the feedback control performed on inverter 10 is resumed (step S222)

Control circuit 20 then outputs a failure warning representing that three-phase-short-circuit-forming circuit 33 has failed to an external component, for example, the ECU (upper-level control unit) of electric vehicle 201 (step S223). Failure evaluating unit 25 may notify the user of the failure information by displaying the failure information on a monitor or outputting a sound that informs the failure information via a loudspeaker.

Further, control circuit 20 inhibits output of the three-phase short circuit control signal to three-phase-short-circuit-forming circuit 33 (step S224). Specifically, control circuit 20 inhibits active check instructing unit 26 from outputting active check signal s1. Control circuit 20 places the flag representing the three-phase short circuit control (step S225). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5C.

Further, in the case where it is determined that three-phase-short-circuit-forming circuit 33 has failed and in the middle of operation of outputting active check signal s1, control circuit 20 may use the program stored in memory 24 in control circuit 20 to output the control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1 performs the powering operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[3-3. Variation 1 of Embodiment 3]

The configuration of vehicle driving apparatus 5Ca according to Variation 1 of Embodiment 3 will next be described with reference to FIGS. 29 and 30. In Variation 1, the description will be made of a case where vehicle driving apparatus 5Ca is provided with a plurality of permanent magnet motors M1. In this case, when the active check is made on three-phase-short-circuit-forming circuit 33 in inverter 10 connected to an arbitrary one of permanent magnet motors M1, any of the other permanent magnet motors M1 serves as torque imparting apparatus 50 shown in Embodiment 3.

Figure 29:
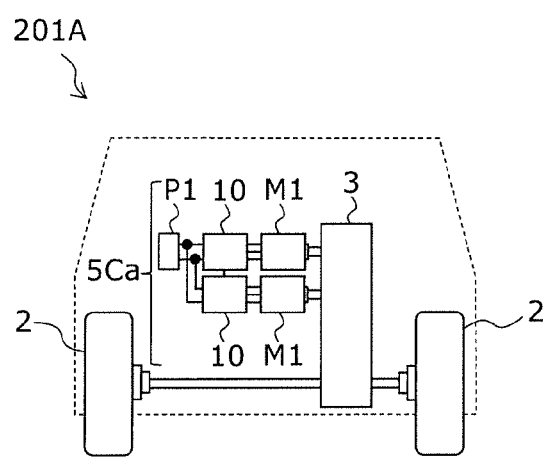
FIG. 29 is a diagram showing an example of an electric vehicle including a vehicle driving apparatus according to Variation 1 of Embodiment 3.

FIG. 29 shows an example of electric vehicle 201A Including vehicle driving apparatus 5Ca according to Variation 1. Electric vehicle 201A includes driving wheels 2, power transmission mechanism 3, two permanent magnet motors M1, two inverters 10, and battery P1. Out of the components described above, vehicle driving apparatus 5Ca includes two permanent magnet motors M1, two inverters 10, and battery P1.

Figure 30:
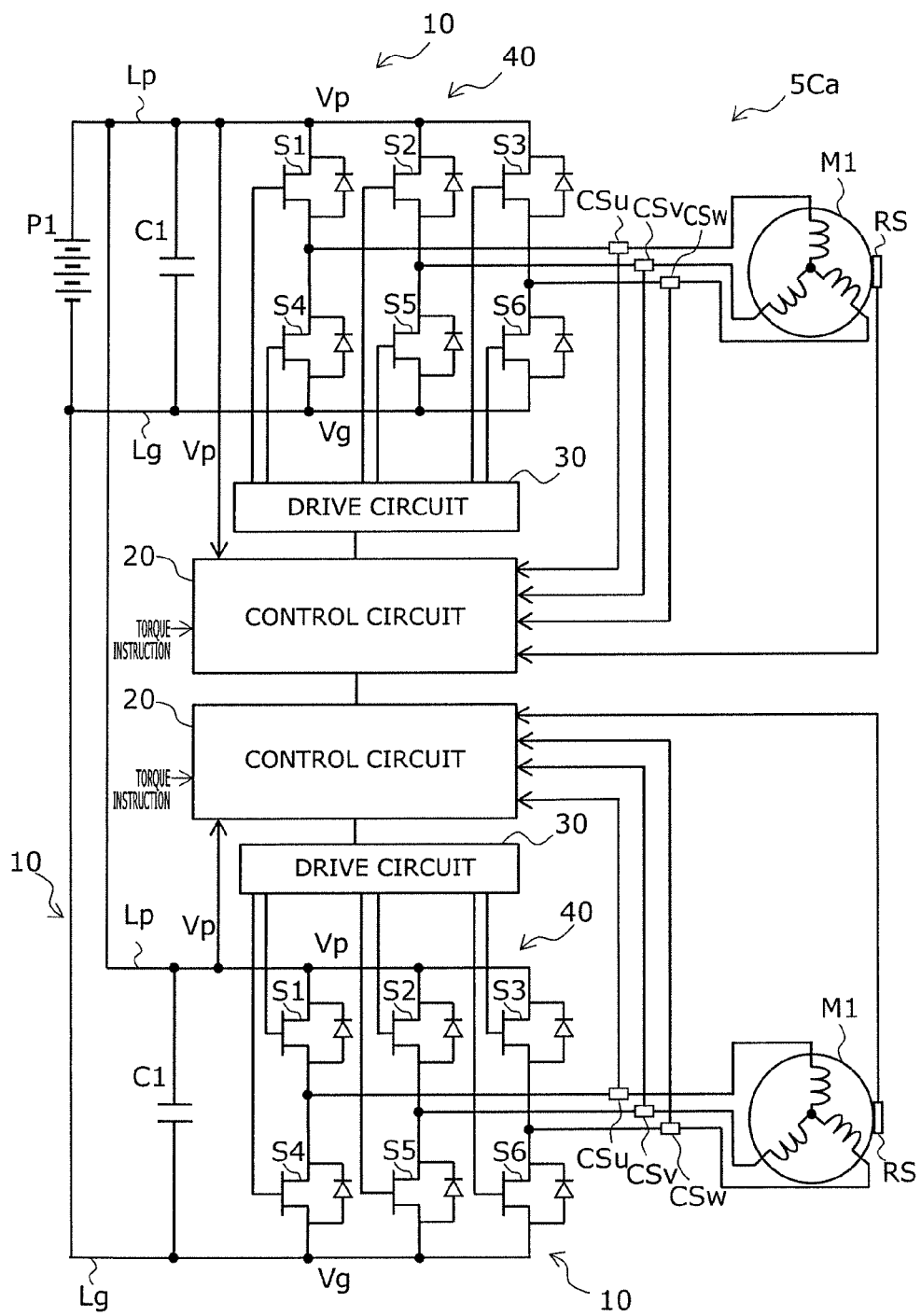
FIG. 30 is a circuit diagram showing an example of inverters, permanent magnet motors, and the battery of the vehicle driving apparatus according to Variation 1 of Embodiment 3.

FIG. 30 is a circuit diagram showing an example of inverters 10, permanent magnet motors M1, and battery P1 of vehicle driving apparatus 5Ca.

Vehicle driving apparatus 5Ca includes two motors M1, two inverters 10, and battery P1, as shown in FIG. 30. Inverters 10 each include three-phase bridge circuit 40, drive circuit 30, and control circuit 20.

Control circuits 20 each include motor control signal acquiring unit 21, motor control signal computing unit 22, drive signal computing unit 23, active check instructing unit 26, failure evaluating unit 25, and three-phase short circuit control signal interrupting unit 27. Control circuits 20 each further include abnormality detecting unit 29 (not shown). Control circuits 20 of inverters 10 are communicably connected to each other. FIG. 30 shows two control circuits 20, but not necessarily, and the control circuits may be replaced with one control circuit having the functions of two control circuits 20.

Drive circuit 30 has an input side connected to control circuit 20 and an output side connected to three-phase bridge circuit 40. Drive circuits 30 each include switching circuit 31, buffer circuit 32, three-phase-short-circuit-forming circuit 33, and OR circuit 34. Drive circuits 30 each further include check terminal 36 and abnormality accepting terminal 39 (not shown).

Three-phase bridge circuits 40 each include switch elements S1, S2, and S3 provided in an upper arm group and switch elements S4, S5, and S6 provided in a lower arm group. Switch elements S1 to S6 are connected to drive circuit 30 and driven by signals output from drive circuit 30. Motors M1 are each driven, for example, in the form of powering, regenerating, or coasting operation based on the driven states of switch elements S1 to S6.

Vehicle driving apparatus 5Ca according to Variation 1 includes two permanent magnet motors M1, one inverter 10 that drives one of two permanent magnet motors M1, and another inverter 10 that drives the other one of two permanent magnet motors M1. When three-phase short circuit torque Tsh, which is the torque produced by the one permanent magnet motor M1 when the three-phase short circuit control is performed, is greater than or equal to second specified torque Tr2 but smaller than or equal to first specified torque Tr1, control circuit 20 controls the other permanent magnet motor M1 in such a way that assistance torque Tas according to the torque difference between regenerative torque Trq produced when the one permanent magnet motor M1 is performing regenerating operation and the three-phase short circuit torque Tsh is Imparted to driving wheels 2 of electric vehicle 201A. For example, when three-phase short circuit torque Tsh is smaller than regenerative torque Trq, control circuit 20 controls the other permanent magnet motor M1 in such a way that assistance torque Tas (braking torque) that is the result of subtraction of three-phase short circuit torque Tsh from regenerative torque Trq is imparted to driving wheels 2.

Imparting assistance torque Tas to the one permanent magnet motor M1 by using the other permanent magnet motor M1 allows decrease in the discomfort given to the user when the three-phase short circuit control is performed in the one permanent magnet motor M1.

[3-4. Variation 2 of Embodiment 3]

[Action of Vehicle Driving Apparatus]

The action of vehicle driving apparatus 5C according to Variation 2 of Embodiment 3 will next be described with reference to FIGS. 31 and 32. In Variation 2, the description will be made of a case where whether or not the three-phase-short-circuit-forming circuit has failed is checked in the state in which the permanent magnet motors are each performing no powering or regenerating operation. The configuration of vehicle driving apparatus 5C according to Variation 2 of Embodiment 3 is the same as that of vehicle driving apparatus 5C shown in Embodiment 3 and will therefore not be described. Variation 2 is not limited to vehicle driving apparatus 5C and is also applicable to vehicle driving apparatus 5Ca.

Figure 31:
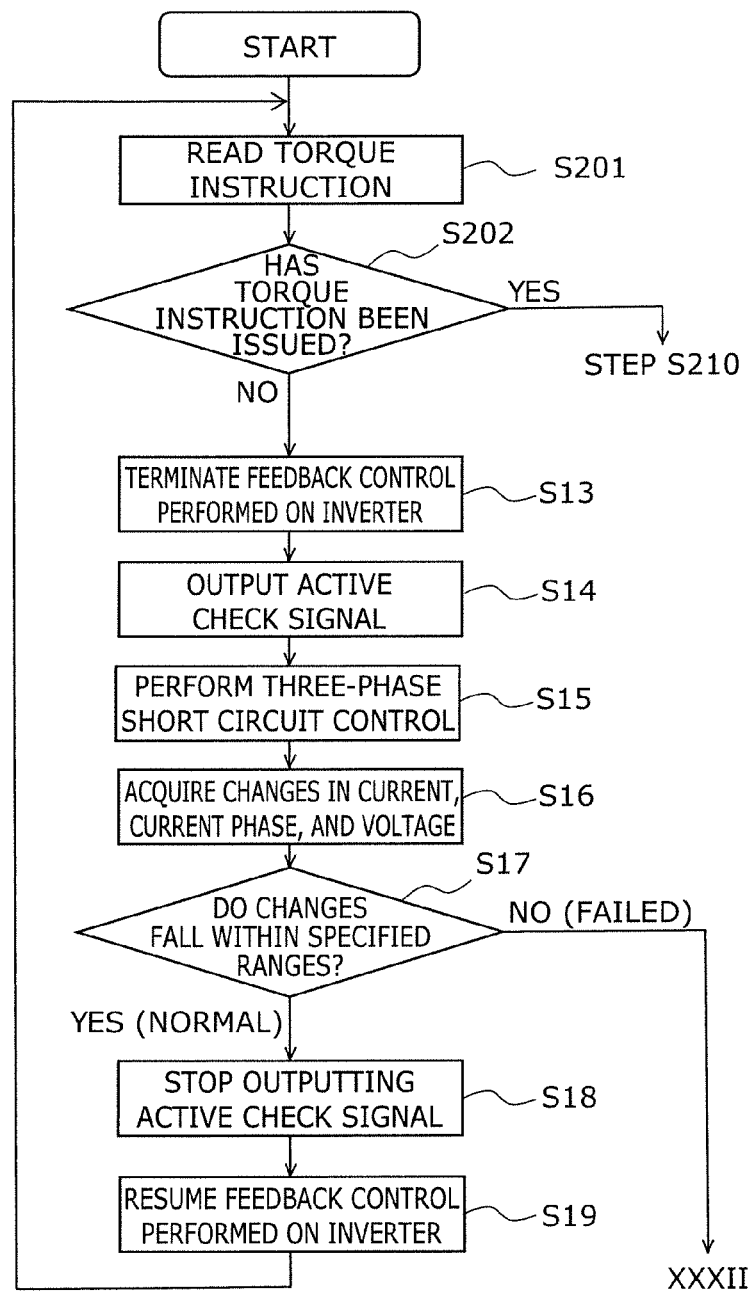
FIG. 31 is a flowchart showing an example of the action of the vehicle driving apparatus according to Variation 2 of Embodiment 3.

FIG. 31 is a flowchart showing an example of the action of vehicle driving apparatus 5C according to Variation 2 of Embodiment 3. FIG. 32 is a flowchart showing the example of the action of vehicle driving apparatus 5C following the flowchart of FIG. 31.

Vehicle driving apparatus 5C is first activated and is in operation.

In this state, control circuit 20 reads the torque instruction from an external component (step S201). Specifically, motor control signal acquiring unit 21 reads the torque instruction information output from the ECU of electric vehicle 201.

Control circuit 20 then evaluates whether or not the torque instruction has been issued (step S202). In the case where the result of the evaluation in step S202 shows that the torque instruction has been issued, control circuit 20 proceeds to step S210 as described above. On the other hand, a case where the result of the evaluation in step S202 shows that no torque instruction has been issued corresponds to the state in which vehicle driving apparatus 5C is performing no powering or regenerating operation, and control circuit 20 proceeds to the following step.

Control circuit 20 then terminates feedback control performed on inverter 10 (step S13). Specifically, drive signal computing unit 23 stops outputting the drive signal for performing the three-phase PWM control.

Control circuit 20 outputs active check signal s1 (step S14). Specifically, active check instructing unit 26 outputs active check signal s1 to check terminal 36 of drive circuit 30. Active check signal s1 is continuously output until it is stopped in step S18 or S21, which will be described later.

Inverter 10 then performs the three-phase short circuit control using three-phase-short-circuit-forming circuit 33 (step S15). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5C (step S16). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S17). Specifically, failure evaluating unit 25 evaluates whether or not the current does not fall within the specified range thereof, the current phase does not fall within the specified range thereof, and the DC voltage does not fall within the specified range thereof.

In a case where failure evaluating unit 25 determines that the changes in the current, the current phase, and the voltage all fall within the specified ranges (Yes in S17), failure evaluating unit 25 determines that three-phase-short-circuit-forming circuit 33 has not failed and is normally operating. Control circuit 20 then stops outputting active check signal s1 output from active check instructing unit 26 (step S18) and resumes the feedback control performed on inverter 10 (step S19). Control circuit 20 then returns to step S201 and repeats the active check. The active check is repeatedly performed at predetermined time intervals.

On the other hand, when at least one of the changes in the current, the current phase, and the voltage does not fall within the corresponding specified range (No in step S17), control circuit 20 determines that three-phase-short-circuit-forming circuit 33 has failed. Control circuit 20 then performs actions to be performed when three-phase-short-circuit-forming circuit 33 has failed, as shown in FIG. 32.

Figure 32:
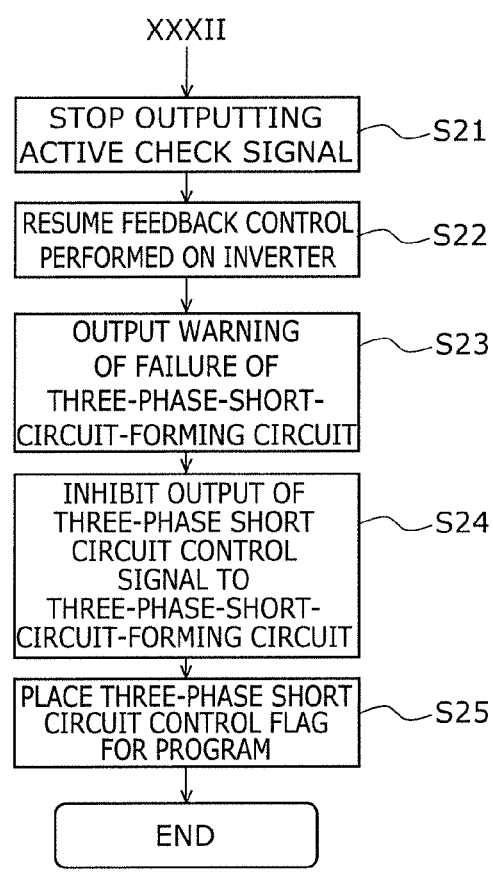
FIG. 32 is a flowchart showing the example of the action of the vehicle driving apparatus following the flowchart of FIG. 31.

Control circuit 20 stops outputting active check signal s1 output from active check instructing unit 26 (step S21) and resumes the feedback control performed on inverter 10 (step S22), as shown in FIG. 32.

Control circuit 20 then outputs a failure warning representing that three-phase-short-circuit-forming circuit 33 has failed to an external component, for example, the ECU (upper-level control unit) of electric vehicle 201 (step S23). Failure evaluating unit 25 may notify a user of the failure information by displaying the failure information on a monitor or outputting a sound that Informs the failure information via a loudspeaker.

Further, control circuit 20 inhibits output of a three-phase short circuit control signal to three-phase-short-circuit-forming circuit 33 (step S24). Specifically, control circuit 20 inhibits active check instructing unit 26 from outputting active check signal s1. Control circuit 20 places a flag representing the three-phase short circuit control (step S25). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5C.

Further, in the case where it is determined that three-phase-short-circuit-forming circuit 33 has failed and in the middle of operation of outputting active check signal s1, control circuit 20 may use the program stored in memory 24 in control circuit 20 to output a control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1 performs powering or regenerating operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[3-5. Variation 3 of Embodiment 3]

Vehicle driving apparatus 5C according to Variation 3 of Embodiment 3 will next be described with reference to FIGS. 33 and 34. In Variation 3, the description will be made of the active check made in the case where the number of revolutions of motor M1 falls within a predetermined threshold range.

Figure 33:
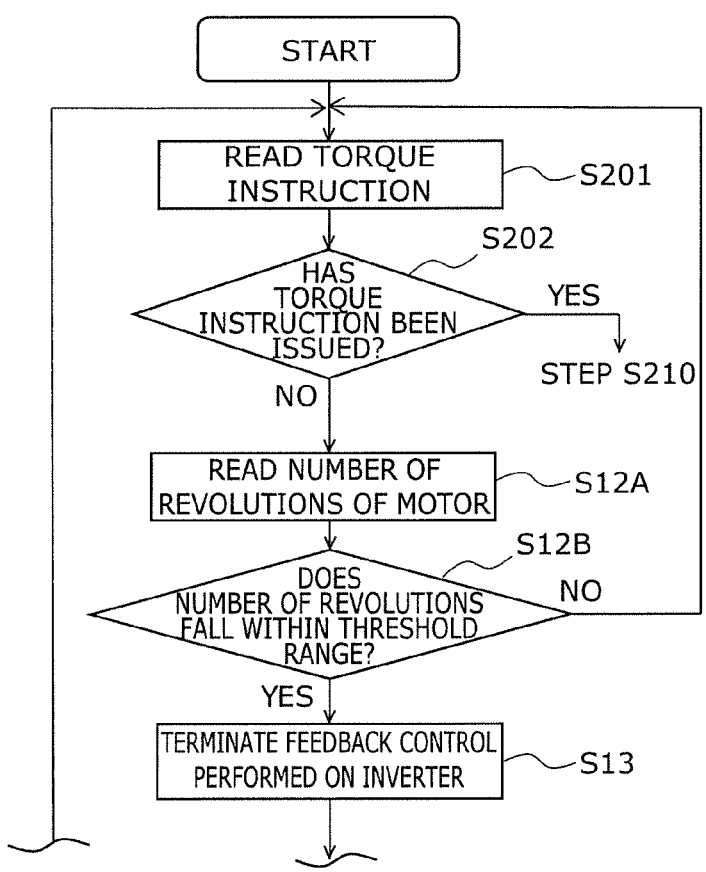
FIG. 33 is a flowchart showing an example of the action of the vehicle driving apparatus according to Variation 3 of Embodiment 3.
Figure 34:
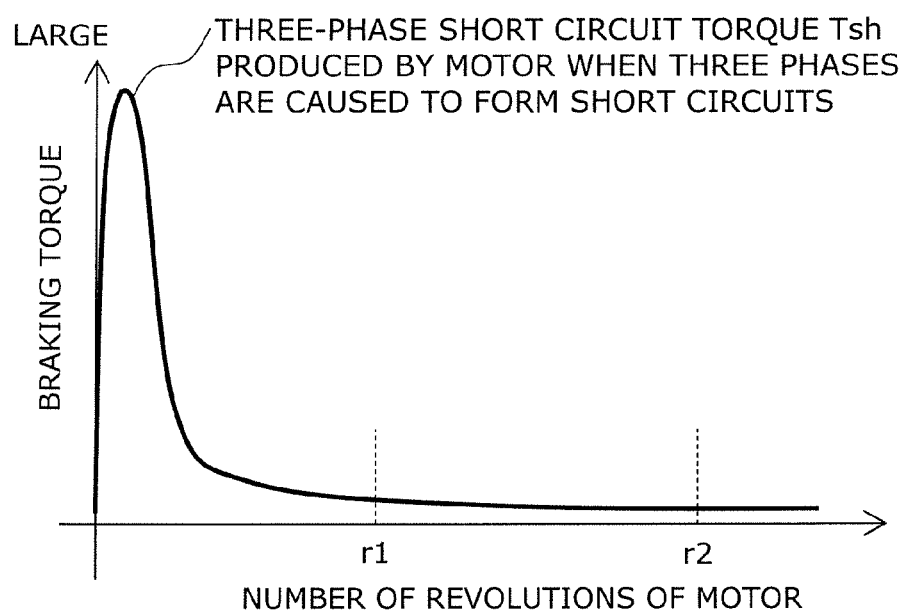
FIG. 34 is a graph showing the torque produced when the three phases of the permanent magnet motor in the vehicle driving apparatus according to Variation 3 of Embodiment 3 are caused to form short circuits.

FIG. 33 is a flowchart showing an example of the action of vehicle driving apparatus 5C according to Variation 3 of Embodiment 3. FIG. 34 shows the torque produced when the three phases of the permanent magnet motor in vehicle driving apparatus 5C according to Variation 3 are caused to form short circuits. FIG. 34 shows that braking torque increases in the direction toward the positive side (upper side) of the vertical axis of FIG. 34.

A method for operating vehicle driving apparatus 5C according to Variation 3 of Embodiment 3 includes the step of evaluating the number of revolutions of motor M1 to determine whether or not the active check is made. The step is located between step S202 of evaluating whether or not the torque instruction has been issued and step S13 of terminating the feedback control performed on inverter 10.

Specifically, after the result of the evaluation in step S202 shows that no torque instruction has been issued, the number of revolutions of motor M1 is read (step S12A), as shown in FIG. 33. The number of revolutions of motor M1 can be determined based on the result of the sensing performed by rotational position sensor RS.

It is then evaluated whether or not the number of revolutions of motor M1 falls within the predetermined threshold range (step S12B). Specifically, first threshold r1, which is a threshold of the number of revolutions of motor M1, and second threshold r2, which is greater than first threshold r1, are set, and it is evaluated whether or not the number of revolutions of motor M1 is greater than or equal to first threshold r1 but smaller than or equal to second threshold r2. In a case where the number of revolutions is greater than or equal to first threshold r1 but smaller than or equal to second threshold r2 (Yes in S12B), control circuit 20 proceeds to the steps where the active check is made. On the other hand, in a case where the number of revolutions is not greater than or equal to first threshold r1 but smaller than or equal to second threshold r2 (No in S12B), control circuit 20 returns to step S201.

The reason why whether or not the active check can be made is determined based on the number of revolutions of motor M1 is as follows: When the active check is made when the number of revolutions of motor M1 is smaller than first threshold r1, large braking torque is abruptly produced in some cases, as shown in FIG. 34. To avoid the situation described above, the active check is made in Variation 3 in the case where the number of revolutions of motor M1 is greater than or equal to first threshold r1. Further, when the active check is made when the number of revolutions of motor M1 is greater than second threshold r2, that is, when it is estimated that relatively wild driving is being performed, an abrupt change in torque instruction issued to motor M1 cannot be handled in some cases. In view of the fact described above, the active check is made in Variation 3 when the number of revolutions of motor M1 is smaller than or equal to second threshold r2.

As described above, in vehicle driving apparatus 5C according to Variation 3 of Embodiment 3, whether or not the active check can be made is determined in accordance with the number of revolutions of motor M1. Abrupt torque variation that may occur when vehicle driving apparatus 5C is driven can thus be suppressed. Variation 3 is not limited to vehicle driving apparatus 5C and is also applicable to vehicle driving apparatus 5Ca.

Embodiment 3 described above is an essentially preferable example and is not intended to limit the scope of the present invention, an object to which the present invention is applied, or the application of the present invention.

For example, the torque imparting apparatus described above may include at least one of an engine, a transmission, and a brake.

The configuration described above allows appropriate torque to be imparted to the driving wheels, whereby the discomfort given to the user when the three-phase short circuit control is performed can be reduced.

The vehicle driving apparatus may include two permanent magnet motors that are each the permanent magnet motor described above, one inverter that is the inverter described above and drives one of the two permanent magnet motors described above, and another inverter that is the inverter described above and drives the other one of the two permanent magnet motors described above, and the control circuit described above may control the other permanent magnet motor described above in such a way that assistance torque according to the torque difference between regenerative torque produced during regenerating operation performed by the one permanent magnet motor described above and the three-phase short circuit torque described above is imparted to the driving wheels of the vehicle in a case where the three-phase short circuit torque, which is the torque produced by the one permanent magnet motor described above when the three-phase short circuit control described above is performed, is greater than or equal to the second specified torque, which is smaller than the first specified torque described above.

Imparting the assistance torque to the driving wheels by using the other permanent magnet motor allows decrease in the discomfort given to the user when the three-phase short circuit control is performed in the one permanent magnet motor.

Embodiment 4

A vehicle driving apparatus according to Embodiment 4 will be described with reference to FIGS. 35 to 49.

The state of the permanent magnet motor in the vehicle driving apparatus during traveling is broadly classified into the powering state, the regenerating state, and the no powering or regenerating state (the state in which the vehicle is coasting, and in the case where the vehicle includes another drive source, such as an engine and an another permanent magnet motor, the state in which the vehicle travels based only on the other drive source). In Embodiment 4 below, the description will be made of a case where whether or not the three-phase-short-circuit-forming circuit has failed is checked in the state in which the permanent magnet motor is performing powering operation. Further, in Variation 2 of Embodiment 4, a description will be made of the case where whether or not the three-phase-short-circuit-forming circuit has failed is checked in the state in which the permanent magnet motor is performing no powering or regenerating operation.

[4-1. Configuration of Vehicle Driving Apparatus]

The configuration of vehicle driving apparatus 5D according to Embodiment 4 will first be described with reference to FIGS. 35 to 37.

Figure 35:
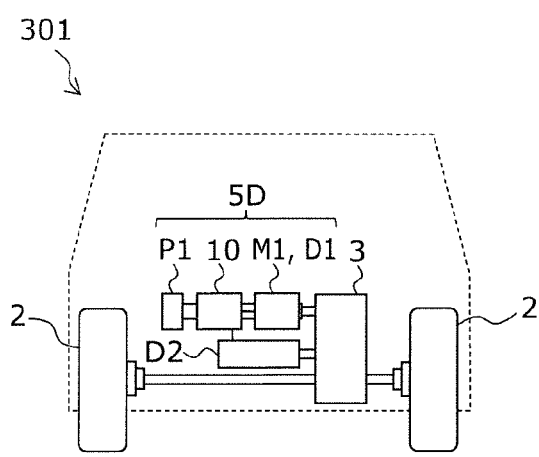
FIG. 35 is a diagram showing an example of an electric vehicle including a vehicle driving apparatus according to Embodiment 4.

FIG. 35 shows an example of electric vehicle 301 including vehicle driving apparatus 5D according to Embodiment 4. Electric vehicle 301 includes driving wheels 2, power transmission mechanism 3, and vehicle driving apparatus 5D. Vehicle driving apparatus 5D includes one drive source D1, which is permanent magnet motor M1, inverter 10, and battery P1. Vehicle driving apparatus 5D further includes another drive source D2 different from the one drive source D1. Permanent magnet motor M1 is hereinafter referred to as motor M1 in some cases.

Motor M1 is a three-phase AC motor that drives driving wheels 2 of electric vehicle 301 and uses, for example, a motor such as a magnet embedded synchronous motor, a surface mounted magnet synchronous motor, or the like.

Power transmission mechanism 3 is formed, for example, of a differential gear and a drive shaft and transmits power between motor M1 and driving wheels 2. The rotational force produced by motor M1 is transmitted to driving wheels 2 via power transmission mechanism 3. Similarly, the rotational force produced by driving wheels 2 is transmitted to motor M1 and the other drive source D2 via power transmission mechanism 3.

Battery P1 is, for example, a DC power source, such as a lithium ion battery. Battery P1 supplies electric power for driving motor M1 and accumulates the electric power.

Inverter 10 converts the DC electric power supplied from battery P1, for example, into three-phase AC electric power and supplies motor M1 with the AC electric power to drive and control motor M1.

The other drive source D2 is an apparatus for producing torque separately from the torque produced by motor M1 and is communicably connected to inverter 10. The other drive source D2 may Instead be connected to inverter 10 via an engine control unit (ECU) of electric vehicle 301.

The other drive source D2 is, for example, an engine, such as an internal combustion engine, and transmits the torque to driving wheels 2 via power transmission mechanism 3. For example, when the three-phase short circuit control is performed in motor M1 that is performing the powering operation, the other drive source D2 outputs torque in response to an instruction from inverter 10.

Vehicle driving apparatus 5D does not necessarily have the configuration described above. For example, vehicle driving apparatus 5D may include only the one drive source D1, and inverter 10, battery P1, and the other drive source D2 may be provided as components external to vehicle driving apparatus 5D. Further, electric vehicle 301 does not necessarily have the linkage structure described above. For example, electric vehicle 301 may not include power transmission mechanism 3 but may have a structure in which the one drive source D1 is directly linked to driving wheels 2 or a structure in which the other drive source D2 is directly linked to driving wheels 2.

Inverter 10, which drives and controls motor M1, will be described below in detail.

Figure 36:
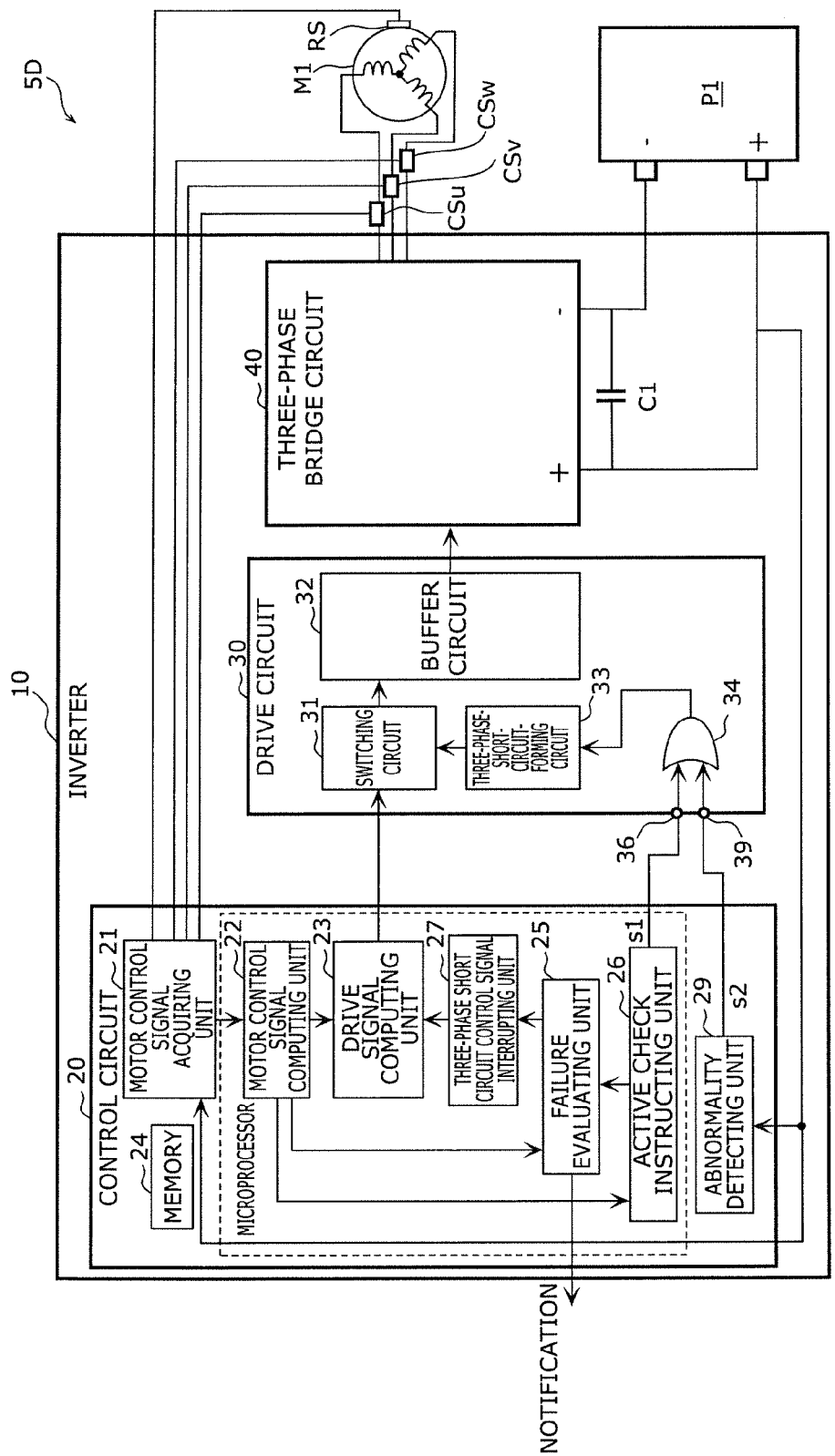
FIG. 36 is a circuit diagram showing an example of an inverter, a permanent magnet motor, and a battery of the vehicle driving apparatus according to Embodiment 4.

FIG. 36 is a circuit diagram showing an example of inverter 10, permanent magnet motor M1, and battery P1 of vehicle driving apparatus 5D.

Vehicle driving apparatus 5D includes motor M1, inverter 10, and battery P1, as shown in FIG. 36. Inverter 10 includes three-phase bridge circuit 40, drive circuit 30, and control circuit 20. FIG. 36 also shows smoothing capacitor C1, which smoothens voltage applied to three-phase bridge circuit 40.

Three-phase bridge circuit 40 is a circuit that performs a switching action to convert the DC electric power supplied from battery P1 into three-phase AC electric power and supplies motor M1 with the AC electric power to drive motor M1. Three-phase bridge circuit 40 has a switching action control Input side connected to drive circuit 30, an electric power Input side connected to battery P1, and an output side connected to motor M1. It is noted that when motor M1 performs regeneration, regenerative current is introduced from the output side of three-phase bridge circuit 40 and flows toward the electric power input side. In the description, however, the side to which battery P1 is connected is defined as the input side, and the side to which motor M1 is connected is defined as the output side.

Figure 37:
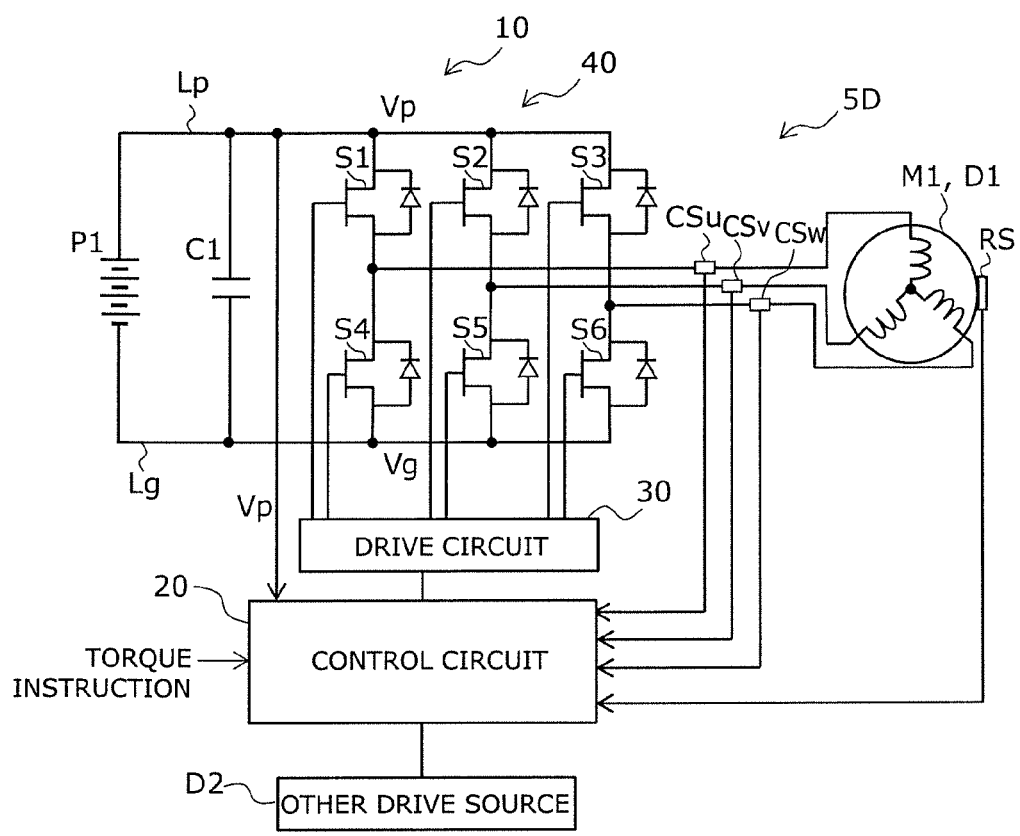
FIG. 37 is a circuit diagram showing an example of a three-phase bridge circuit provided in the inverter of the vehicle driving apparatus according to Embodiment 4.

FIG. 37 is a circuit diagram showing an example of three-phase bridge circuit 40 provided in inverter 10 of vehicle driving apparatus 5D. In FIG. 37, voltage Vp is power source voltage, and voltage Vg is ground voltage.

Three-phase bridge circuit 40 includes switch elements S1, S2, and S3, which are provided in an upper arm group located on the upper side of FIG. 37, and switch elements S4, S5, and S6, which are provided in a lower arm group located on the lower side of FIG. 37. For example, switch elements S1 to S6 are each formed, for example, of a field effect transistor (FET) or an insulated gate bipolar transistor (IGBT). Switch elements S1 to S6 may instead each be made of a wide bandgap semiconductor.

Switch elements S1, S2, and S3 are connected to three output wires drawn from three terminals of motor M1 and to power source wire Lp connected to the anode of battery P1 and are located between the three output wires and power source wire Lp. Switch elements S4, S5, and S6 are connected to the three output wires described above and to ground wire Lg connected to the cathode of battery P1 and located therebetween. A freewheel diode is connected to each of switch elements S1 to S6 In parallel thereto. The freewheel diodes may Instead be parasitic diodes parasitic on switch elements S1 to S6.

Switch elements S1 to S6 are connected to drive circuit 30 and driven by signals output from drive circuit 30. Motor M1 is driven, for example, in the form of powering, regenerating, or coasting operation based on the driven states of switch elements S1 to S6.

Drive circuit 30 will next be described with reference to FIG. 36.

Drive circuit 30 is a circuit that drives switch elements S1 to S6 in three-phase bridge circuit 40 to perform the three-phase PWM control and the three-phase short circuit control. Drive circuit 30 has an input side connected to control circuit 20 and an output side connected to three-phase bridge circuit 40.

Drive circuit 30 includes switching circuit 31, buffer circuit 32, three-phase-short-circuit-forming circuit 33, and OR circuit 34. Drive circuit 30 further includes check terminal 36 and abnormality accepting terminal 39.

Abnormality accepting terminal 39 is a terminal that accepts abnormality accepting terminal s2, which notifies an abnormal state of inverter 10. Abnormality signal s2 is output from abnormality detecting unit 29, which will be described later, to drive circuit 30.

Check terminal 36 is a terminal that accepts active check signal s1, which causes three-phase-short-circuit-forming circuit 33 to perform the three-phase short circuit control. Active check signal s1 is output from control circuit 20 to drive circuit 30. In the following description, causing three-phase-short-circuit-forming circuit 33 to attempt the three-phase short circuit control and checking whether or not three-phase-short-circuit-forming circuit 33 can perform the three-phase short circuit control is called an active check. Making the active check allows diagnosis of whether or not three-phase-short-circuit-forming circuit 33 has failed.

The signals input to check terminal 36 and abnormality accepting terminal 39 are input to OR circuit 34. OR circuit 34 outputs a signal to three-phase-short-circuit-forming circuit 33 in a case where at least one of check terminal 36 and abnormality accepting terminal 39 has accepted the corresponding signal. Three-phase-short-circuit-forming circuit 33 is driven based on the signal output from OR circuit 34. In other words, three-phase-short-circuit-forming circuit 33 is driven based on the abnormality detection input signal and the active check input signal.

Three-phase-short-circuit-forming circuit 33 is a circuit used to cause the three phases of motor M1 to form short circuits. Specifically, three-phase-short-circuit-forming circuit 33 is a circuit that causes, out of switch elements S1 to S3 in the upper arm group and switch elements S4 to S6 in the lower arm group of three-phase bridge circuit 40, the switch elements in one of the arm groups to form short circuits and the switch elements in the other arm group to open based on the signal output from OR circuit 34. Causing the three phases of motor M1 to form short circuits as described above allows the induced voltage from the gap between the winding coils of motor M1 to be zero. As a result, for example, in a case where overvoltage is detected in three-phase bridge circuit 40, three-phase-short-circuit-forming circuit 33 can be caused to operate and perform the three-phase short circuit control to lower the overvoltage applied to three-phase bridge circuit 40.

Switching circuit 31 is a circuit that switches a state in which three-phase bridge circuit 40 is driven based on a drive signal output from drive signal computing unit 23, which will be described later, to a state in which three-phase bridge circuit 40 is driven by using a signal output from three-phase-short-circuit-forming circuit 33 and vice versa. The drive signal output from drive signal computing unit 23 contains a variety of signals, such as a signal that causes three-phase PWM control to be performed on three-phase bridge circuit 40. The switching performed by switching circuit 31 is achieved, for example, by a hardware logic circuit. Switching circuit 31 in the present embodiment switches switching control performed by motor M1 to the three-phase short circuit control performed by three-phase-short-circuit-forming circuit 33 when drive circuit 30 accepts active check signal s1 via check terminal 36.

Buffer circuit 32 is a circuit that amplifies an output signal to be output to three-phase bridge circuit 40 in such a way that three-phase bridge circuit 40 can drive switch elements S1 to S6. The output signal amplified by buffer circuit 32 can drive three-phase bridge circuit 40.

Control circuit 20 will next be described with reference to FIG. 36.

Control circuit 20 includes a microprocessor that performs, for example, a variety of type of computation and memory 24, which stores, for example, a program or information for operating the microprocessor.

Control circuit 20 includes motor control signal acquiring unit 21, motor control signal computing unit 22, drive signal computing unit 23, active check instructing unit 26, failure evaluating unit 25, and three-phase short circuit control signal Interrupting unit 27, as shown in FIG. 36. Control circuit 20 further includes abnormality detecting unit 29.

Motor control signal acquiring unit 21 acquires information sensed by a variety of sensors, such as current sensors CSu, CSv, and CSw, which each sense current flowing through motor M1, and rotational position sensor RS, which detects the magnetic pole positions of motor M1 to sense the rotational position. Current sensors CSu, CSv, and CSw are sensors that sense the current values in the phases u, v, and w of motor M1. Motor control signal acquiring unit 21 further acquires information on voltage Vp across power source wire Lp. Motor control signal acquiring unit 21 still further acquires control instruction information, such as a torque instruction output from a component external to control circuit 20, for example, an electronic control unit (ECU) of electric vehicle 301.

Motor control signal computing unit 22 converts the value of the torque instruction into current through computation based on the information acquired by motor control signal acquiring unit 21 and outputs a control signal for performing current control on motor M1.

For example, motor control signal computing unit 22 outputs the control signal for performing current control on motor M1 in such a way that the torque produced by motor M1 when vehicle driving apparatus 5D is driven is equal to target torque indicated by the torque instruction information (for example, torque according to the amount of operated accelerator pedal of electric vehicle 301).

Further, motor control signal computing unit 22 converts the information acquired by motor control signal acquiring unit 21 through computation and outputs a control signal for making the active check and failure evaluation. For example, motor control signal computing unit 22 converts the control instruction information, such as the torque instruction, into the control signal described above and outputs the control signal to drive signal computing unit 23 and active check instructing unit 26. Moreover, motor control signal computing unit 22 converts information, such as current flowing through motor M1, the rotational positions of the magnetic poles of motor M1, and voltage Vp across power source wire Lp, into control signals and outputs the control signal to drive signal computing unit 23 and failure evaluating unit 25.

Active check instructing unit 26 is a circuit that outputs active check signal s1 to check terminal 36. The active check refers to causing three-phase-short-circuit-forming circuit 33 to attempt the three-phase short circuit control and checking whether or not three-phase-short-circuit-forming circuit 33 can perform the three-phase short circuit control, as described above. Active check instructing unit 26 evaluates whether or not the active check can be made at the current timing based on the control signals described above output from motor control signal computing unit 22.

For example, active check instructing unit 26 determines that the active check can be made in a case where the one drive source D1 is not used but the other drive source D2 can drive electric vehicle 301. Evaluation of whether or not the active check can be made is performed at regular time intervals. Evaluation of whether or not the active check is made may not necessarily be performed by active check instructing unit 26 and may Instead be performed by a circuit different from active check instructing unit 26 but is provided in control circuit 20.

Processes carried out by control circuit 20 before active check signal s1 is output will now be described with reference to FIGS. 38 and 39. The processes are carried out, for example, to allow the active check to be made on three-phase-short-circuit-forming circuit 33 in inverter 10 connected to the one drive source D1 when electric vehicle 301 is performing the powering operation.

Figure 38:
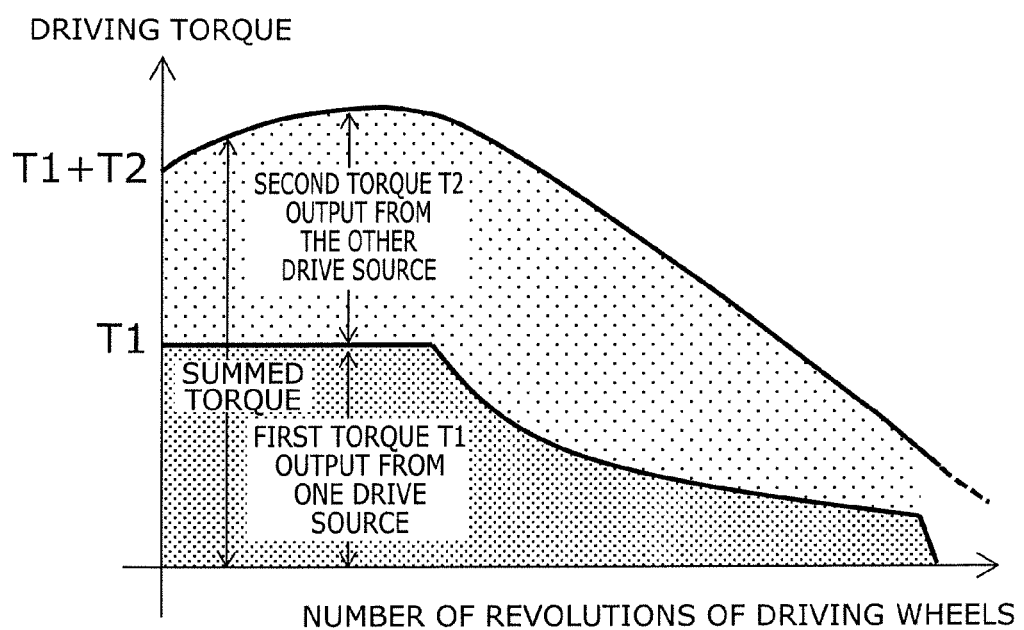
FIG. 38 is a graph showing the torque output from one drive source and another drive source in the vehicle driving apparatus according to Embodiment 4.

FIG. 38 shows the torque output from the one drive source D1 in vehicle driving apparatus 5D and the torque output from the other drive source D2 in vehicle driving apparatus 5D. FIG. 38 shows that driving torque increases in the direction toward the positive side (upper side) of the vertical axis of FIG. 38.

Vehicle driving apparatus 5D is driven by summed torque (T1+T2), which is the sum of first torque T1 output from the one drive source D1 and second torque T2 output from the other drive source D2. First torque T1 gradually decreases after the number of revolutions of the driving wheels exceeds a predetermined value.

In Embodiment 4, control circuit 20 outputs active check signal s1 to check terminal 36 in a case where the one drive source D1 and the other drive source D2 are both performing powering operation and electric vehicle 301 can be driven without using the one drive source D1 but by using the other drive source D2. Electric vehicle 301 that is performing the powering operation can thus be driven, for example, only by the other drive source D2. As a result, the one drive source D1 is allowed to perform no powering or regenerating operation, and failure diagnosis can be performed on threephase-short-circuit-forming circuit 33 in inverter 10 connected to the one drive source D1.

Figure 39:
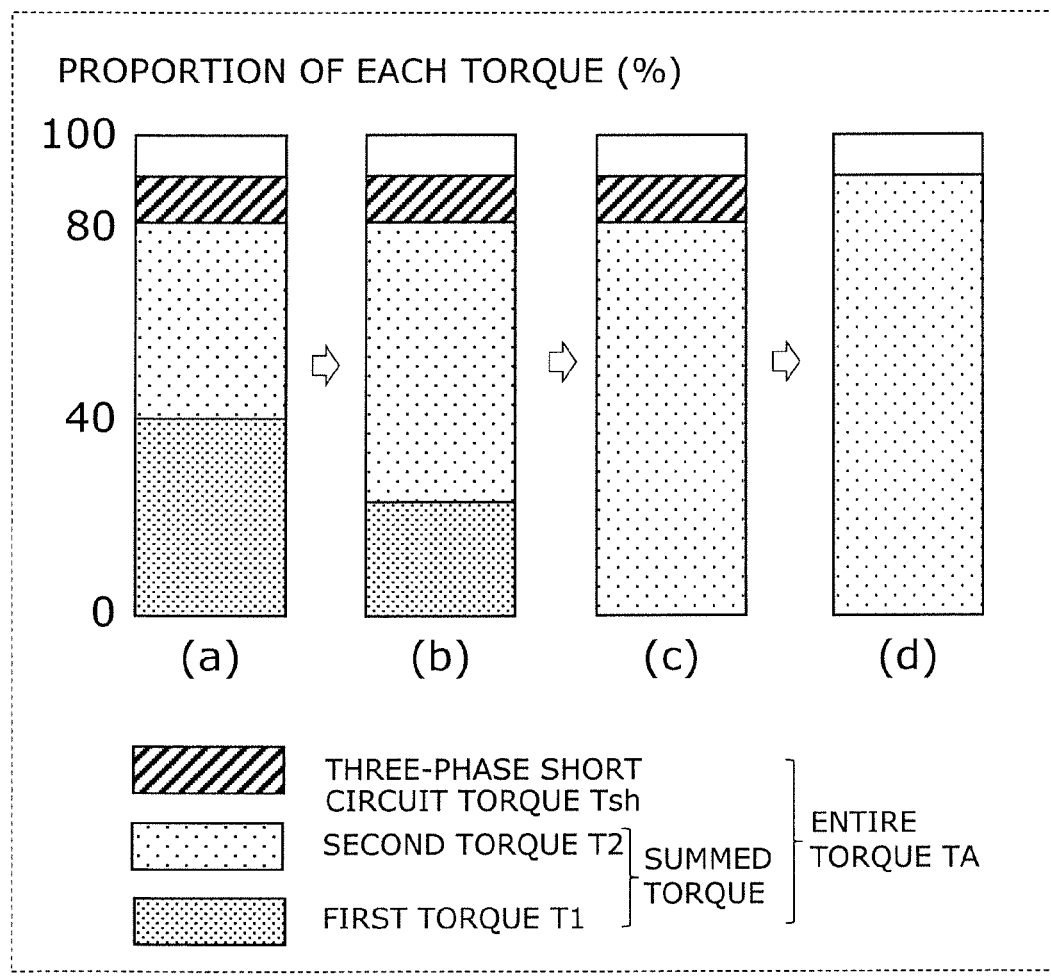
FIG. 39 is a conceptual diagram showing the proportion of each torque of the entire torque output from the vehicle driving apparatus according to Embodiment 4.

FIG. 39 is a conceptual diagram showing the proportion of each torque of entire torque TA output from vehicle driving apparatus 5D.

The portion (a) of FIG. 39 shows entire torque TA, which is the sum of first torque T1, second torque T2, and three-phase short circuit torque Tsh. For example, first torque T1 is 40% of the maximum torque that the one drive source D1 can output, and second torque T2 is 40% of the maximum torque that the other drive source D2 can output. Three-phase short circuit torque Tsh is braking torque produced in motor M1 when the three-phase short circuit control is performed. The other drive source D2 therefore needs to produce additional torque for compensating three-phase short circuit torque Tsh in addition to first torque T1 and second torque T2 when failure diagnosis is performed on three-phase-short-circuit-forming circuit 33. The magnitude of the additional torque is equal to the magnitude of three-phase short circuit torque Tsh, and three-phase short circuit torque Tsh is expressed by (Expression 12) described above.

[Math. 14]

$$T_{sh} = -\frac{P_n R_a}{\omega}(I_d^2 + I_q^2) \quad \text{(Expression 12)}$$

In (Expression 12), Pn represents the number of pole pairs, Ra represents the phase resistance, ω represents the angular velocity (number of revolutions, rotational speed), Id represent the d-axis current, and Iq represent the q-axis current. The values Pn and Ra are each a characteristic value of motor M1. The value ω is determined based on the value from rotational position sensor RS. The value ω is converted into the rotational speed (number of revolutions) of motor M1 by multiplying ω by 60/(2π·Pn). The values Id and Iq are determined based on (Expression 1) and (Expression 2) described above. (Expression 12) is stored in memory 24 and read as required.

In a case where the other drive source D2 can output entire torque TA, control circuit 20 determines that the other drive source D2 can drive electric vehicle 301. Specifically, control circuit 20 determines that the other drive source D2 can drive electric vehicle 301 in a case where only the other drive source D2 can output entire torque TA shown in (a) of FIG. 39, as shown in (d) of FIG. 39. In the case where the other drive source D2 can output entire torque TA, control circuit 20 issues an instruction to the other drive source D2 in such a way that the other drive source D2 outputs entire torque TA and further outputs active check signal s1 to check terminal 36. Vehicle driving apparatus 5D can thus perform failure diagnosis on three-phase-short-circuit-forming circuit 33.

Further, control circuit 20 controls the one drive source D1 and the other drive source D2 in such a way that no abrupt torque variation occurs when the other drive source D2 can output entire torque TA. Specifically, control circuit 20 performs control in such a way that the ratio of second torque T2 to summed torque (T1+T2) gradually Increases as compared with the ratio of first torque T1 to summed torque (T1+T2), as shown in (a), (b), and (c) of FIG. 39 in the presented order, outputs active check signal s1 after the control described above is completed, and controls the one drive source D1 and the other drive source D2 in such a way that only the other drive source D2 outputs entire torque TA, as shown in (d) of FIG. 39.

As described above, having evaluated whether or not the active check should be made and determined that the active check should be made, control circuit 20 outputs active check signal s1. Control circuit 20 outputs the busy signal representing that the active check is being made simultaneously with outputting active check signal s1 to failure evaluating unit 25.

The configuration of control circuit 20 will continuously be described with reference to FIG. 36.

Failure evaluating unit 25 is a circuit that evaluates whether or not three-phase-short-circuit-forming circuit 33 has failed. Failure evaluating unit 25 acquires information on a change that occurs when the three-phase short circuit control is performed in at least one of current flowing through the three phases of motor M1, the current phase, and DC voltage applied to three-phase bridge circuit 40. A change in the current can be determined based on a current value detected with each of current sensors CSu, CSv, and CSw. A change in the current phase can be determined based, for example, on d-axis current and q-axis current of motor M1. The d-axis current and q-axis current can be determined based on a current value detected with each of current sensors CSu, CSv, and CSw and the rotational positions of the magnetic poles detected with rotational position sensor RS. A change in the DC voltage can be determined by detecting voltage Vp across power source wire Lp.

Failure evaluating unit 25 evaluates whether or not the three-phase-short-circuit-forming circuit has failed based on the acquired information described above. For example, failure evaluating unit 25 determines that three-phase-short-circuit-forming circuit 33 has failed in at least one of a case where the current does not fall within a specified range, a case where the current phase does not fall within a specified range, and a case where the DC voltage does not fall within a specified range. Having determined that three-phase-short-circuit-forming circuit 33 has failed, failure evaluating unit 25 outputs a notification signal that notifies an external component of information on the failure.

Abnormality detecting unit 29 is a circuit that detects abnormality that occurs in inverter 10, such as overvoltage. The following description will be made on the assumption that abnormality detecting unit 29 is a circuit that detects overvoltage that occurs due, for example, to a defect, such as disconnection of power source wire Lp, or failure of switch elements S1 to S6, current sensors CSu, CSv, and CSw, rotational position sensor RS, and other components. Abnormality detecting unit 29 is connected to power source wire Lp of three-phase bridge circuit 40 on the positive side of battery P1. When abnormality detecting unit 29 detects abnormality (overvoltage in the description), abnormality signal s2 is output to abnormality accepting terminal 39. Since abnormality signal s2 causes three-phase-short-circuit-forming circuit 33 to perform the three-phase short circuit control, the overvoltage applied to three-phase bridge circuit 40 can be suppressed. The overvoltage presented in the description, which is abnormality detected by abnormality detecting unit 29, can occur, for example, when the positive-side wiring of battery P1 comes off or is disconnected or a main relay that is not shown but is provided in battery P1 is opened. Since abnormality detecting unit 29 and drive circuit 30 (including three-phase-short-circuit-forming circuit 33) are each formed of hardware, emergency actions formed of detection of abnormality performed by abnormality detecting unit 29 and the three-phase short circuit control performed by three-phase-short-circuit-forming circuit 33 are automatically and quickly performed.

Abnormality detecting unit 29 is not necessarily provided in control circuit 20 and may be so provided as to be external to control circuit 20. Abnormality detecting unit 29 does not necessarily have the overvoltage detecting configuration and may have a configuration that directly detects output abnormality (such as output voltage that does not fall within predetermined range) of any of current sensors CSu, CSv, and CSw, rotational position sensor RS, and other sensors.

Drive signal computing unit 23 computes a drive signal required to drive motor M1 based on the control signals output from motor control signal computing unit 22 and outputs the drive signal to drive circuit 30. Drive signal computing unit 23 outputs a drive signal for performing the three-phase PWM control when vehicle driving apparatus 5D is normally driven.

When abnormality of inverter 10 is detected and when failure evaluating unit 25 determines that three-phase-short-circuit-forming circuit 33 has failed, drive signal computing unit 23 outputs a drive signal for performing the three-phase short circuit control based on the program stored in memory 24.

The three-phase short circuit control performed based on the program is performed by three-phase short circuit control signal interrupting unit 27. Specifically, once failure information is received from failure evaluating unit 25 indicating that three-phase-short-circuit-forming circuit 33 has failed, three-phase short circuit control signal interrupting unit 27 outputs an interrupt signal for performing the three-phase short circuit control to drive signal computing unit 23 when abnormality of inverter 10 is detected. Upon reception of the interrupt signal, drive signal computing unit 23 changes a three-phase PWM control drive signal to a three-phase short circuit control drive signal and outputs the drive signal to drive circuit 30.

As described above, control circuit 20 outputs drive signals for performing the three-phase PWM control and the three-phase short circuit control to drive circuit 30. Drive circuit 30 selects one of the drive signal output from control circuit 20 and the signal output from three-phase-short-circuit-forming circuit 33 and outputs the selected signal to three-phase bridge circuit 40. Three-phase bridge circuit 40 drives motor M1 based on a signal output from drive circuit 30.

Part of the processes carried out by control circuit 20 before active check signal s1 described above is output may be carried out by drive signal computing unit 23. For example, drive signal computing unit 23 may compute entire torque TA, which is the sum of first torque T1, second torque T2, and three-phase short circuit torque Tsh, convert entire torque TA into a drive signal for controlling the other drive source D2, and output the drive signal to the other drive source D2 as required.

Vehicle driving apparatus 5D according to Embodiment 4 includes the one drive source D1, which is permanent magnet motor M1, the other drive source D2, which differs from the one drive source D1, and inverter 10, which drives the one drive source D1. Inverter 10 includes three-phase bridge circuit 40 including the plurality of switch elements S1 to S6, drive circuit 30 connected to three-phase bridge circuit 40, control circuit 20 connected to drive circuit 30, and abnormality detecting unit 29, which detects abnormality of inverter 10. Drive circuit 30 includes three-phase-short-circuit-forming circuit 33, which causes the three phases of permanent magnet motor M1 to form short circuits, abnormality accepting terminal 39, which accepts abnormality signal s2 output from abnormality detecting unit 29, and check terminal 36, which accepts active check signal s1 for performing the three-phase short circuit control performed by three-phase-short-circuit-forming circuit 33. Control circuit 20 controls the other drive source D2 in such a way that the other drive source D2 outputs entire torque TA in the case where the one drive source D1 is not used but the other drive source D2 can drive electric vehicle 301, as described with reference to FIG. 39, and control circuit 20 outputs active check signal s1 to check terminal 36.

As described above, the configuration in which control circuit 20 outputs active check signal s1 in the case where the other drive source D2 can drive electric vehicle 301 allows drive circuit 30 to accept as appropriate active check signal s1 via check terminal 36. Active check signal s1 allows vehicle driving apparatus 5D to check as appropriate whether or not three-phase-short-circuit-forming circuit 33 can perform the three-phase short circuit control. Further, outputting active check signal s1 during the powering operation of permanent magnet motor M1 allows an increase in the number of opportunities of checking whether or not the three-phase short circuit control can be performed, as compared, for example, with the case where active check signal s1 is output only when motor M1 is performing no powering or regenerating operation. Reliable vehicle driving apparatus 5D In which potential failure of the three-phase short circuit control is located in inverter 10 at an early stage can therefore be provided.

[4-2. Action of Vehicle Driving Apparatus]

The action of vehicle driving apparatus 5D will next be described with reference to FIGS. 40 to 42.

Figure 40:
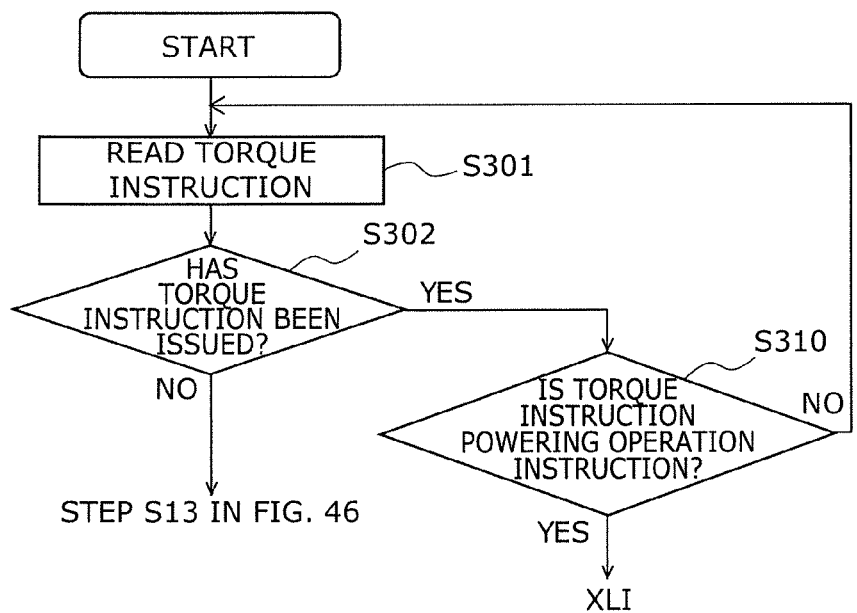
FIG. 40 is a flowchart showing an example of the action of the vehicle driving apparatus according to Embodiment 4.
Figure 41:
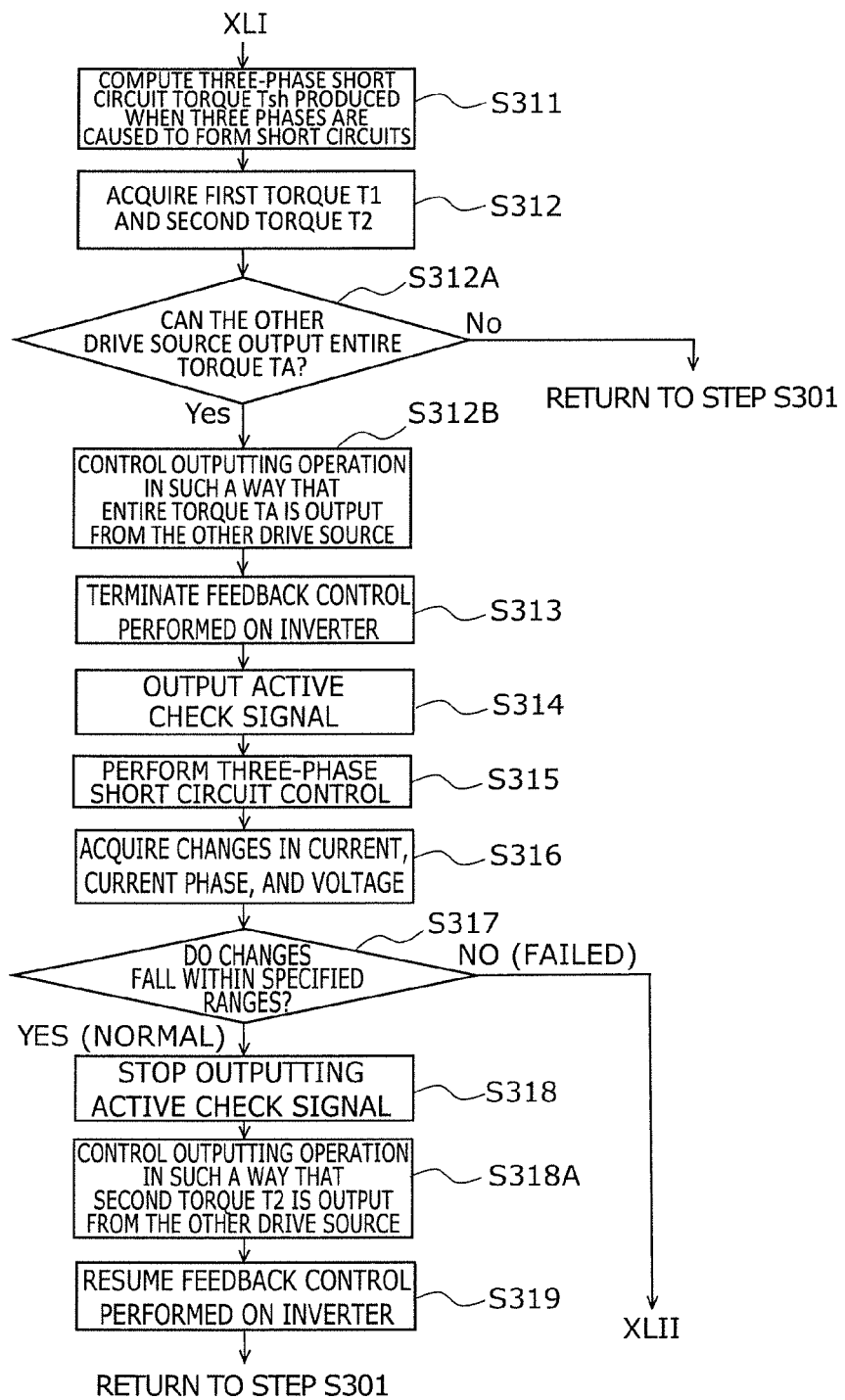
FIG. 41 is a flowchart showing the example of the action of the vehicle driving apparatus following the flowchart of FIG. 40.

FIG. 40 is a flowchart showing an example of the action of vehicle driving apparatus 5D. FIG. 41 is a flowchart showing the example of the action of vehicle driving apparatus 5D following the flowchart of FIG. 40. FIG. 42 is a flowchart showing the example of the action of vehicle driving apparatus 5D following the flowchart of FIG. 41.

The active check in vehicle driving apparatus 5D according to Embodiment 4 can be made in the case where the one drive source D1 is not used but the other drive source D2 can drive electric vehicle 301. The action of vehicle driving apparatus 5D will be sequentially described below.

Vehicle driving apparatus 5D is first activated and is in operation.

In this state, control circuit 20 reads the torque instruction from an external component (step S301). Specifically, motor control signal acquiring unit 21 reads the torque instruction information output from the ECU of electric vehicle 301.

Control circuit 20 then evaluates whether or not the torque instruction has been issued (step S302). A case where the result of the evaluation in step S302 shows that no torque instruction has been issued corresponds to the state in which vehicle driving apparatus 5D is performing no powering or regenerating operation, and control circuit 20 proceeds to the three-phase short circuit control shown in Variation 2 of Embodiment 4 (step S13 and the following steps in FIG. 46). On the other hand, a case where the result of the evaluation in step S302 shows that the torque instruction has been issued corresponds to the state in which vehicle driving apparatus 5D is performing the powering or regenerating operation, and control circuit 20 proceeds to step S310.

Control circuit 20 then evaluates whether or not vehicle driving apparatus 5D has received the powering operation instruction (step S310). Specifically, control circuit 20 evaluates whether vehicle driving apparatus 5D has received the regenerating operation Instruction (negative) or the powering operation instruction (positive) based, for example, on the sign of the torque instruction, positive or negative.

For example, when control circuit 20 determines that vehicle driving apparatus 5D has received no powering operation instruction (No in S310), control circuit 20 determines that diagnosis of failure of three-phase-short-circuit-forming circuit 33 is not performed at the current timing and returns to step S301. On the other hand, when control circuit 20 determines that vehicle driving apparatus 5D has received the powering operation instruction, control circuit 20 determines that diagnosis of failure of three-phase-short-circuit-forming circuit 33 is performed at the current timing and proceeds to the following step.

Control circuit 20 then computes three-phase short circuit torque Tsh produced when the three phases are caused to form short circuits (step S311). Three-phase short circuit torque Tsh is computed by using (Expression 12) described above.

Control circuit 20 may not necessarily compute three-phase short circuit torque Tsh by using (Expression 12). For example, control circuit 20 may store a table that is a collection of actually measured data representing the relationship between the number of revolutions of motor M1 and three-phase short circuit torque Tsh in memory 24, and may determine three-phase short circuit torque Tsh according to the number of revolutions of motor M1 based on the collection table.

Control circuit 20 then acquires first torque T1 from the one drive source D1 and second torque T2 from the other drive source D2 (step S312). For example, first torque T1 is acquired based on the torque instruction information output from the ECU, and second torque T2 is acquired from the ECU or the other drive source D2.

Control circuit 20 then evaluates whether or not the other drive source D2 can output entire torque TA, which is the sum of first torque T1 from the one drive source D1, second torque T2 from the other drive source D2, and three-phase short circuit torque Tsh (step S312A). In a case where the result of the evaluation shows that the other drive source D2 cannot output entire torque TA, no failure diagnosis is performed on three-phase-short-circuit-forming circuit 33 but control circuit 20 returns to step S301. On the other hand, in a case where the result of the evaluation shows that the other drive source D2 can output entire torque TA (Yes in S312A), control circuit 20 proceeds to the following step because performing the three-phase short circuit control does not greatly affect the traveling state of electric vehicle 301.

Control circuit 20 then controls the other drive source D2 in such a way that entire torque TA is output from the other drive source D2 (step S312B). In the control, control circuit 20 may control the one drive source D1 and the other drive source D2 in such a way that the ratio of second torque T2 to summed torque (T1+T2) gradually Increases as compared with the ratio of first torque T1 to summed torque (T1+T2).

Control circuit 20 then terminates the feedback control performed on inverter 10 (step S313). Specifically, drive signal computing unit 23 stops outputting the drive signal for performing the three-phase PWM control. The output of entire torque TA shown in step S312B may be performed simultaneously with step S313.

Control circuit 20 outputs active check signal s1 (step S314). Specifically, active check instructing unit 26 outputs active check signal s1 to check terminal 36 of drive circuit 30. Active check signal s1 is continuously output until it is stopped in step S318 or S321, which will be described later.

Inverter 10 then performs the three-phase short circuit control using three-phase-short-circuit-forming circuit 33 (step S315). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5D (step S316). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S317). Specifically, failure evaluating unit 25 evaluates whether or not the current does not fall within the specified range thereof, the current phase does not fall within the specified range thereof, and the DC voltage does not fall within the specified range thereof.

In the case where failure evaluating unit 25 determines that the changes in the current, the current phase, and the voltage all fall within the specified ranges (Yes in S317), failure evaluating unit 25 determines that three-phase-short-circuit-forming circuit 33 has not failed and is normally operating. Control circuit 20 then stops outputting active check signal s1 output from active check instructing unit 26 (step S318). In the case where entire torque TA is output from the other drive source D2 in step S312B, the output from the other drive source D2 is changed back to second torque T2 at this timing (step S318A), and the feedback control performed on inverter 10 for driving the one drive source D1 is resumed (step S319). Control circuit 20 then returns to step S301 and repeats the active check. The active check is repeatedly performed at predetermined time intervals when motor M1 is performing the powering operation.

On the other hand, when at least one of the changes in the current, the current phase, and the voltage does not fall within the corresponding specified range in step S317 (No in step S317), control circuit 20 determines that three-phase-short-circuit-forming circuit 33 has failed. Control circuit 20 then performs actions to be performed when three-phase-short-circuit-forming circuit 33 has failed, as shown in FIG. 42.

Figure 42:
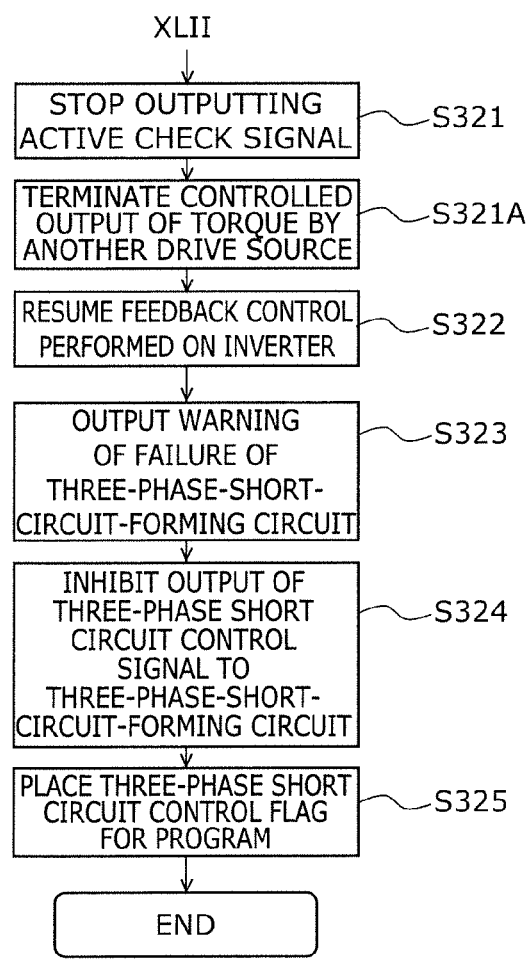
FIG. 42 is a flowchart showing the example of the action of the vehicle driving apparatus following the flowchart of FIG. 41.

Control circuit 20 stops outputting active check signal s1 output from active check instructing unit 26 (step S321), as shown in FIG. 42. In the case where entire torque TA is output from the other drive source D2 in step S312B, the output from the other drive source D2 is changed to second torque T2 (step S321A), and the feedback control performed on inverter 10 for driving the one drive source D1 is resumed (step S322).

Control circuit 20 then outputs a failure warning representing that three-phase-short-circuit-forming circuit 33 has failed to an external component, for example, the ECU (upper-level control unit) of electric vehicle 301 (step S323).

Failure evaluating unit 25 may notify the user of the failure information by displaying the failure information on a monitor or outputting a sound that informs the failure information via a loudspeaker.

Further, control circuit 20 inhibits output of the three-phase short circuit control signal to three-phase-short-circuit-forming circuit 33 (step S324). Specifically, control circuit 20 inhibits active check instructing unit 26 from outputting active check signal s1. Control circuit 20 places the flag representing the three-phase short circuit control (step S325). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5D.

Further, in the case where it is determined that three-phase-short-circuit-forming circuit 33 has failed and in the middle of operation of outputting active check signal s1, control circuit 20 may use the program stored in memory 24 in control circuit 20 to output the control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1, which is the one drive source D1, performs the powering or regenerating operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[4-3. Variation 1 of Embodiment 4]

The configuration of vehicle driving apparatus 5Da according to Variation 1 of Embodiment 4 will next be described with reference to FIGS. 43 and 44. Variation 1 will be described with reference to a case where vehicle driving apparatus 5Da is provided with a plurality of permanent magnet motors M1 in place of drive source D2 (engine) shown in Embodiment 4.

Figure 43:
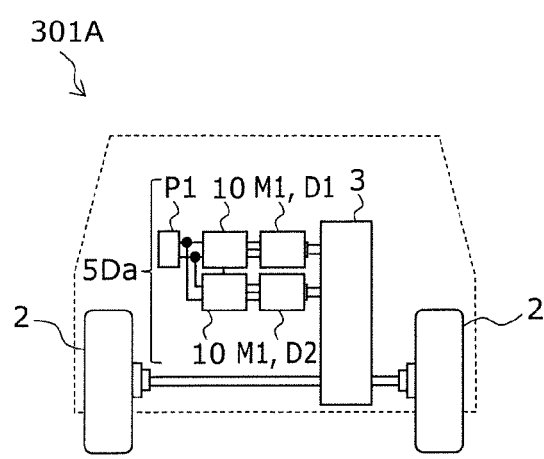
FIG. 43 shows an example of an electric vehicle including a vehicle driving apparatus according to Variation 1 of Embodiment 4.

FIG. 43 shows an example of electric vehicle 301A including vehicle driving apparatus 5Da according to Variation 1. Electric vehicle 301A includes driving wheels 2, power transmission mechanism 3, two permanent magnet motors M1, two inverters 10, and battery P1. Out of the components described above, vehicle driving apparatus 5Da includes two permanent magnet motors M1, two inverters 10, and battery P1.

Figure 44:
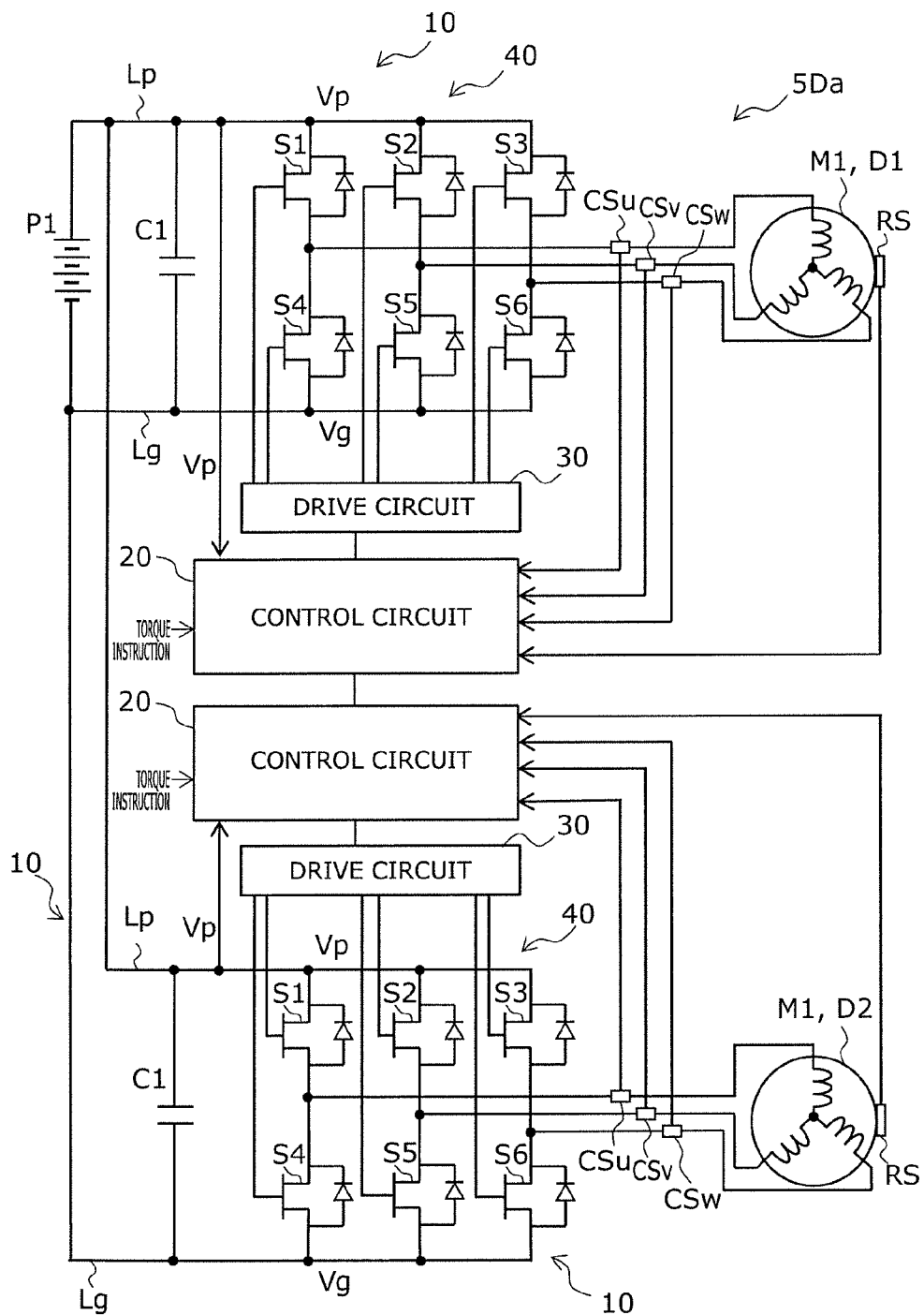
FIG. 44 is a circuit diagram showing an example of inverters, permanent magnet motors, and the battery of the vehicle driving apparatus according to Variation 1 of Embodiment 4.

FIG. 44 is a circuit diagram showing an example of inverters 10, permanent magnet motors M1, and battery P1 of vehicle driving apparatus 5Da.

Vehicle driving apparatus 5Da includes two motors M1, two inverters 10, and battery P1, as shown in FIG. 44. Inverters 10 each include three-phase bridge circuit 40, drive circuit 30, and control circuit 20.

Control circuits 20 each include motor control signal acquiring unit 21, motor control signal computing unit 22, drive signal computing unit 23, active check instructing unit 26, failure evaluating unit 25, and three-phase short circuit control signal interrupting unit 27. Control circuits 20 each further include abnormality detecting unit 29 (not shown). Control circuits 20 of inverters 10 are communicably connected to each other. FIG. 44 shows two control circuits 20, but not necessarily, and the control circuits may be replaced with one control circuit having the functions of two control circuits 20.

Drive circuit 30 has an input side connected to control circuit 20 and an output side connected to three-phase bridge circuit 40. Drive circuits 30 each include switching circuit 31, buffer circuit 32, three-phase-short-circuit-forming circuit 33, and OR circuit 34. Drive circuits 30 each further include check terminal 36 and abnormality accepting terminal 39 (not shown).

Three-phase bridge circuits 40 each include switch elements S1, S2, and S3 provided in an upper arm group and switch elements S4, S5, and S6 provided in a lower arm group. Switch elements S1 to S6 are connected to drive circuit 30 and driven by signals output from drive circuit 30. Motors M1 are each driven, for example, in the form of powering, regenerating, or coasting operation based on the driven states of switch elements S1 to S6.

Vehicle driving apparatus 5Da according to Variation 1 includes two motors M1, one inverter 10 that drives one drive source D1, which is one of two motors M1, and another inverter 10 that drives another drive source D2, which is the other one of two motors M1.

Figure 45:
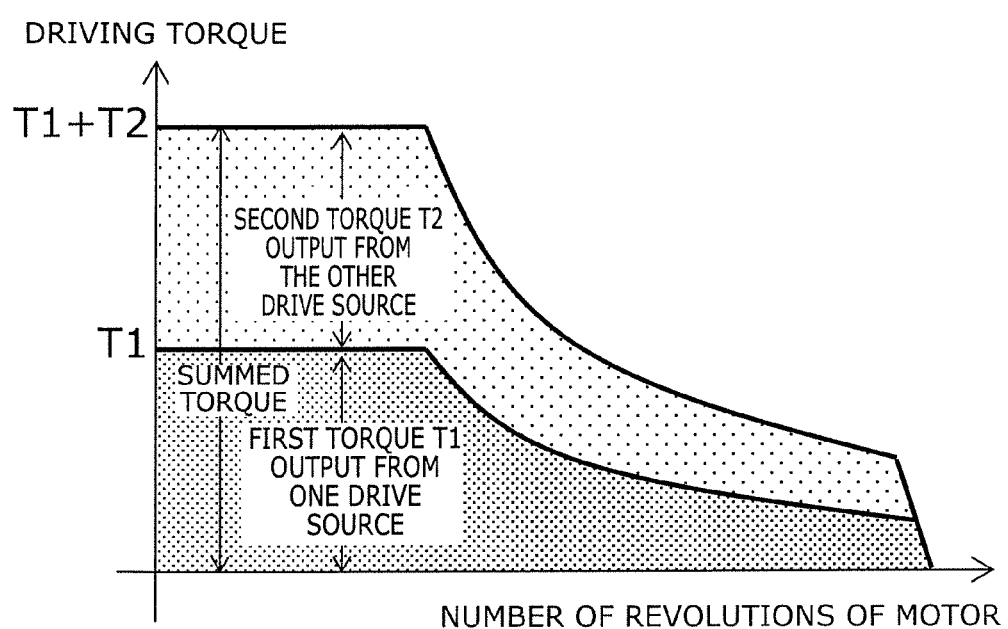
FIG. 45 is a graph showing the torque output from one drive source and an other drive source in the vehicle driving apparatus according to Variation 1 of Embodiment 4.

FIG. 45 shows the torque output from the one drive source D1 in vehicle driving apparatus 5Da and the torque output from the other drive source D2 in vehicle driving apparatus 5Da. Vehicle driving apparatus 5Da is driven by summed torque (T1+T2), which is the sum of first torque T1 output from the one drive source D1 and second torque T2 output from the other drive source D2, as shown in FIG. 45. First torque T1 and second torque T2 are each fixed in a region where the number of revolutions of motor M1 is small and gradually decrease after the number of revolutions of motors M1 exceeds a predetermined value.

In the case where electric vehicle 301A can be driven without using the one drive source D1 but by using the other drive source D2, control circuits 20 output active check signal s1 to one of check terminals 36 provided in the one inverter 10, whereas in the case where electric vehicle 301A can be driven without using the other drive source D2 but by using the one drive source D1, control circuits 20 output active check signal s1 to the other check terminal 36 provided in the other inverter 10.

As described above, outputting active check signal s1 in the case where electric vehicle 301A can be driven without using the one drive source D1 but by using the other drive source D2 allows reduction in the effect on the traveling state of electric vehicle 301A when the three-phase short circuit control is performed in motor M1 that is the one drive source D1. Similarly, outputting active check signal s1 in the case where electric vehicle 301A can be driven without using the other drive source D2 but by using the one drive source D1 allows reduction in the effect on the traveling state of electric vehicle 301A when the three-phase short circuit control is performed in motor M1 that is the other drive source D2.

In vehicle driving apparatus 5Da, drive circuit 30 provided in the one inverter 10 may switch the switching control performed in the one motor M1 to the three-phase short circuit control performed by three-phase-short-circuit-forming circuit 33 when drive circuit 30 accepts active check signal s1, and drive circuit 30 provided in the other inverter 10 may switch the switching control performed in the other motor M1 to the three-phase short circuit control performed by three-phase-short-circuit-forming circuit 33 when drive circuit 30 accepts active check signal s1.

In a case where the one motor M1 performs the powering or regenerating operation during the output of active check signal s1 to the one check terminal 36, control circuits 20 may stop outputting active check signal s1. Similarly, in a case where the other motor M1 performs the powering or regenerating operation during the output of active check signal s1 to the other check terminal 36, control circuits 20 may stop outputting active check signal s1.

Control circuits 20 may alternately output active check signal s1 to the one check terminal 36 and the other check terminal 36.

[4-4. Variation 2 of Embodiment 4]

The action of vehicle driving apparatus 5D according to Variation 2 of Embodiment 4 will next be described with reference to FIGS. 46 and 47. In Variation 2, a description will be made of the case where whether or not the three-phase-short-circuit-forming circuit has failed is checked in the state in which the permanent magnet motor is performing no powering or regenerating operation. The configuration of vehicle driving apparatus 5D according to Variation 2 of Embodiment 4 is the same as that of vehicle driving apparatus 5D shown in Embodiment 4 and will therefore not be described. Variation 2 is not limited to vehicle driving apparatus 5D and is also applicable to vehicle driving apparatus 5Da.

Figure 46:
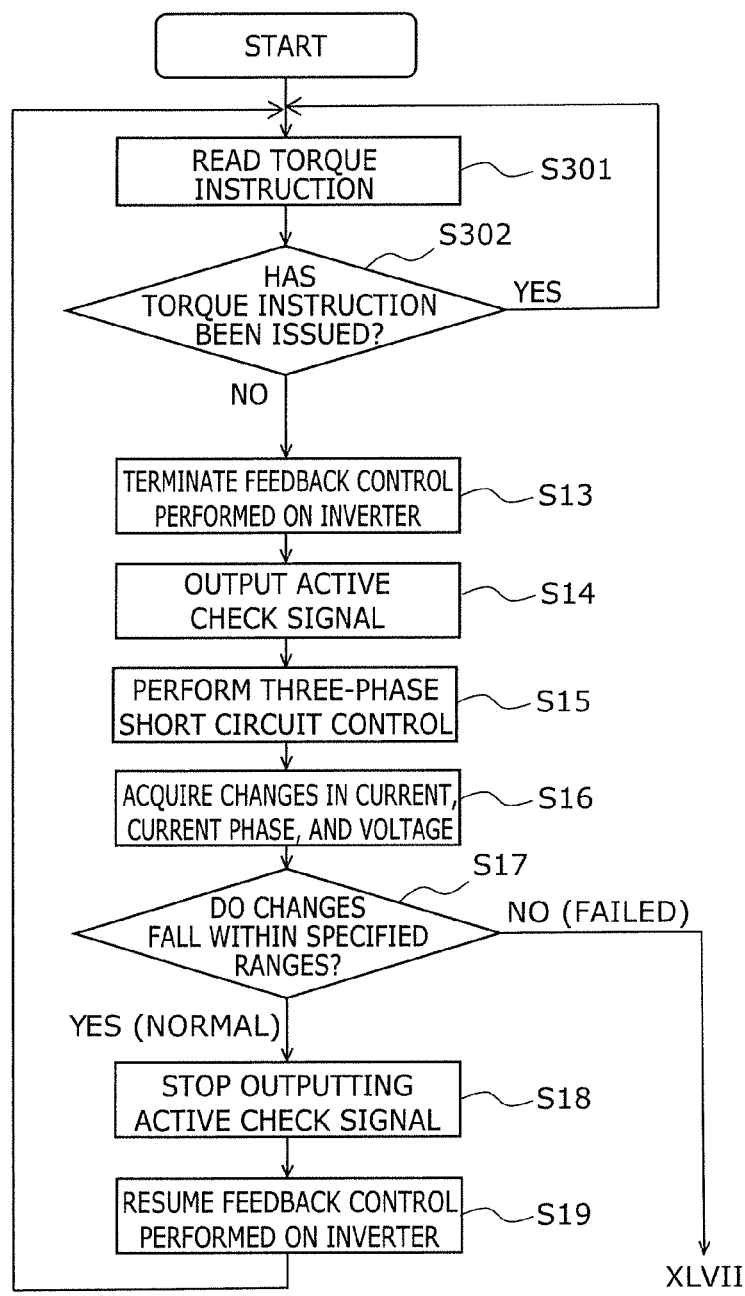
FIG. 46 is a flowchart showing an example of the action of the vehicle driving apparatus according to Variation 2 of Embodiment 4.

FIG. 46 is a flowchart showing an example of the action of vehicle driving apparatus 5D according to Variation 2 of Embodiment 4. FIG. 47 is a flowchart showing the example of the action of vehicle driving apparatus 5D according to Variation 2 following the flowchart of FIG. 46.

Vehicle driving apparatus 5D according to Variation 2 is first activated and is in operation.

In this state, control circuit 20 reads the torque instruction from an external component (step S301). Specifically, motor control signal acquiring unit 21 reads the torque instruction information output from the ECU of electric vehicle 301.

Control circuit 20 then evaluates whether or not the torque instruction has been issued (step S302). In the case where the result of the evaluation in step S302 shows that the torque instruction has been issued, control circuit 20 proceeds to step S210 as described above. On the other hand, the case where the result of the evaluation shows that no torque instruction has been issued corresponds to the state in which vehicle driving apparatus 5D is performing no powering or regenerating operation, and control circuit 20 proceeds to the following step.

Control circuit 20 then terminates feedback control performed on inverter 10 (step S13). Specifically, drive signal computing unit 23 stops outputting the drive signal for performing the three-phase PWM control.

Control circuit 20 outputs active check signal s1 (step S14). Specifically, active check instructing unit 26 outputs active check signal s1 to check terminal 36 of drive circuit 30. Active check signal s1 is continuously output until it is stopped in step S18 or S21, which will be described later.

Inverter 10 then performs the three-phase short circuit control using three-phase-short-circuit-forming circuit 33 (step S15). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the drive signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in the current, the current phase, and the voltage in vehicle driving apparatus 5D (step S16). Specifically, motor control signal acquiring unit 21 acquires information, for example, on current sensors CSu, CSv, and CSw, rotational position sensor RS, and voltage Vp across power source wire Lp. These pieces of information are converted by motor control signal computing unit 22 and output as control signals to failure evaluating unit 25.

Control circuit 20 then evaluates whether or not three-phase-short-circuit-forming circuit 33 has failed based on whether or not the changes in the current, the current phase, and the voltage fall within specified ranges (step S17). Specifically, failure evaluating unit 25 evaluates whether or not the current does not fall within the specified range thereof, the current phase does not fall within the specified range thereof, and the DC voltage does not fall within the specified range thereof.

In a case where failure evaluating unit 25 determines that the changes in the current, the current phase, and the voltage all fall within the specified ranges (Yes in S17), failure evaluating unit 25 determines that three-phase-short-circuit-forming circuit 33 has not failed and is normally operating. Control circuit 20 then stops outputting active check signal s1 output from active check instructing unit 26 (step S18) and resumes the feedback control performed on inverter 10 (step S19). Control circuit 20 then returns to step S301 and repeats the active check. The active check is repeatedly performed at predetermined time intervals.

On the other hand, when at least one of the changes in the current, the current phase, and the voltage does not fall within the corresponding specified range (No in step S17), control circuit 20 determines that three-phase-short-circuit-forming circuit 33 has failed. Control circuit 20 then performs actions to be performed when three-phase-short-circuit-forming circuit 33 has failed, as shown in FIG. 47.

Figure 47:
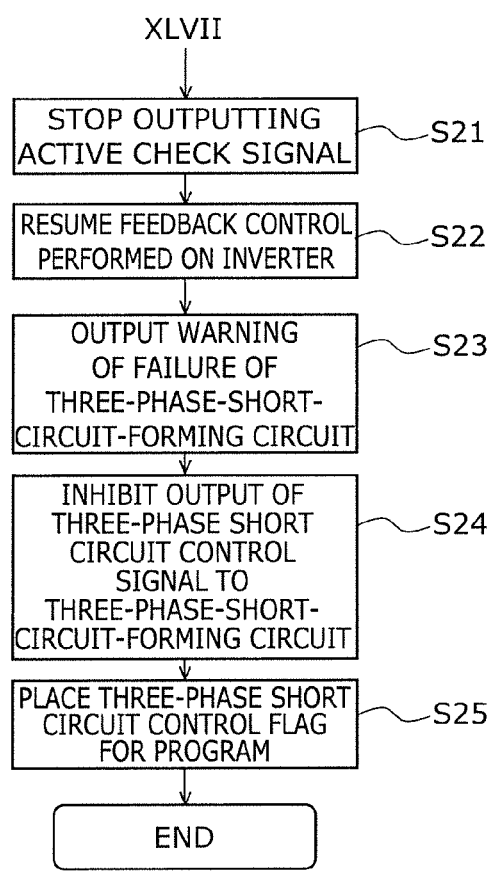
FIG. 47 is a flowchart showing the example of the action of the vehicle driving apparatus following the flowchart of FIG. 46.

Control circuit 20 stops outputting active check signal s1 output from active check instructing unit 26 (step S21) and resumes the feedback control performed on inverter 10 (step S22), as shown in FIG. 47.

Control circuit 20 then outputs a failure warning representing that three-phase-short-circuit-forming circuit 33 has failed to an external component, for example, the ECU (upper-level control unit) of electric vehicle 301 (step S23). Failure evaluating unit 25 may notify a user of the failure information by displaying the failure information on a monitor or outputting a sound that informs the failure information via a loudspeaker.

Further, control circuit 20 inhibits output of a three-phase short circuit control signal to three-phase-short-circuit-forming circuit 33 (step S24). Specifically, control circuit 20 inhibits active check instructing unit 26 from outputting active check signal s1. Control circuit 20 places a flag representing the three-phase short circuit control (step S25). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5D.

Further, in the case where it is determined that three-phase-short-circuit-forming circuit 33 has failed and in the middle of operation of outputting active check signal s1, control circuit 20 may use the program stored in memory 24 in control circuit 20 to output a control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

In a case where motor M1 performs powering or regenerating operation during the output of active check signal s1, control circuit 20 may stop outputting active check signal s1. Having stopped outputting active check signal s1, control circuit 20 may nullify the result of the evaluation of whether or not three-phase-short-circuit-forming circuit 33 has failed.

[4-5. Variation 3 of Embodiment 4]

Vehicle driving apparatus 5D according to Variation 3 of Embodiment 4 will next be described with reference to FIGS. 48 and 49. In Variation 3, the description will be made of the active check made in the case where the number of revolutions of motor M1 falls within a predetermined threshold range.

Figure 48:
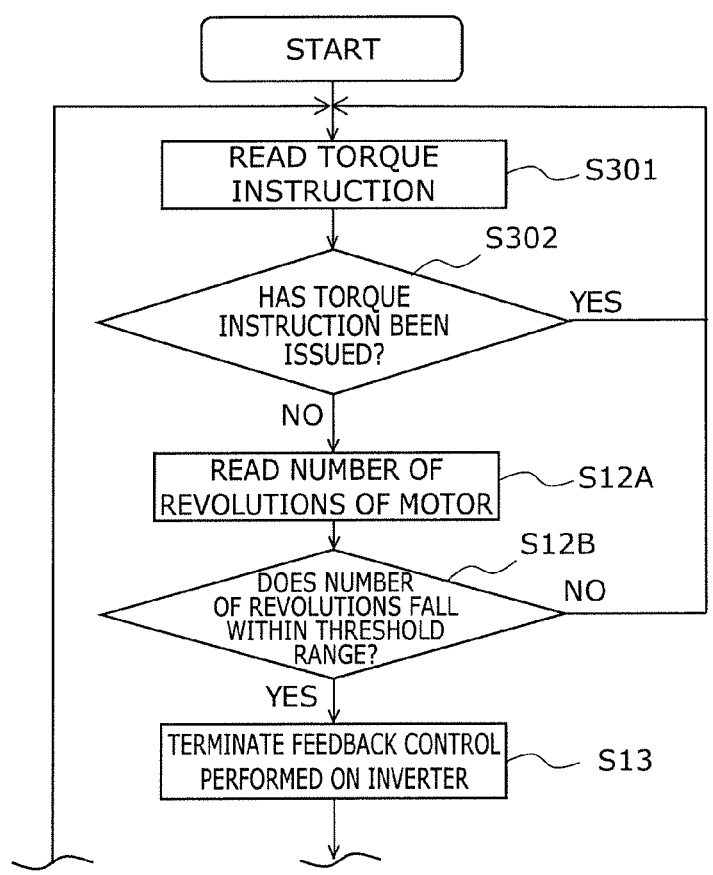
FIG. 48 is a flowchart showing an example of the action of the vehicle driving apparatus according to Variation 3 of Embodiment 4.
Figure 49:
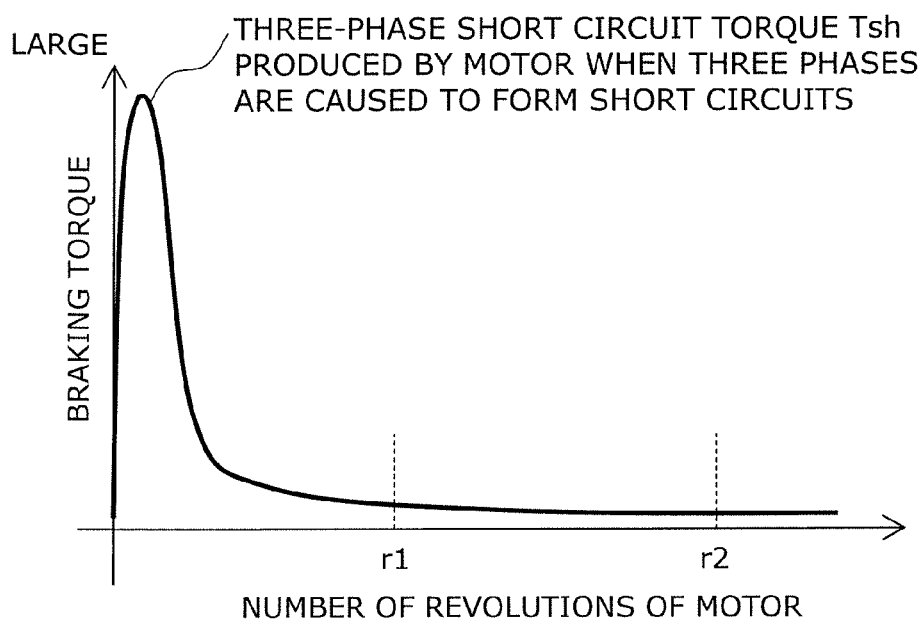
FIG. 49 is a graph showing the torque produced when the three phases of the permanent magnet motor in the vehicle driving apparatus according to Variation 3 of Embodiment 4 are caused to form short circuits.

FIG. 48 is a flowchart showing an example of the action of vehicle driving apparatus 5D according to Variation 3 of Embodiment 4. FIG. 49 shows the torque produced when the three phases of the permanent magnet motor in vehicle driving apparatus 5D according to Variation 3 are caused to form short circuits. FIG. 49 shows that braking torque increases in the direction toward the positive side (upper side) of the vertical axis of FIG. 49.

A method for operating vehicle driving apparatus 5D according to Variation 3 of Embodiment 4 includes the step of evaluating the number of revolutions of motor M1 to determine whether or not the active check is made. The step is located between step S302 of evaluating whether or not the torque instruction has been issued and step S13 of terminating the feedback control performed on inverter 10.

Specifically, after the result of the evaluation in step S302 shows that no torque instruction has been issued, the number of revolutions of motor M1 is read (step S12A), as shown in FIG. 48. The number of revolutions of motor M1 can be determined based on the result of the sensing performed by rotational position sensor RS.

It is then evaluated whether or not the number of revolutions of motor M1 falls within the predetermined threshold range (step S12B). Specifically, first threshold r1, which is a threshold of the number of revolutions of motor M1, and second threshold r2, which is greater than first threshold r1, are set, and it is evaluated whether or not the number of revolutions of motor M1 is greater than or equal to first threshold r1 but smaller than or equal to second threshold r2. In a case where the number of revolutions is greater than or equal to first threshold r1 but smaller than or equal to second threshold r2 (Yes in S12B), control circuit 20 proceeds to the steps where the active check is made. On the other hand, in a case where the number of revolutions is not greater than or equal to first threshold r1 but smaller than or equal to second threshold r2 (No in S12B), control circuit 20 returns to step S301.

The reason why whether or not the active check can be made is determined based on the number of revolutions of motor M1 is as follows: When the active check is made when the number of revolutions of motor M1 is smaller than first threshold r1, large braking torque is abruptly produced in some cases, as shown in FIG. 49. To avoid the situation described above, the active check is made in Variation 3 in the case where the number of revolutions of motor M1 is greater than or equal to first threshold r1. Further, when the active check is made when the number of revolutions of motor M1 is greater than second threshold r2, that is, when it is estimated that relatively wild driving is being performed, an abrupt change in torque instruction issued to motor M1 cannot be handled in some cases. In view of the fact described above, the active check is made in Variation 3 when the number of revolutions of motor M1 is smaller than or equal to second threshold r2.

As described above, in vehicle driving apparatus 5D according to Variation 3 of Embodiment 4, whether or not the active check can be made is determined in accordance with the number of revolutions of motor M1. Abrupt torque variation that may occur when vehicle driving apparatus 5D is driven can thus be suppressed. Variation 3 is not limited to vehicle driving apparatus 5D and is also applicable to vehicle driving apparatus 5Da.

Embodiment 4 described above is an essentially preferable example and is not Intended to limit the scope of the present invention, an object to which the present invention is applied, or the application of the present invention.

For example, the control circuit described above may control the one drive source and the other drive source described above in such a way that the ratio of the second torque to the summed torque that is the sum of the first torque and the second torque is greater than the ratio of the first torque to the summed torque and then output the active check signal.

Therefore, when the entire torque is replaced with the torque output from the other drive source, occurrence of an abrupt torque variation can be suppressed.

Further, the drive circuit provided in the one inverter may switch the switching control performed in the one permanent magnet motor to the three-phase short circuit control performed by the three-phase-short-circuit-forming circuit when the drive circuit accepts the active check signal, and the drive circuit provided in the other inverter may switch the switching control performed in the other permanent magnet motor to the three-phase short circuit control performed by the three-phase-short-circuit-forming circuit when the drive circuit accepts the active check signal.

The drive circuits' switching of the control performed in the permanent magnet motors to the three-phase short circuit control performed by the three-phase-short-circuit-forming circuits allows the vehicle driving apparatus to check whether or not the three-phase-short-circuit-forming circuits can perform the three-phase short circuit control. Potential failure of the three-phase short circuit control in the inverters can therefore be located at an early stage to Increase the reliability of the vehicle driving apparatus.

The control circuits may alternately output the active check signal to the one check terminal and the other check terminal.

The vehicle driving apparatus can therefore alternately check whether or not the three-phase-short-circuit-forming circuits can each perform the three-phase short circuit control. Potential failure of the three-phase short circuit control in the inverters can therefore be located at an early stage to Increase the reliability of the vehicle driving apparatus.

Embodiment 5

A vehicle driving apparatus according to Embodiment 5 will be described with reference to FIGS. 50 to 60.

In Embodiment 5 below, the description will be made of a case where whether or not the three-phase-short-circuit-forming circuit has failed is checked when the vehicle is stationary instead of in motion. Further, in Embodiment 5 below, the overall configuration of the vehicle driving apparatus will be described in [5-1. Configuration of vehicle driving apparatus], and the configuration for diagnosis of failure of the three-phase-short-circuit-forming circuit in the stationary vehicle will be described in [5-2. Configuration, effect, and the like for failure diagnosis].

[5-1. Configuration of Vehicle Driving Apparatus]

The configuration of vehicle driving apparatus 5E according to Embodiment 5 will first be described with reference to FIGS. 50 to 52.

Figure 50:
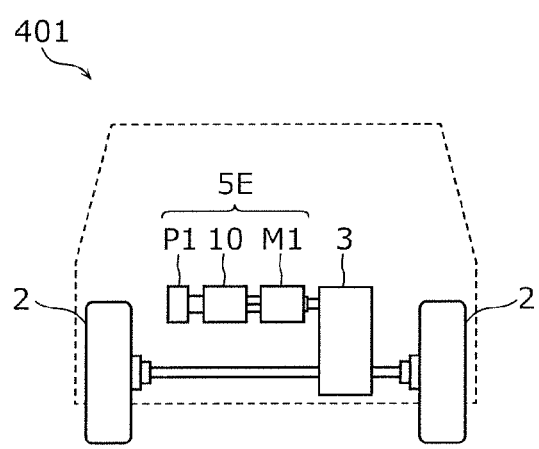
FIG. 50 is an outline diagram showing an example of an electric vehicle including a vehicle driving apparatus according to Embodiment 5.

FIG. 50 shows an example of electric vehicle 401 including vehicle driving apparatus 5E according to Embodiment 5. Electric vehicle 401 includes driving wheels 2, power transmission mechanism 3, permanent magnet motor M1, inverter 10, and battery P1. Out of the components described above, vehicle driving apparatus 5E includes permanent magnet motor M1, inverter 10, and battery P1. Permanent magnet motor M1 is hereinafter referred to as motor M1 in some cases.

Motor M1 is a three-phase AC motor that drives driving wheels 2 of electric vehicle 401 and is, for example, a magnet embedded synchronous motor, a surface mounted magnet synchronous motor, or any other motor.

Power transmission mechanism 3 is formed, for example, of a differential gear and a drive shaft and transmits power between motor M1 and driving wheels 2. The rotational force produced by motor M1 is transmitted to driving wheels 2 via power transmission mechanism 3. Similarly, the rotational force produced by driving wheels 2 is transmitted to motor M1 via power transmission mechanism 3. Electric vehicle 401 may not include power transmission mechanism 3 and may have a structure in which motor M1 is directly connected to driving wheels 2.

Battery P1 is, for example, a DC power source, such as a lithium ion battery. Battery P1 supplies electric power for driving motor M1 and accumulates the electric power.

Inverter 10 converts the DC electric power supplied from battery P1, for example, into three-phase AC electric power and supplies motor M1 with the AC electric power. As described above, vehicle driving apparatus 5E is configured to drive three-phase AC motor M1 by using the electric power from battery P1.

Figure 51:
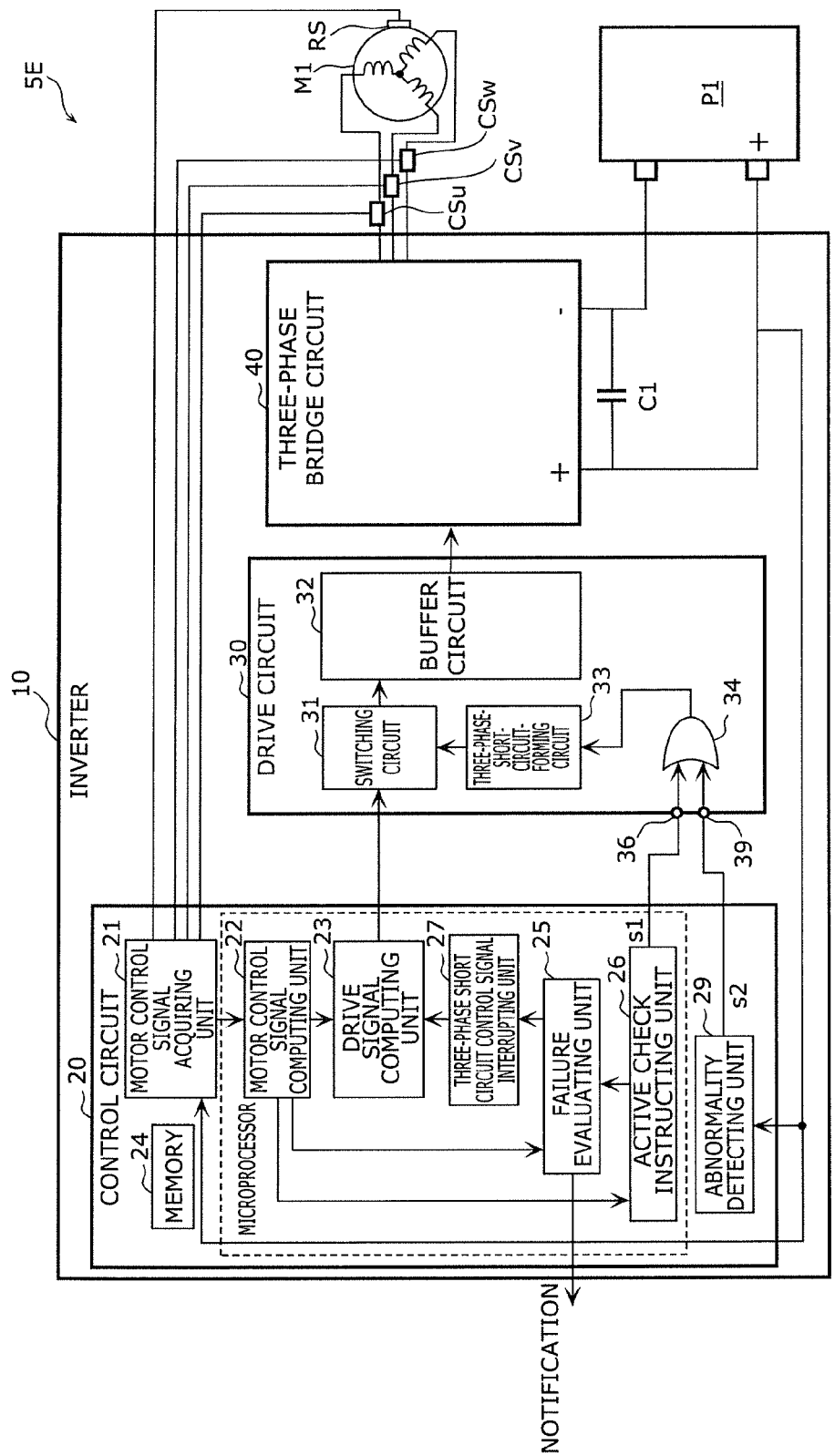
FIG. 51 is a circuit diagram showing an example of an inverter, a permanent magnet motor, and a battery of the vehicle driving apparatus according to Embodiment 5.

FIG. 51 is a circuit diagram showing an example of inverter 10, permanent magnet motor M1, and battery P1 of vehicle driving apparatus 5E.

Vehicle driving apparatus 5E includes motor M1, inverter 10, and battery P1, as shown in FIG. 51. Inverter 10 includes three-phase bridge circuit 40, drive circuit 30, and control circuit 20. FIG. 51 also shows smoothing capacitor C1, which smoothens voltage applied to three-phase bridge circuit 40.

Three-phase bridge circuit 40 is a circuit that performs a switching action to convert the DC electric power supplied from battery P1 into three-phase AC electric power and supplies motor M1 with the AC electric power to drive motor M1. Three-phase bridge circuit 40 has a switching action control input side connected to drive circuit 30, an electric power Input side connected to battery P1, and an output side connected to motor M1. It is noted that when motor M1 performs regeneration, regenerative current is introduced from the output side of three-phase bridge circuit 40 and flows toward the electric power input side. In the description, however, the side to which battery P1 is connected is defined as the input side, and the side to which motor M1 is connected is defined as the output side.

Figure 52:
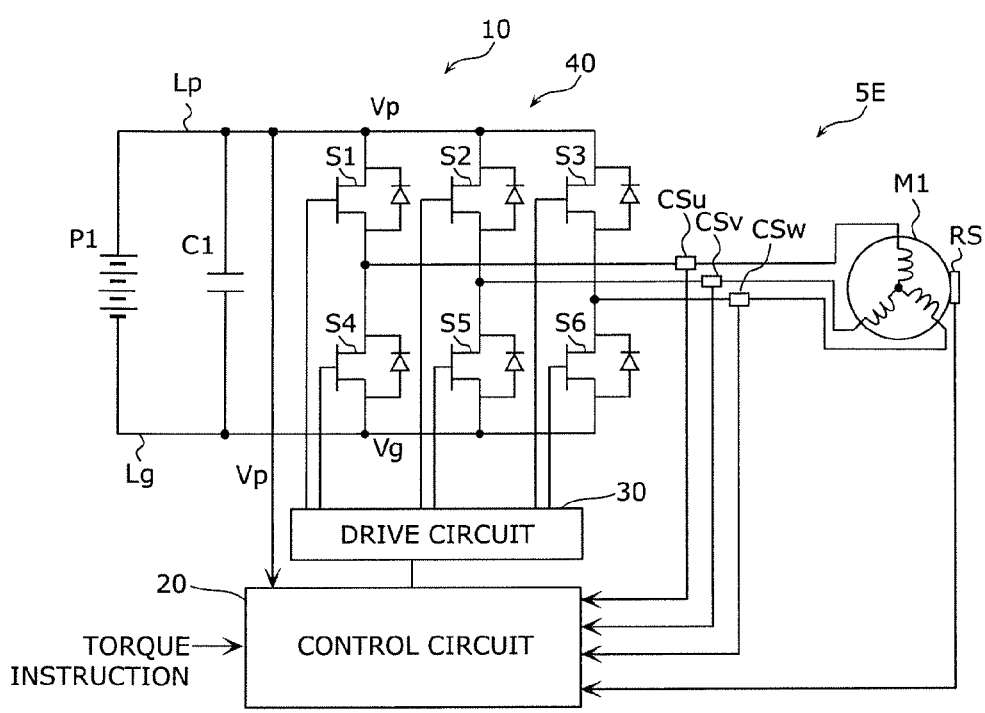
FIG. 52 is a circuit diagram showing an example of a three-phase bridge circuit provided in the inverter of the vehicle driving apparatus according to Embodiment 5.

FIG. 52 is a circuit diagram showing an example of three-phase bridge circuit 40 provided in inverter 10 of vehicle driving apparatus 5E. In FIG. 52, voltage Vp is power source voltage, and voltage Vg is ground voltage.

Three-phase bridge circuit 40 includes switch elements S1, S2, and S3, which are provided in an upper arm group located on the upper side of FIG. 52, and switch elements S4, S5, and S6, which are provided in a lower arm group located on the lower side of FIG. 52. For example, switch elements S1 to S6 are each formed, for example, of a field effect transistor (FET) or an insulated gate bipolar transistor (IGBT). Switch elements S1 to S6 may instead each be made of a wide bandgap semiconductor.

Switch elements S1, S2, and S3 are connected to three output wires drawn from three terminals of motor M1 and to power source wire Lp connected to the anode of battery P1 and are located between the three output wires and power source wire Lp. Switch elements S4, S5, and S6 are connected to the three output wires described above and to ground wire Lg connected to the cathode of battery P1 and located therebetween. A freewheel diode is connected to each of switch elements S1 to S6 In parallel thereto. The freewheel diodes may instead be parasitic diodes parasitic on switch elements S1 to S6.

Switch elements S1 to S6 are connected to drive circuit 30 and driven by signals output from drive circuit 30. Motor M1 is driven, for example, in the form of powering, regenerating, or coasting operation based on the driven states of switch elements S1 to S6.

Drive circuit 30 will next be described with reference to FIG. 51.

Drive circuit 30 is a circuit that drives switch elements S1 to S6 in three-phase bridge circuit 40 to perform the three-phase PWM control and the three-phase short circuit control. Drive circuit 30 has an input side connected to control circuit 20 and an output side connected to three-phase bridge circuit 40.

Drive circuit 30 includes switching circuit 31, buffer circuit 32, three-phase-short-circuit-forming circuit 33, and OR circuit 34. Drive circuit 30 further includes check terminal 36 and abnormality accepting terminal 39.

Abnormality accepting terminal 39 is a terminal that accepts abnormality accepting terminal s2, which notifies an abnormal state of inverter 10. Abnormality signal s2 is output from abnormality detecting unit 29, which will be described later, to drive circuit 30.

Check terminal 36 is a terminal that accepts active check signal s1, which causes three-phase-short-circuit-forming circuit 33 to perform the three-phase short circuit control. Active check signal s1 is output from control circuit 20 to drive circuit 30. In the following description, causing three-phase-short-circuit-forming circuit 33 to attempt the three-phase short circuit control and checking whether or not three-phase-short-circuit-forming circuit 33 can perform the three-phase short circuit control is called an active check. Making the active check allows diagnosis of whether or not three-phase-short-circuit-forming circuit 33 has failed.

The signals input to check terminal 36 and abnormality accepting terminal 39 are input to OR circuit 34. OR circuit 34 outputs a signal to three-phase-short-circuit-forming circuit 33 in a case where at least one of check terminal 36 and abnormality accepting terminal 39 has accepted the corresponding signal. Three-phase-short-circuit-forming circuit 33 is driven based on the signal output from OR circuit 34. In other words, three-phase-short-circuit-forming circuit 33 is driven based on the abnormality detection input signal and the active check input signal.

Three-phase-short-circuit-forming circuit 33 is a circuit used to cause the three phases of motor M1 to form short circuits. Specifically, three-phase-short-circuit-forming circuit 33 is a circuit that causes, out of switch elements S1 to S3 in the upper arm group and switch elements S4 to S6 in the lower arm group of three-phase bridge circuit 40, the switch elements in one of the arm groups to form short circuits and the switch elements in the other arm group to open based on the signal output from OR circuit 34. Causing the three phases of motor M1 to form short circuits as described above allows the induced voltage from the gap between the winding coils of motor M1 to be zero. As a result, for example, in a case where overvoltage is detected in three-phase bridge circuit 40, three-phase-short-circuit-forming circuit 33 can be caused to operate and perform the three-phase short circuit control to lower the overvoltage applied to three-phase bridge circuit 40.

Switching circuit 31 is a circuit that switches a state in which three-phase bridge circuit 40 is driven based on a drive signal output from drive signal computing unit 23, which will be described later, to a state in which three-phase bridge circuit 40 is driven by using a signal output from three-phase-short-circuit-forming circuit 33 and vice versa. The drive signal output from drive signal computing unit 23 contains a variety of signals, such as a signal that causes three-phase PWM control to be performed on three-phase bridge circuit 40. The switching performed by switching circuit 31 is achieved, for example, by a hardware logic circuit. Switching circuit 31 in the present embodiment switches switching control or any other control performed by motor M1 to the three-phase short circuit control performed by three-phase-short-circuit-forming circuit 33 when drive circuit 30 accepts active check signal s1 via check terminal 36.

Buffer circuit 32 is a circuit that amplifies an output signal to be output to three-phase bridge circuit 40 in such a way that three-phase bridge circuit 40 can drive switch elements S1 to S6. The output signal amplified by buffer circuit 32 can drive three-phase bridge circuit 40.

Control circuit 20 will next be described with reference to FIG. 51.

Control circuit 20 is formed of a microprocessor that performs, for example, a variety of type of computation and memory 24, which stores, for example, a program or information for operating the microprocessor.

Control circuit 20 includes motor control signal acquiring unit 21, motor control signal computing unit 22, drive signal computing unit 23, active check instructing unit 26, failure evaluating unit 25, and three-phase short circuit control signal Interrupting unit 27, as shown in FIG. 51. Control circuit 20 further includes abnormality detecting unit 29.

Motor control signal acquiring unit 21 acquires information sensed by a variety of sensors, such as current sensors CSu, CSv, and CSw, which each sense current flowing through motor M1, and rotational position sensor RS, which detects the magnetic pole positions of motor M1 to sense the rotational position. Current sensors CSu, CSv, and CSw are sensors that sense the current values in the phases u, v, and w of motor M1. Motor control signal acquiring unit 21 further acquires information on voltage Vp across power source wire Lp. Motor control signal acquiring unit 21 still further acquires control instruction information, such as a torque instruction output from a component external to control circuit 20, for example, an electronic control unit (ECU) of electric vehicle 401.

Motor control signal computing unit 22 converts the value of the torque instruction into current through computation based on the information acquired by motor control signal acquiring unit 21 and outputs a control signal for performing current control on motor M1. For example, motor control signal computing unit 22 outputs the control signal for performing current control on motor M1 in such a way that the torque produced by motor M1 when vehicle driving apparatus 5E is driven is equal to target torque indicated by the torque instruction information (for example, torque according to the amount of operated accelerator pedal or brake pedal of electric vehicle 401).

Further, motor control signal computing unit 22 converts the information acquired by motor control signal acquiring unit 21 through computation and outputs a control signal for making the active check and failure evaluation. For example, motor control signal computing unit 22 converts the control instruction information, such as the torque instruction, into the control signal described above and outputs the control signal to drive signal computing unit 23 and active check instructing unit 26. Moreover, motor control signal computing unit 22 converts information, such as current flowing through motor M1, the rotational positions of the magnetic poles of motor M1, and voltage Vp across power source wire Lp, into control signals and outputs the control signal to drive signal computing unit 23 and failure evaluating unit 25.

Active check instructing unit 26 is a circuit that outputs active check signal s1 to check terminal 36. The active check refers to causing three-phase-short-circuit-forming circuit 33 to attempt the three-phase short circuit control and checking whether or not three-phase-short-circuit-forming circuit 33 can perform the three-phase short circuit control, as described above. Active check instructing unit 26 evaluates based on the control signals output from motor control signal computing unit 22 whether or not the active check made at the current timing affects the traveling state or stationary state of electric vehicle 401.

For example, active check instructing unit 26 determines that the active check is made in the state in which electric vehicle 401 is stationary and motor M1 is performing no powering operation (waiting for traffic light, for example) and outputs active check signal s1. At this point, active check instructing unit 26 further outputs the busy signal representing that the active check is being made simultaneously with outputting active check signal s1 to failure evaluating unit 25. Evaluation of whether or not the active check is made may not necessarily be performed by active check instructing unit 26 and may Instead be performed by a circuit different from active check instructing unit 26 but is provided in control circuit 20.

Failure evaluating unit 25 is a circuit that evaluates whether or not three-phase-short-circuit-forming circuit 33 has failed. Failure evaluating unit 25 acquires information on a change in the current flowing through the three phases of motor M1 after the three-phase short circuit control is performed. A change in the current can be determined based on a current value detected with each of current sensors CSu, CSv, and CSw.

Failure evaluating unit 25 evaluates whether or not the three-phase-short-circuit-forming circuit has failed based on the acquired information described above. For example, failure evaluating unit 25 determines that three-phase-short-circuit-forming circuit 33 has failed in the case where a change in the current described above after the three-phase short circuit control is performed does not fall within a specified range. Having determined that three-phase-short-circuit-forming circuit 33 has failed, failure evaluating unit 25 outputs a notification signal that notifies an external component of information on the failure.

Abnormality detecting unit 29 is a circuit that detects abnormality that occurs in inverter 10, such as overvoltage. The following description will be made on the assumption that abnormality detecting unit 29 is a circuit that detects overvoltage that occurs due, for example, to a defect, such as disconnection of power source wire Lp, or failure of switch elements S1 to S6, current sensors CSu, CSv, and CSw, rotational position sensor RS, and other components. Abnormality detecting unit 29 is connected to power source wire Lp of three-phase bridge circuit 40 on the positive side of battery P1. When abnormality detecting unit 29 detects abnormality (overvoltage in the description), abnormality signal s2 is output to abnormality accepting terminal 39. Since abnormality signal s2 causes three-phase-short-circuit-forming circuit 33 to perform the three-phase short circuit control, the overvoltage applied to three-phase bridge circuit 40 can be suppressed. The overvoltage presented in the description, which is abnormality detected by abnormality detecting unit 29, can occur, for example, when the positive-side wiring of battery P1 comes off or is disconnected or a main relay that is not shown but is provided in battery P1 is opened. Since abnormality detecting unit 29 and drive circuit 30 (including three-phase-short-circuit-forming circuit 33) are each formed of hardware, emergency actions formed of detection of abnormality performed by abnormality detecting unit 29 and the three-phase short circuit control performed by three-phase-short-circuit-forming circuit 33 are automatically and quickly performed. Abnormality detecting unit 29 is not necessarily provided in control circuit 20 and may be so provided as to be external to control circuit 20. Abnormality detecting unit 29 does not necessarily have the overvoltage detecting configuration and may have a configuration that directly detects output abnormality (such as output voltage that does not fall within predetermined range) of any of current sensors CSu, CSv, and CSw, rotational position sensor RS, and other sensors.

Drive signal computing unit 23 computes a drive signal required to drive motor M1 based on the control signals output from motor control signal computing unit 22 and outputs the drive signal to drive circuit 30. Drive signal computing unit 23 outputs a drive signal for performing the three-phase PWM control when vehicle driving apparatus 5E is normally driven. Drive signal computing unit 23 outputs a signal for performing current control on motor M1 to drive circuit 30 before active check signal s1 is output, that is, before the three-phase short circuit control is performed. The current control will be described later.

When abnormality of inverter 10 is detected and when failure evaluating unit 25, which will be described later, determines that three-phase-short-circuit-forming circuit 33 has failed, drive signal computing unit 23 outputs a drive signal for performing the three-phase short circuit control based on the program stored in memory 24.

The three-phase short circuit control performed based on the program is performed by three-phase short circuit control signal interrupting unit 27. Specifically, once failure information is received from failure evaluating unit 25 indicating that three-phase-short-circuit-forming circuit 33 has failed, three-phase short circuit control signal Interrupting unit 27 outputs an interrupt signal for performing the three-phase short circuit control to drive signal computing unit 23 when abnormality of inverter 10 is detected. Upon reception of the interrupt signal, drive signal computing unit 23 changes a three-phase PWM control drive signal to a three-phase short circuit control drive signal and outputs the drive signal to drive circuit 30.

As described above, control circuit 20 outputs drive signals for performing the three-phase PWM control and the three-phase short circuit control to drive circuit 30. Drive circuit 30 selects one of the drive signal output from control circuit 20 and the signal output from three-phase-short-circuit-forming circuit 33 and outputs the selected signal to three-phase bridge circuit 40. Three-phase bridge circuit 40 drives motor M1 based on a signal output from drive circuit 30.

[5-2. Configuration, Effect, and the Like for Failure Diagnosis]

The configuration for diagnosis of failure of three-phase-short-circuit-forming circuit 33 in stationary electric vehicle 401 will next be described with reference to FIGS. 53 to 55. A simulation of the diagnosis of failure of three-phase-short-circuit-forming circuit 33 will first be described.

Figure 53:
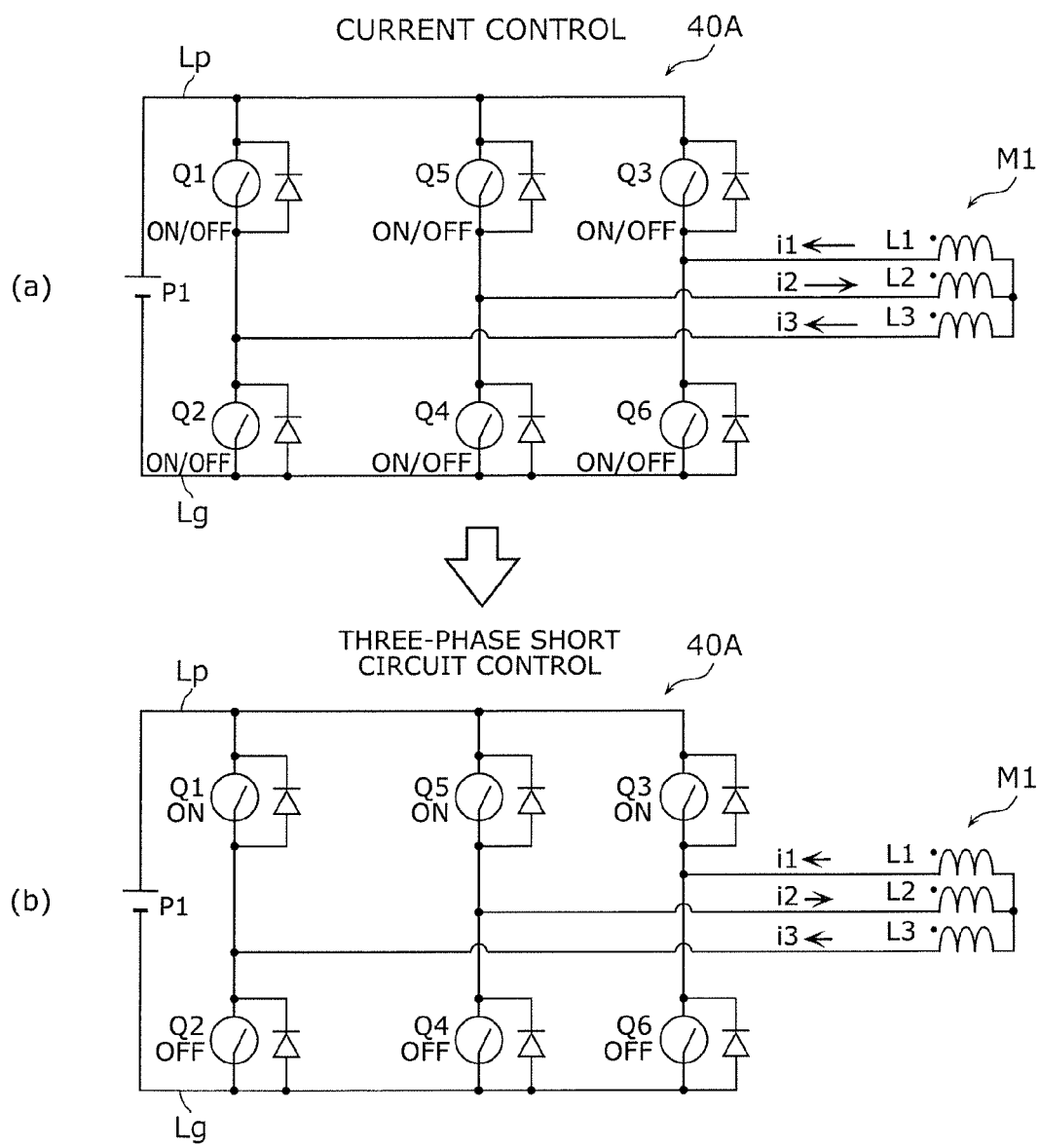
FIG. 53 is a circuit diagram for simulation of diagnosis of failure of a three-phase-short-circuit-forming circuit; (a) shows the state in which current control is performed on the motor, and (b) shows the state in which the three-phase short circuit control is performed on the motor.

FIG. 53 is a circuit diagram for the simulation of the diagnosis of failure of three-phase-short-circuit-forming circuit 33. The portion (a) of FIG. 53 shows the state in which the current control is performed on motor M1, and the portion (b) of FIG. 53 shows the state in which the three-phase short circuit control is performed on motor M1.

The circuit shown in FIG. 53 is an equivalent circuit for simulation on the actual configuration shown in FIG. 52 and includes three-phase bridge circuit 40A, battery P1, and motor M1. Three-phase bridge circuit 40A includes switch elements Q1, Q5, and Q3 provided in an upper arm group and switch elements Q2, Q4, and Q6 provided in a lower arm group. Switch elements Q1, Q5, and Q3 are connected to three output wires drawn from coils L1, L2, and L3, which form motor M1, and to power source wire Lp connected to the anode of battery P1 and located therebetween. Switch elements Q2, Q4, and Q6 are connected to the three output wires described above and to ground wire Lg connected to the cathode of battery P1 and located therebetween. A freewheel diode is connected to each of switch elements Q1 to Q6 in parallel thereto.

It is assumed that three-phase bridge circuit 40A corresponds to control circuit 20 in FIG. 52 and is driven by a control instruction from a simulation control unit (not shown). Although no three-phase-short-circuit-forming circuit is provided in the circuit shown in FIG. 53, driving switch elements Q1 to Q6 based on the control instruction from the simulation control unit allows pseudo-creation of a state in which the three-phase-short-circuit-forming circuit has or does not have abnormality.

The simulation of the failure diagnosis is performed in the order (a) and (b) shown in FIG. 53.

To perform the current control shown in (a) of FIG. 53, the simulation control unit determines the time ratio between the ON period and the OFF period for which switch elements Q1 to Q6 are turned on and off in such a way that current i2 flows through coil L2 in the direction indicated by the arrow associated with coil L2, current i1 flows through coil L1 in the direction indicated by the arrow associated with coil L1, and current i3 flows through coil L3 in the direction indicated by the arrow associated with coil L3, and the simulation control unit then performs PWM control. Magnetic energy is thus accumulated in each of coils L1 to L3. It is defined that current i2 flowing from three-phase bridge circuit 40A to motor M1 is positive current, and that current i1 and current i3 flowing from motor M1 to three-phase bridge circuit 40A are each negative current. The current control allows current i1 to i3 flowing through coils L1 to L3, for example, to each have an absolute value greater than or equal to 70 A but smaller than or equal to 200 A.

In the current control, to maintain the state in which electric vehicle 401 is stationary, current that almost causes electric vehicle 401 to start traveling is caused to flow through each of coils L1 to L3 of motor M1. Specifically, the current control is so performed on motor M1 that the d-axis current (current that does not contribute to torque generation) flows but the q-axis current (current that contributes to torque generation) does not flow. In other words, current is caused to flow through each of coils L1 to L3 of motor M1 in such a way that the current cancels the magnetic field produced in accordance with the positions of the magnetic poles of the magnet.

To perform the three-phase short circuit control shown in (b) of FIG. 53, the simulation control unit controls switch elements Q1 to Q6 In such a way that switch elements Q1, Q5, Q3 are turned on and switch elements Q2, Q4, Q6 are turned off. The three-phase short circuit control described above causes the magnetic energy accumulated in coils L1 to L3 to be gradually dissipated, and current i1 to current i3 each change at a predetermined time differentiated value (or time constant) and converge to 0 A. For example, in a case where switch elements Q1 to Q6 abnormally operate, changes in current i1 to i3 differ from the changes at the predetermined time differentiated value. It is noted that a current value and a time differentiated value in the present embodiment are each expressed by an absolute value.

Figure 54:
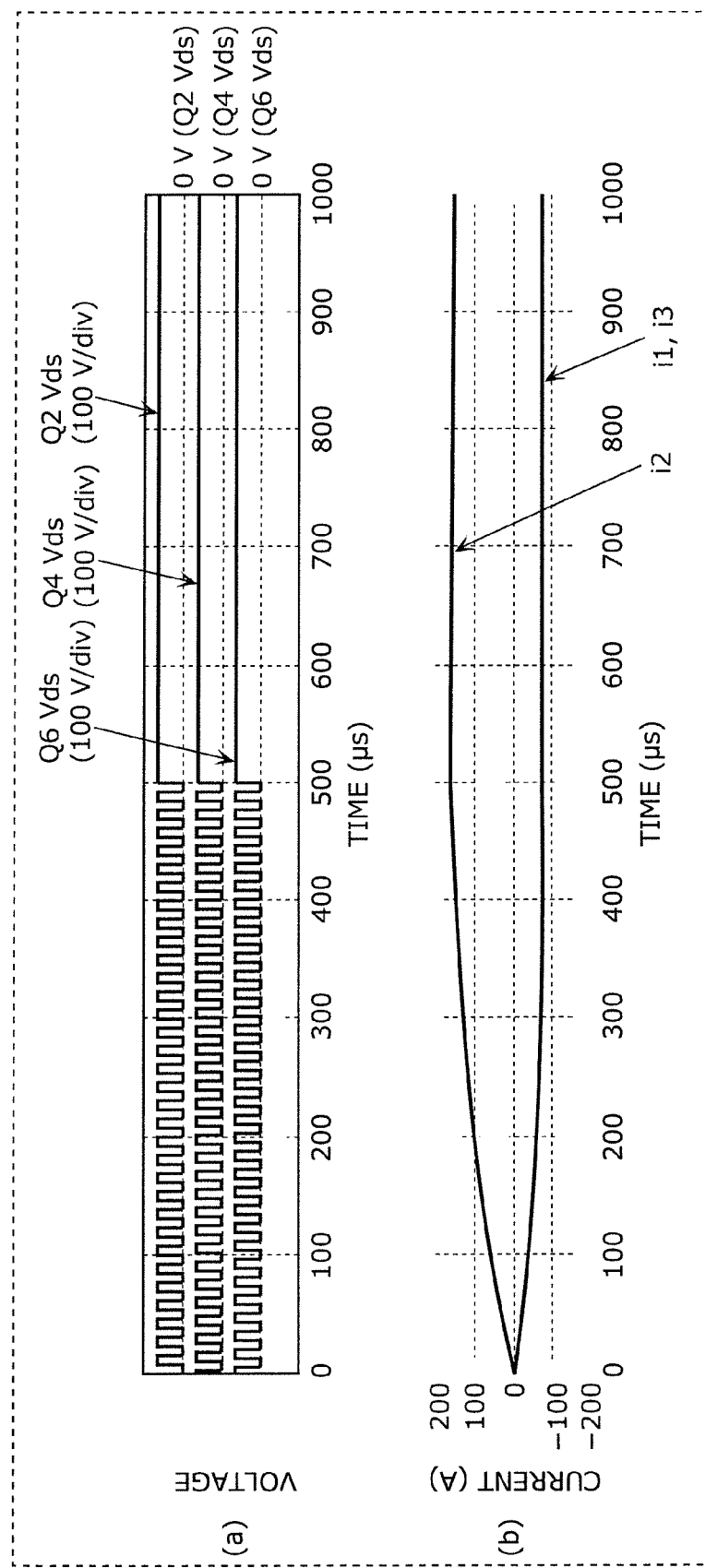
FIG. 54 is a diagram showing voltage across switch elements and current flowing through each phase of the permanent magnet motor in the case where there the switch elements operate normally when the three-phase short circuit control is performed; (a) shows drain-source voltage time-course characteristics of switch elements, and (b) shows current time-course characteristics of the phases.

FIG. 54 shows voltage across each of switch elements Q2, Q4, and Q6 and current flowing through each phase of motor M1 in a case where switch elements Q1 to Q6 operate normally when the three-phase short circuit control is performed. The portion (a) of FIG. 54 shows drain-source voltage time-course characteristics of switch elements Q2, Q4, and Q6, and the portion (b) of FIG. 54 shows current time-course characteristics of the phases of motor M1. FIG. 55 shows the current flowing through motor M1 in a case where switch elements Q1 to Q6 operate abnormally when the three-phase short circuit control is performed. FIGS. 54 and 55, both of which show simulation results, show that the current control is performed from the time 0 μs (microseconds) to 500 μs and the control is switched to the three-phase short circuit control at the time of 500 μS.

The portion (a) of FIG. 54 shows voltage time-course characteristics of switch elements Q2, Q4, and Q6 provided when PWM control is performed on switch elements Q1 to Q6 as shown in (a) of FIG. 53. PWM control is performed on switch elements Q2, Q4, and Q6 until 500 μs is reached to accumulate magnetic energy in coils L1 to L3. Results for switch elements Q1, Q5, and Q3 are not shown because the PWM control performed on switch elements Q1, Q5, and Q3 is reversed PWM control performed on switch elements Q2, Q4, and Q6. The current control based on the PWM control described above causes the absolute values of current i2, i1, and i3 to gradually increase until 500 μs is reached, as shown in (b) of FIG. 54 and FIG. 55, so that magnetic energy is accumulated in each of coils L1 to L3.

Thereafter, when the control is switched to the three-phase short circuit control at the time of 500 μs, switch elements Q2, Q4, and Q6 are turned off, so that drain-source voltage Q2Vds, Q4Vds, and Q6Vds of switch elements Q2, Q4, and Q6 appear, as shown in (a) of FIG. 54. On the other hand, since switch elements Q1, Q5, and Q3 are turned off, drain-source voltage Q1Vds, Q5Vds, and Q3Vds of switch elements Q1, Q5, and Q3, although not shown, are each 0 V. In the case where switch elements Q1 to Q6 operate normally, the time differentiated values of current i2, i1, and i3 each approach 0 A after the time of 500 μs, as shown in (b) of FIG. 54. For example, the time differentiated values of current i1 to i3 are each smaller than 0.05 A/μs, and current i1 to i3 approach 0 A at a moderate gradient from the time of 500 μs to 1000 μs. Current i1 to i3 are each greater than 60 A when 500 μs elapses after the start of the three-phase short circuit control (time of 1000 μs).

Figure 55:
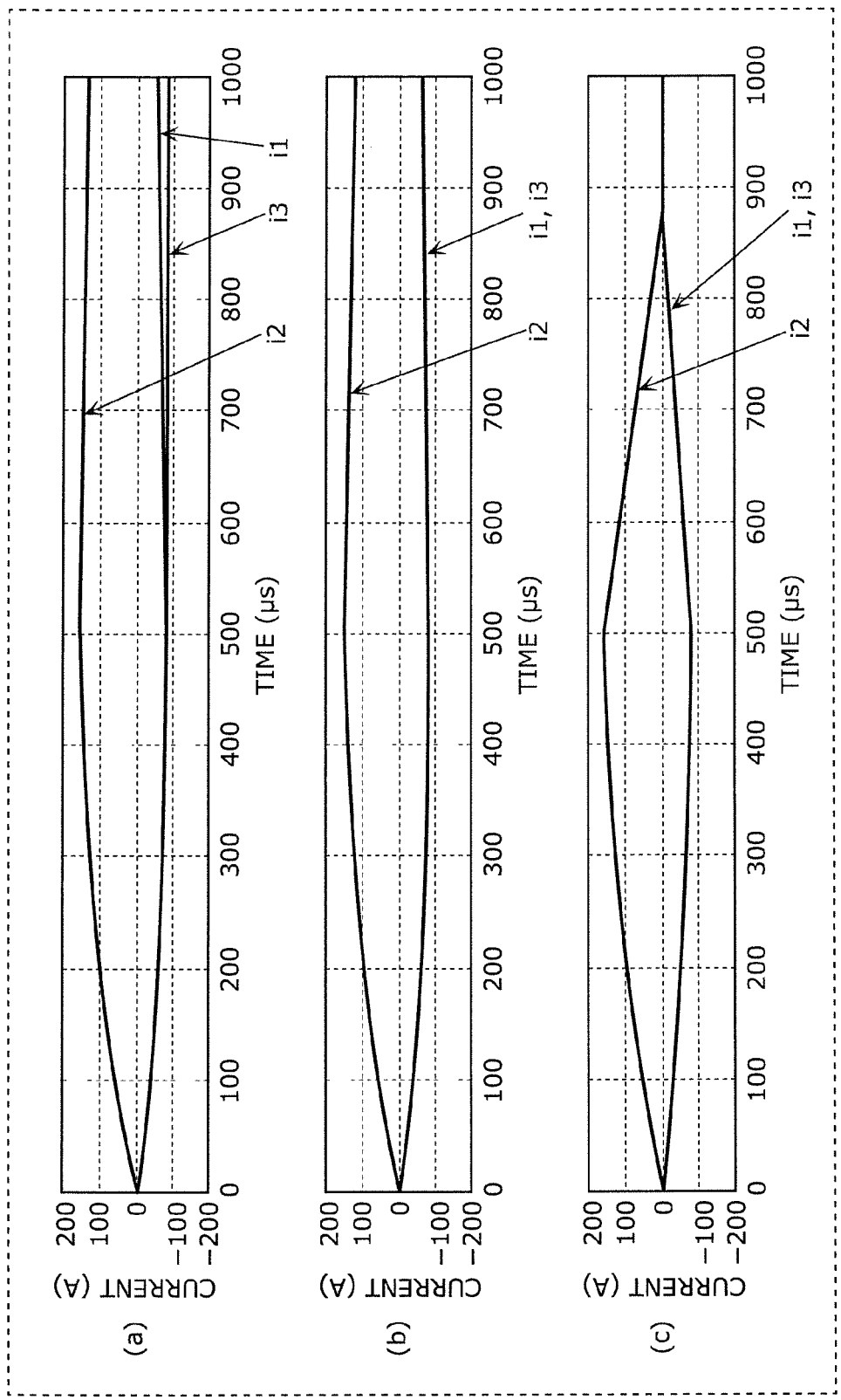
FIG. 55 is a diagram showing the current flowing through each phase of the permanent magnet motor in the case where switch elements operate abnormally when the three-phase short circuit control is performed.

On the other hand, the portion (a) of FIG. 55 shows a case where switch element Q3 is not turned on when the three-phase short circuit control is performed, the portion (b) of FIG. 55 shows a case where neither switch element Q3 nor Q1 is turned on when the three-phase short circuit control is performed, and the portion (c) of FIG. 55 shows a case where none of switch elements Q3, Q1, and Q5 is turned on when the three-phase short circuit control is performed.

In the case where switch element Q3 is not turned on, the time differentiated value of current i1 is greater than in the case where switch elements Q1 to Q6 operate normally and approaches 0 A faster than in the latter case, as shown in (a) of FIG. 55. The reason for this is believed to be the fact that current i1 that flows when the three-phase short circuit control is performed flows through the freewheel diode connected in parallel to switch element Q3 and loss occurs in the freewheel diode.

In the case where neither switch element Q3 nor Q1 is turned on, the time differentiated values of current i1 and i3 are greater than in the case where switch elements Q1 to Q6 operate normally and approaches 0 A faster than in the latter case, as shown in (b) of FIG. 55.

In the case where none of switch elements Q3, Q1, and Q5 is turned on, the time differentiated values of current i1, i3, and i2 are further greater than in (b) of FIG. 55 and approaches 0 A further faster than in the latter case, as shown in (c) of FIG. 55.

The results of the simulation provide the following finding: Monitoring changes in current i1 to i3 flowing through coils L1 to L3 allows checking of whether or not switch elements Q1 to Q6 operate normally or abnormally for failure diagnosis of the three-phase-short-circuit-forming circuit. According to the finding described above, outputting active check signal s1 after the current control is performed on motor M1 as described above also allows vehicle driving apparatus 5E according to Embodiment 5 to evaluate whether or not three-phase-short-circuit-forming circuit 33 has failed in the state in which electric vehicle 401 is stationary.

To perform the evaluation described above, failure evaluating unit 25 of vehicle driving apparatus 5E may acquire information on changes in current i1 to i3 flowing through the three phases of motor M1 after the three-phase short circuit control is performed and evaluate whether or not three-phase-short-circuit-forming circuit 33 has failed based on the information.

Failure evaluating unit 25 may determine that three-phase-short-circuit-forming circuit 33 has failed in a case where the values of current i1 to i3 flowing through coils L1 to L3 are closer to 0 than specified values of current i1 to i3 after a predetermined period elapsed since the three-phase short circuit control was performed. The predetermined period described above is set in accordance with an acceptable monitoring period and selected as appropriate, for example, from the range longer than or equal to 200 μs but shorter than or equal to 1000 μs. The specified values described above are set in accordance with the inductance and resistance of coils L1 to L3 and the current values provided when the current control is performed and selected as appropriate, for example, from the range greater than or equal to 20 A but smaller than or equal to 70 A.

Failure evaluating unit 25 may determine that three-phase-short-circuit-forming circuit 33 has failed in a case where the time differentiated values of current i1 to i3 after the three-phase short circuit control is performed are greater than specified values. The specified values described above are set in accordance with the inductance and resistance of coils L1 to L3 and selected as appropriate, for example, from the range greater than or equal to 0.02 A/μs but smaller than or equal to 0.07 A/μs.

In the circuit in FIG. 53, the current control and the three-phase short circuit control are performed in response to the control instruction from the simulation control unit. In the actual vehicle driving apparatus 5E, however, the current control is performed based on a signal output from drive signal computing unit 23, and the three-phase short circuit control is performed based on a signal output from three-phase-short-circuit-forming circuit 33.

Vehicle driving apparatus 5E according to Embodiment 5 includes inverter 10, which drives motor M1. Inverter 10 includes three-phase bridge circuit 40 including the plurality of switch elements S1 to S6, drive circuit 30 connected to three-phase bridge circuit 40, control circuit 20 connected to drive circuit 30, and abnormality detecting unit 29, which detects abnormality of inverter 10. Drive circuit 30 includes three-phase-short-circuit-forming circuit 33, which causes the three phases of motor M1 to form short circuits, abnormality accepting terminal 39, which accepts abnormality signal s2 output from abnormality detecting unit 29, and check terminal 36, which accepts active check signal s1 for performing the three-phase short circuit control performed by three-phase-short-circuit-forming circuit 33. Control circuit 20 outputs active check signal s1 to check terminal 36 after the current control is performed by using three-phase bridge circuit 40 in such a way that current that almost causes electric vehicle 401 to start traveling flows through motor M1 when electric vehicle 401 is stationary.

The configuration described above allows drive circuit 30 to accept as appropriate active check signal s1 via check terminal 36. Active check signal s1 allows vehicle driving apparatus 5E to check as appropriate whether or not three-phase-short-circuit-forming circuit 33 can perform the three-phase short circuit control. Reliable vehicle driving apparatus 5E in which potential failure of the three-phase short circuit control is located in inverter 10 at an early stage can therefore be provided.

Performing the current control by using three-phase bridge circuit 40 in such a way that current that almost causes electric vehicle 401 to start traveling flows through motor M1 allows diagnosis of failure of three-phase-short-circuit-forming circuit 33 with the stationary state of electric vehicle 401 maintained. Further, outputting active check signal s1 when electric vehicle 401 is stationary allows an increase in the number of opportunities of checking whether or not the three-phase short circuit control can be performed as compared, for example, with the case where active check signal s1 is output only when electric vehicle 401 is in motion and predetermined conditions are satisfied.

[5-3. Action of Vehicle Driving Apparatus]

The action of vehicle driving apparatus 5E will next be described with reference to FIGS. 56 and 57.

Figure 56:
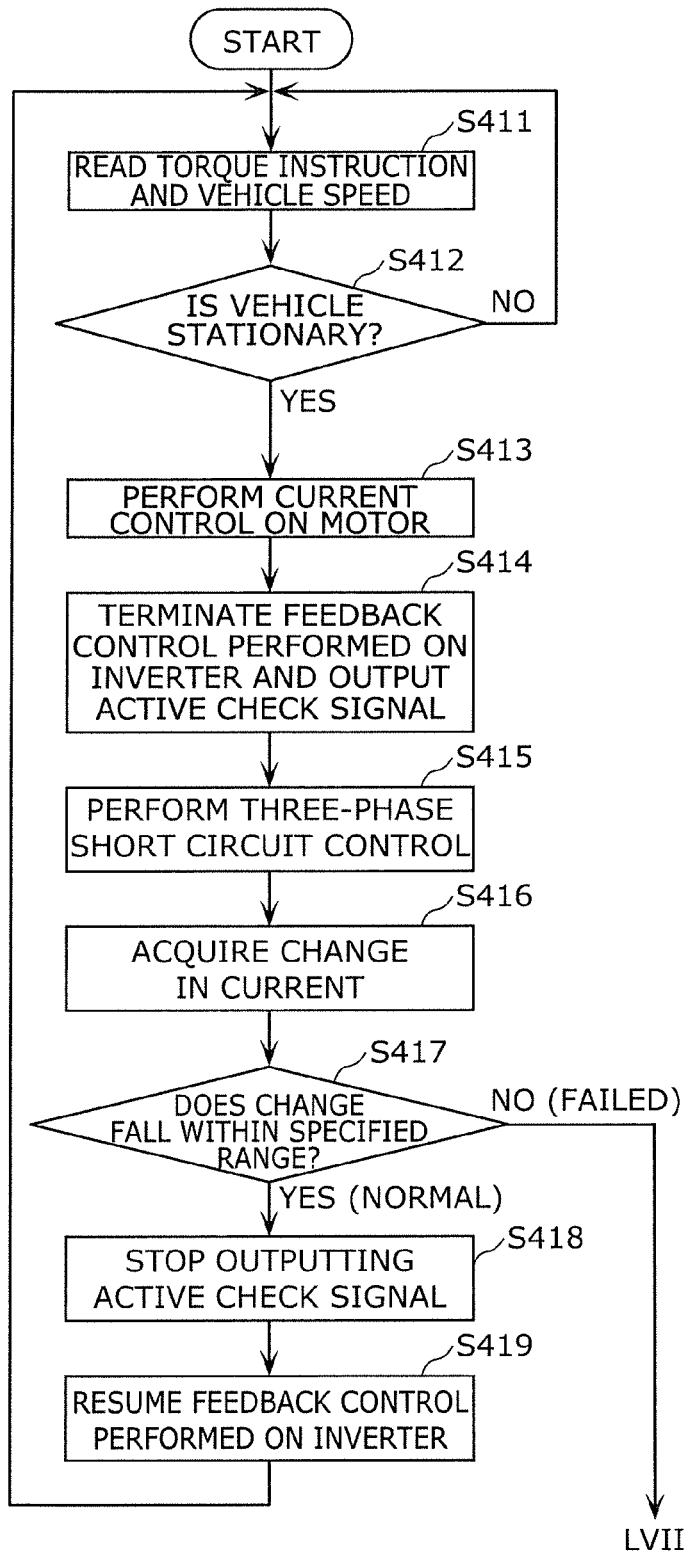
FIG. 56 is a flowchart showing an example of the action of the vehicle driving apparatus according to Embodiment 5.

FIG. 56 is a flowchart showing an example of the action of vehicle driving apparatus 5E. FIG. 57 is a flowchart showing the example of the action of vehicle driving apparatus 5E following the flowchart of FIG. 56.

First, vehicle driving apparatus 5E has been activated.

In this state, control circuit 20 reads the torque instruction and the vehicle speed from an external component (step S411). Specifically, motor control signal acquiring unit 21 reads the torque instruction information and vehicle speed information output from the ECU of electric vehicle 401. The torque instruction information is converted by motor control signal computing unit 22 and output as a control signal, for example, to active check instructing unit 26 and drive signal computing unit 23. The vehicle speed information is not limited to the output from the ECU of electric vehicle 401 and may be based on the output from rotational position sensor RS.

Control circuit 20 then evaluates whether or not electric vehicle 401 is stationary based on the read torque instruction and vehicle speed (step S412). Specifically, control circuit 20 determines that electric vehicle 401 is stationary when the torque instruction is 0 and the vehicle speed is 0. The reason why control circuit 20 determined that electric vehicle 401 is stationary based both on the torque instruction and vehicle speed is as follows.

When electric vehicle 401 is coasting (state in which electric vehicle 401 travels with accelerator or brake pedal not operated), the torque instruction is 0 but the vehicle speed is not 0, electric vehicle 401 is therefore not stationary. On the other hand, when electric vehicle 401 attempts to start traveling on an upward slope, the torque instruction is not 0 (powering operation is performed), but a period for which the vehicle speed is 0 is present. In this case, since motor M1 is so controlled as to perform the powering operation, switch elements Q1 to Q6 cannot be controlled as described with reference to FIG. 53. It can therefore be determined that electric vehicle 401 is stationary in the case where the torque instruction and the vehicle speed are both 0.

When control circuit 20 determines that electric vehicle 401 is not stationary but is in motion (No in S412), control circuit 20 determines that diagnosis of failure of three-phase-short-circuit-forming circuit 33 is not performed at the current timing and returns to step S411. On the other hand, when control circuit 20 determines that electric vehicle 401 is stationary (Yes in step S412), control circuit 20 determines that diagnosis of failure of three-phase-short-circuit-forming circuit 33 is performed at the current timing and proceeds to the following step.

Control circuit 20 then performs the current control on motor M1 (step S413). Specifically, control circuit 20 feedback-controls three-phase bridge circuit 40 via drive circuit 30 in such a way that current that almost causes electric vehicle 401 to start traveling flows through coils L1 to L3 of motor M1, as described with reference to (a) of FIG. 53.

After the current control described above is performed, control circuit 20 terminates feedback control performed on inverter 10 and outputs active check signal s1 (step S414). Specifically, active check instructing unit 26 outputs active check signal s1 to check terminal 36 of drive circuit 30. Active check signal s1 is continuously output until it is stopped in step S418 or S421, which will be described later. Control circuit 20 terminates the current control performed in step S413 by terminating the feedback control on inverter 10 when control circuit 20 outputs active check signal s1.

Inverter 10 then performs the three-phase short circuit control using three-phase-short-circuit-forming circuit 33 (step S415). Check terminal 36 having received active check signal s1 outputs the signal to OR circuit 34, and OR circuit 34 outputs the received signal to three-phase-short-circuit-forming circuit 33. Three-phase-short-circuit-forming circuit 33 is thus driven as an attempt. At this point, switching circuit 31 switches the output signal from switching circuit 31 not to the current control signal output from drive signal computing unit 23 but to the signal output from three-phase-short-circuit-forming circuit 33. The signal output from three-phase-short-circuit-forming circuit 33 is then output to three-phase bridge circuit 40 via buffer circuit 32. Three-phase bridge circuit 40 thus attempts the three-phase short circuit control using three-phase-short-circuit-forming circuit 33.

Control circuit 20 then acquires changes in current i1 to i3 flowing through the phases of motor M1 after the three-phase short circuit control is performed (step S416). Specifically, motor control signal acquiring unit 21 acquires information, for example, on current sensors CSu, CSv, and CSw and rotational position sensor RS. These pieces of information are converted by motor control signal computing unit 22 and output as control signals to failure evaluating unit 25. The reason why information from rotational position sensor RS is acquired is to check that motor M1 is not rotated during the three-phase short circuit control.

Control circuit 20 then evaluates whether or not three-phase-short-circuit-forming circuit 33 has failed based on the changes in current i1 to i3 after the three-phase short circuit control is performed. Specifically, failure evaluating unit 25 evaluates whether or not the changes in current i1 to i3 fall within a specified range (step S417).

When the result of the evaluation shows that the changes in current i1 to i3 after the three-phase short circuit control is performed fall within the specified range (Yes in step S417), failure evaluating unit 25 determines that three-phase-short-circuit-forming circuit 33 has not failed and is normally operating. Specifically, failure evaluating unit 25 determines that three-phase-short-circuit-forming circuit 33 is normally operating when the time differentiated values of current i1 to i3 are smaller than 0.05 A/s, which is the specified range, as described with reference, for example, to FIG. 54. Control circuit 20 then stops outputting active check signal s1 output from active check instructing unit 26 (step S418) and resumes the feedback control performed on inverter 10 (step S419). Control circuit 20 then returns to step S411 and repeats the active check. The active check is repeatedly performed at predetermined time intervals.

On the other hand, when the changes in current i1 to i3 after the three-phase short circuit control is performed do not fall within the specified range (No in step S417), control circuit 20 determines that three-phase-short-circuit-forming circuit 33 has failed. Control circuit 20 then performs actions to be performed when three-phase-short-circuit-forming circuit 33 has failed, as shown in FIG. 57.

Figure 57:
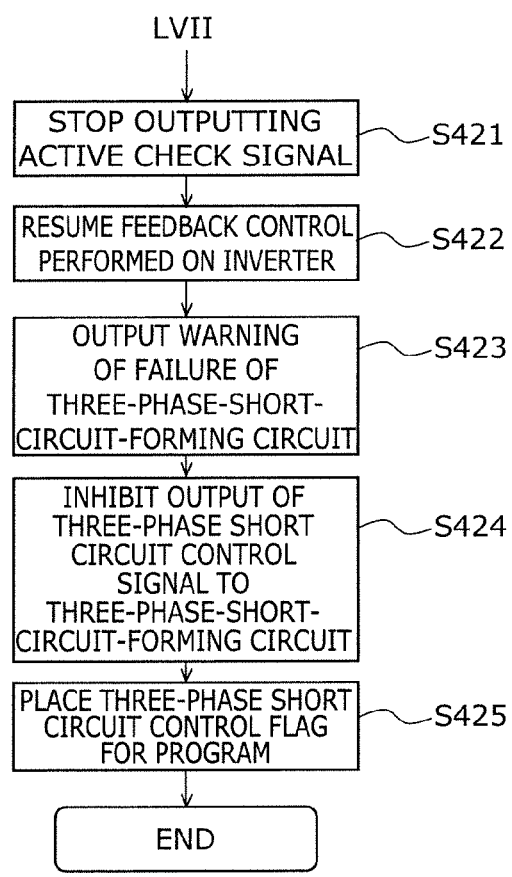
FIG. 57 is a flowchart showing the example of the action of the vehicle driving apparatus following the flowchart of FIG. 56.

Control circuit 20 stops outputting active check signal s1 output from active check instructing unit 26 (step S421) and resumes the feedback control performed on inverter 10 (step S422), as shown in FIG. 57.

Control circuit 20 then outputs a failure warning representing that three-phase-short-circuit-forming circuit 33 has failed to an external component, for example, the ECU (upper-level control unit) of electric vehicle 401 (step S423). Failure evaluating unit 25 may notify a user of the failure information by displaying the failure information on a monitor or outputting a sound that Informs the failure information via a loudspeaker.

Further, control circuit 20 inhibits output of a three-phase short circuit control signal to three-phase-short-circuit-forming circuit 33 (step S424). Specifically, control circuit 20 inhibits active check instructing unit 26 from outputting active check signal s1. Control circuit 20 places a flag representing the three-phase short circuit control (step S425). When the flag is placed, and for example, when abnormality detecting unit 29 has detected abnormality of inverter 10, the three-phase short circuit control is performed by using the program stored in memory 24 in control circuit 20 instead of using three-phase-short-circuit-forming circuit 33. The three-phase short circuit control can thus be performed even if inverter 10 experiences abnormality before the failure of three-phase-short-circuit-forming circuit 33 is repaired.

In the case where it is determined that three-phase-short-circuit-forming circuit 33 has failed, control circuit 20 may control inverter 10 in such a way that the number of revolutions of motor M1 is restricted to a certain number in the following drive operation of vehicle driving apparatus 5E.

Further, in the case where it is determined that three-phase-short-circuit-forming circuit 33 has failed and in the middle of operation of outputting active check signal s1, control circuit 20 may use the program stored in memory 24 in control circuit 20 to output a control signal for performing the three-phase short circuit control to drive circuit 30. The configuration described above can suppress overvoltage applied to three-phase bridge circuit 40 that occurs when three-phase-short-circuit-forming circuit 33 having failed drives three-phase bridge circuit 40 in the middle of operation of outputting active check signal s1.

Control circuits 20 may stop outputting active check signal s1 when control circuit 20 accepts, during the output of active check signal s1, an instruction that causes motor M1 to perform the powering operation. Having stopped outputting active check signal s1, control circuit 20 may nullify the result of the evaluation of whether or not three-phase-short-circuit-forming circuit 33 has failed.

[5-4. Other Configurations for Failure Diagnosis]

Other configurations for the failure diagnosis will next be described with reference to FIGS. 58 to 60. A simulation of the diagnosis of failure of three-phase-short-circuit-forming circuit 33 will be described also in the following sections.

Figure 58:
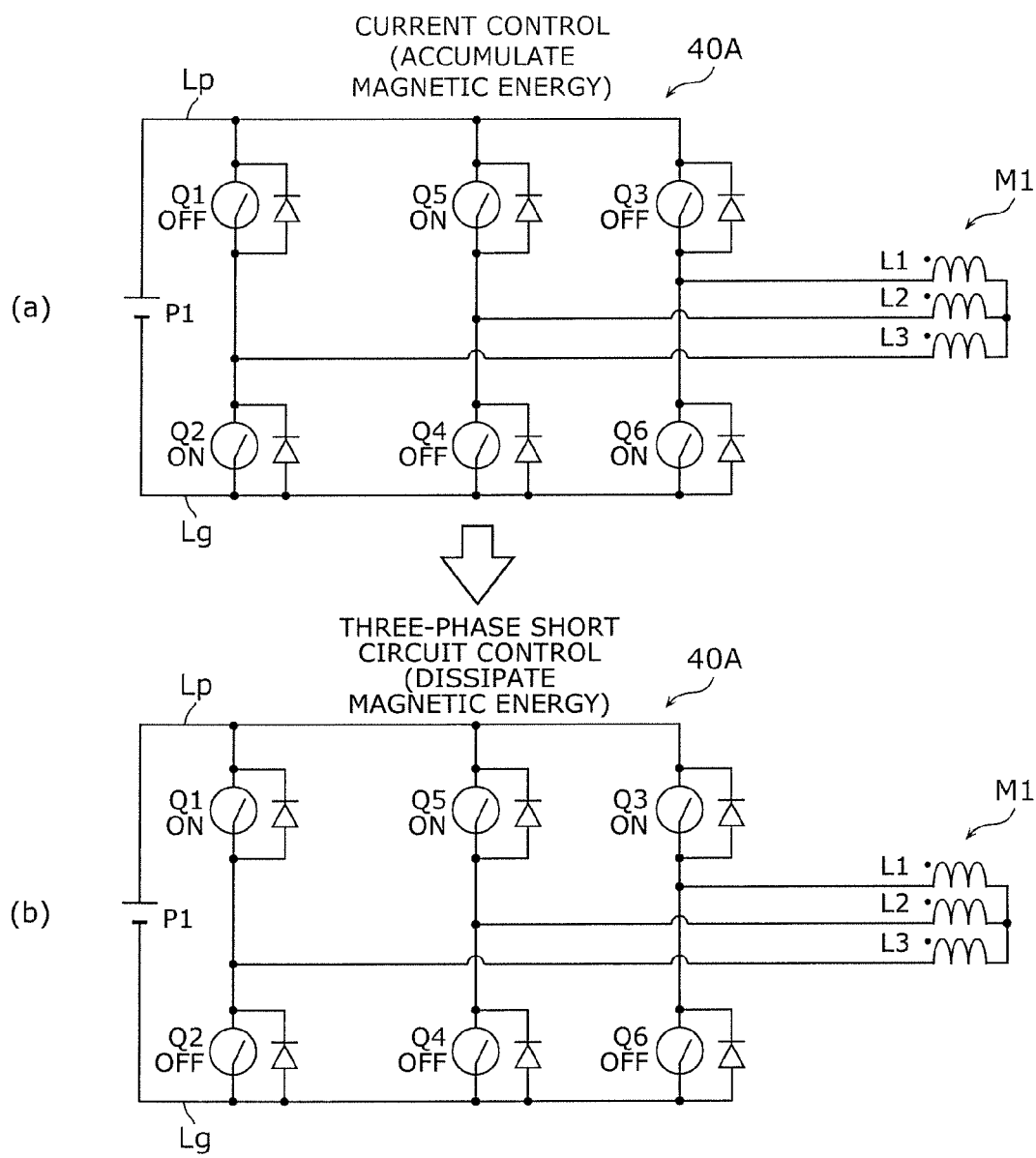
FIG. 58 is a diagram showing another example of the simulation of diagnosis of failure of the three-phase-short-circuit-forming circuit.

FIG. 58 shows another example of the simulation of diagnosis of failure of three-phase-short-circuit-forming circuit 33. The portion (a) of FIG. 58 shows the state in which the current control is performed on motor M1, and the portion (b) of FIG. 58 shows the state in which the three-phase short circuit control is performed on motor M1. The circuit shown in FIG. 58 is an equivalent circuit for simulation on the actual configuration shown in FIG. 52, and the configuration of the equivalent circuit is the same as that shown in FIG. 53.

The simulation of the failure diagnosis is performed in the order (a) and (b) shown in FIG. 58.

To perform the current control shown in (a) of FIG. 58, the simulation control unit turns on switch elements Q5, Q2, and Q6 for a predetermined period and turns off switch elements Q1, Q3, and Q4 for the predetermined period. Current flows through each of coils L1 to L3, and magnetic energy is therefore accumulated in each of coils L1 to L3. The predetermined period is selected as appropriate, for example, from the range longer than or equal to 200 μs but shorter than or equal to 300 μs.

Also in the current control, to maintain the state in which electric vehicle 401 is stationary, current that almost causes electric vehicle 401 to start traveling is caused to flow through each of coils L1 to L3 of motor M1, as in FIG. 53.

To perform the three-phase short circuit control shown in (b) of FIG. 58, the simulation control unit controls switch elements Q1 to Q6 in such a way that switch elements Q1, Q5, Q3 are turned on and switch elements Q2, Q4, Q6 are turned off. The three-phase short circuit control described above causes the magnetic energy accumulated in coils L1 to L3 to be gradually dissipated, and current flowing through each of coils L1 to L3 changes at a predetermined time differentiated value and converges to 0 A. For example, in the case where switch elements Q1 to Q6 abnormally operate, a change in current flowing through each of coils L1 to L3 differs from the change at the predetermined time differentiated value. It is noted that a current value and a time differentiated value in the present embodiment are also each expressed by an absolute value.

Figure 59:
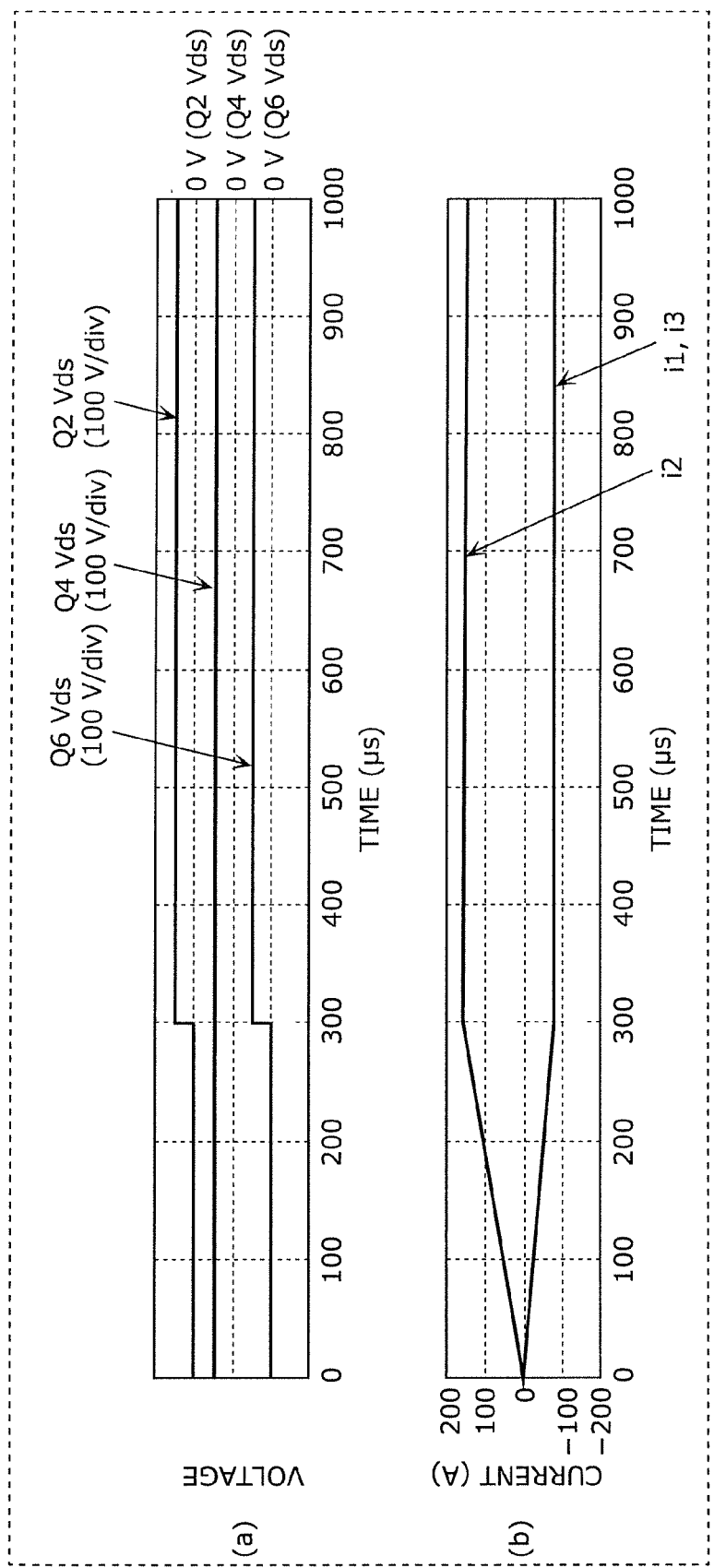
FIG. 59 is a diagram showing the voltage across switch elements and current flowing through each phase of the permanent magnet motor in another case where switch elements operate normally when the three-phase short circuit control is performed; (a) shows drain-source voltage time-course characteristics of switch elements, and (b) shows current time-course characteristics of the phases.

FIG. 59 shows voltage across each of switch elements Q2, Q4, and Q6 and current flowing through each phase of motor M1 in another case where switch elements Q1 to Q6 operate normally when the three-phase short circuit control is performed. The portion (a) of FIG. 59 shows drain-source voltage time-course characteristics of switch elements Q2, Q4, and Q6, and the portion (b) of FIG. 59 shows current time-course characteristics of the phases of motor M1. FIG. 60 shows the current flowing through each phase of motor M1 in another case where switch elements Q1 to Q6 operate abnormally when the three-phase short circuit control is performed. FIGS. 59 and 60, both of which show simulation results, show that the current control is performed from the time 0 μs to 300 μs and the control is switched to the three-phase short circuit control at the time of 300 μs, as in FIGS. 54 and 55.

The portion (a) of FIG. 59 shows voltage time-course characteristics of switch elements Q2, Q4, and Q6 provided when switch elements Q1 to Q6 are controlled as shown in (a) of FIG. 58. Switch elements Q1 to Q6 are so controlled that switch elements Q2 and Q6 are turned on and element Q4 is turned off until 300 μs is reached to accumulate magnetic energy in coils L1 to L3. Results for switch elements Q1, Q3, and Q5 are not shown because the control performed on switch elements Q1, Q3, and Q5 is reversed control performed on switch elements Q2, Q6, and Q4. The current control described above causes the absolute values of current i2, i1, and i3 to gradually Increase until 300 μs is reached, as shown in (b) of FIG. 59 and FIG. 60, so that magnetic energy is accumulated in each of coils L1 to L3.

Figure 60:
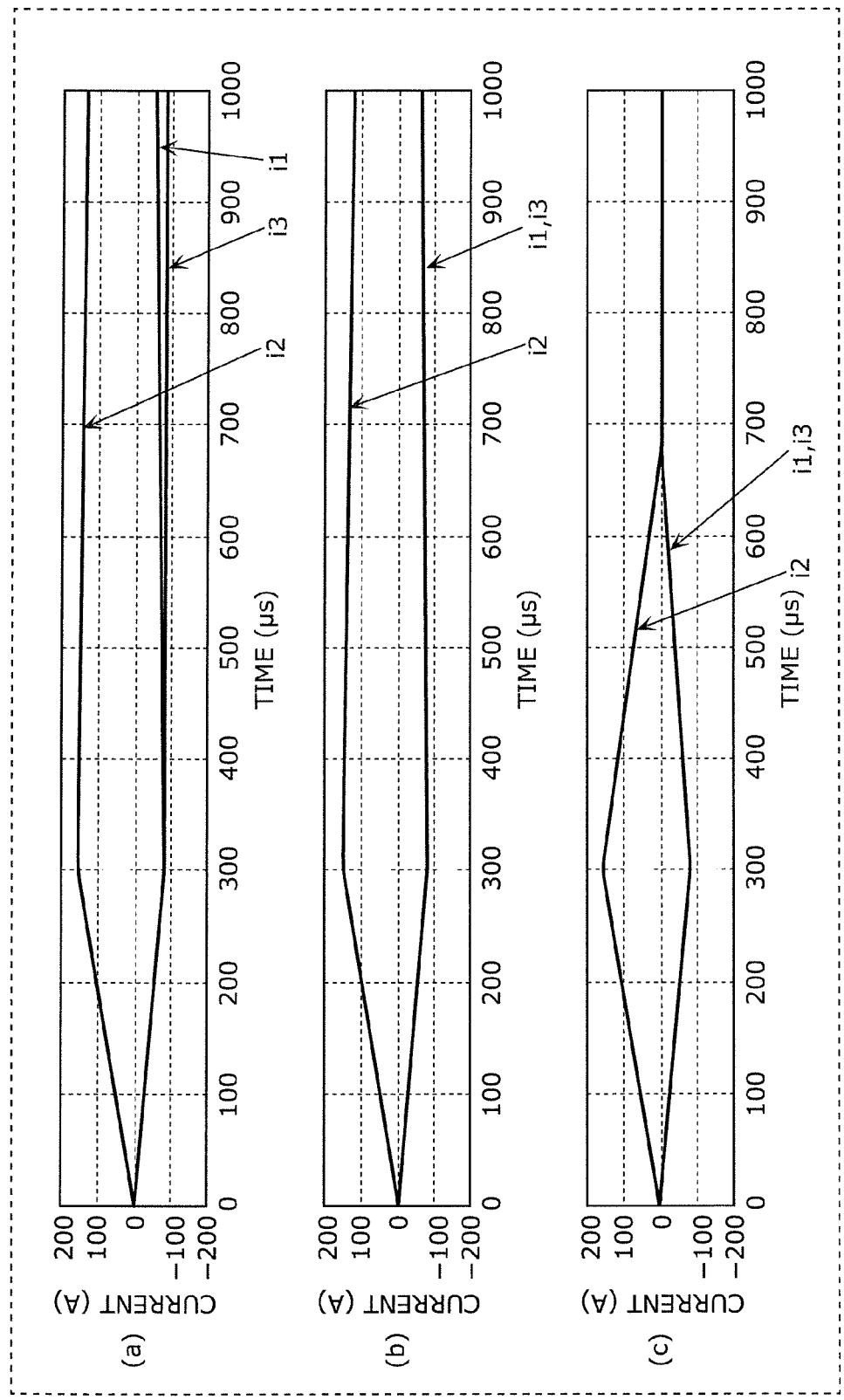
FIG. 60 is a diagram showing the current flowing through each phase of the permanent magnet motor in another case where switch elements operate abnormally when the three-phase short circuit control is performed.

The behaviors of changes in the voltage across switch elements Q2, Q6, and Q4 and the current flowing through phases of motor M1 In FIGS. 59 and 60 after the control is switched to the three-phase short circuit control at the time of 300 μs are the same as the behaviors in FIGS. 54 and 55, respectively, and will therefore not be described in detail.

Even in the configuration in which the magnetic energy is accumulated as described above, monitoring changes in the current flowing through coils L1 to L3 still allows the vehicle driving apparatus to check whether or not switch elements Q1 to Q6 operate abnormally and therefore allows diagnosis of failure of the three-phase-short-circuit-forming circuit. Therefore, outputting active check signal s1 after the current control is performed on motor M1 as described above also allows vehicle driving apparatus 5E shown in this example to check whether or not three-phase-short-circuit-forming circuit 33 has failed in the state in which electric vehicle 401 is stationary.

Embodiment 5 described above is an essentially preferable example and is not Intended to limit the scope of the present invention, an object to which the present invention is applied, or the application of the present invention.

For example, the failure evaluating unit described above may acquire information on changes in the current flowing through the three phases of the permanent magnet motor described above after the three-phase short circuit control described above is performed and evaluate whether or not the three-phase-short-circuit-forming circuit described above has failed based on the information described above.

The failure evaluating unit can thus appropriately evaluate whether or not the three-phase-short-circuit-forming circuit has failed. Potential failure of the three-phase short circuit control can therefore be located in the inverter at an early stage to increase the reliability of the vehicle driving apparatus.

The failure evaluating unit described above may determine that the three-phase-short-circuit-forming circuit described above has failed in a case where the values of the current described above are closer to 0 than specified values of the current after a predetermined period elapsed since the three-phase short circuit control was performed.

The failure evaluating unit can thus readily diagnose failure of the three-phase-short-circuit-forming circuit. Potential failure of the three-phase short circuit control can therefore be located in the inverter at an early stage to Increase the reliability of the vehicle driving apparatus.

The failure evaluating unit described above may determine that the three-phase-short-circuit-forming circuit described above has failed in a case where the time differentiated values of the current described above after the three-phase short circuit control is performed are greater than specified values.

The failure evaluating unit can thus readily diagnose failure of the three-phase-short-circuit-forming circuit. Potential failure of the three-phase short circuit control can therefore be located in the inverter at an early stage to Increase the reliability of the vehicle driving apparatus.

At least two of the configurations of Embodiments 1 to 5 described above may be combined with each other, desirably, all the embodiments may be combined with one another. An example of the configuration of the combination of all the embodiments will be described below.

Electric vehicle 301 is assumed to be a hybrid vehicle including the other drive source D2 (engine), as shown in FIG. 35. The active check made on three-phase-short-circuit-forming circuit 33 provided in inverter 10 of electric vehicle 301 is performed as follows. The reason why electric vehicle 301 has the configuration shown in FIG. 35 is to achieve the active check in the powering operation.

First, when electric vehicle 301 is in motion, and motor M1 is performing no powering or regenerating operation but is performing the coasting operation, or electric vehicle 301 is in motion based only on the other drive source D2, the active check is performed by the actions shown in FIGS. 4 and 5. Thereafter, when electric vehicle 301 is in motion, and motor M1 is performing no powering or regenerating operation but performing the regenerating operation at torque smaller than or equal to predetermined torque, the active check is performed by the actions shown in FIGS. 13 and 14.

Figure 27:
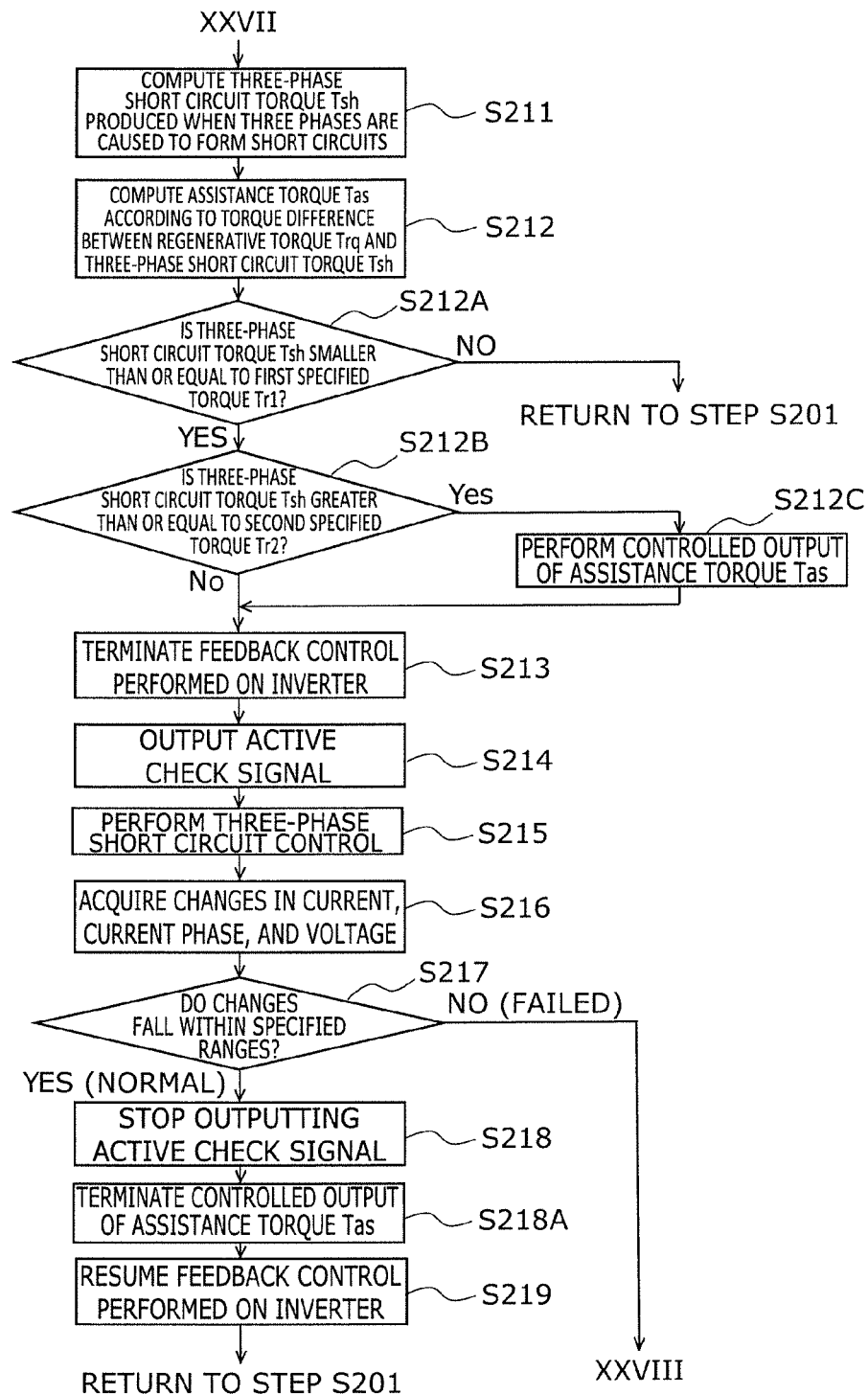
FIG. 27 is a flowchart showing the example of the action of the vehicle driving apparatus following the flowchart of FIG. 26.

Thereafter, when electric vehicle 301 is in motion, and motor M1 is performing the regenerating operation, the active check is performed by the actions shown in FIGS. 26, 27 and 28. Thereafter, when electric vehicle 301 is in motion, and motor M1 is performing the powering operation, the active check is performed by the actions shown in FIGS. 40, 41, and 42. Thereafter, when electric vehicle 301 is stationary, the active check is performed by the actions shown in FIGS. 56 and 57.

The configurations and actions described above allow high-frequency diagnosis of failure of the three-phase-short-circuit-forming circuit in any state of electric vehicle 301. Potential failure of the three-phase short circuit control in inverter 10 is therefore likely to be located at an earlier stage to further increase the reliability of the vehicle driving apparatus.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2018-228670 filed on Dec. 6, 2018, Japanese Patent Application No. 2019-010433 filed on Jan. 24, 2019, Japanese Patent Application No. 2019-010440 filed on Jan. 24, 2019, Japanese Patent Application No. 2019-010453 filed on Jan. 24, 2019, Japanese Patent Application No. 2019-010557 filed on Jan. 24, 2019, and Japanese Patent Application No. 2019-126208 filed on Jul. 5, 2019.

INDUSTRIAL APPLICABILITY

As described above, the present disclosure is useful as a vehicle driving apparatus that drives an electric vehicle.

The invention claimed is:
1. A vehicle driving apparatus, comprising:
an inverter configured to drive a permanent magnet motor,
wherein the inverter includes a three-phase bridge circuit including a plurality of switch elements, a drive circuit connected to the three-phase bridge circuit, a control circuit connected to the drive circuit, and an abnormality detecting unit configured to detect abnormality of the inverter, and
the drive circuit includes a three-phase-short-circuit-forming circuit configured to cause three phases of the permanent magnet motor to form short circuits, an abnormality accepting terminal configured to accept an abnormality signal output from the abnormality detecting unit, and a check terminal configured to accept an active check signal in order to check whether the three-phase-short-circuit-forming circuit is able to perform three-phase short circuit control.

2. The vehicle driving apparatus according to claim 1, wherein in a case where the vehicle is in motion and the permanent magnet motor is performing no powering or regenerating operation, the control circuit outputs the active check signal.

3. The vehicle driving apparatus according to claim 1, wherein the control circuit outputs the active check signal to the check terminal based on three-phase short circuit torque that is torque produced in the permanent magnet motor when the three-phase short circuit control is performed during the regenerating operation of the permanent magnet motor.

4. The vehicle driving apparatus according to claim 3, wherein in a case where the three-phase short circuit torque is smaller than or equal to first specified torque, the control circuit outputs the active check signal.

5. The vehicle driving apparatus according to claim 4, further comprising:
a torque imparting apparatus configured to impart torque to one or more driving wheels of the vehicle,
wherein in a case where the three-phase short circuit torque is greater than or equal to second specified torque smaller than the first specified torque, the control circuit further controls the torque imparting apparatus in such a way that assistance torque according to a torque difference between regenerative torque produced when the permanent magnet motor is performing regenerating operation and the three-phase short circuit torque is imparted to the driving wheels.

6. The vehicle driving apparatus according to claim 1, wherein the permanent magnet motor is one drive source, the vehicle driving apparatus further comprises an other drive source different from the one drive source, and
in a case where the one drive source is not used and the other drive source is capable of driving the vehicle, the control circuit outputs the active check signal to the check terminal.

7. The vehicle driving apparatus according to claim 6, wherein the control circuit outputs the active check signal after the control circuit determines that the one drive source and the other drive source are both performing powering operation.

8. The vehicle driving apparatus according to claim 7, wherein in a case where the other drive source is capable of outputting entire torque that is a combination of first torque output from the one drive source, second torque output from the other drive source, and three-phase short circuit torque that is torque produced in the permanent magnet motor when the three-phase short circuit control is performed in the one drive source, the control circuit determines that the other drive source is capable of driving the vehicle.

9. The vehicle driving apparatus according to claim 6, wherein the other drive source includes at least one of an other permanent magnet motor different from the permanent magnet motor and an engine.

10. The vehicle driving apparatus according to claim 6, further comprising:
two permanent magnet motors that are each the permanent magnet motor, one inverter that is the inverter and drives the one drive source that is one of the two permanent magnet motors, and an other inverter that is the inverter and drives the other drive source that is an other one of the two permanent magnet motors,
wherein in a case where the one drive source is not used and the other drive source is capable of driving the vehicle, the control circuit outputs the active check signal to one check terminal that is the terminal provided in the one inverter, and in a case where the other drive source is not used and the one drive source is capable of driving the vehicle, the control circuit outputs the active check signal to an other check terminal that is the terminal provided in the other inverter.

11. The vehicle driving apparatus according to claim 1, wherein when the vehicle is stationary, the control circuit outputs the active check signal to the check terminal after current control is performed by using the three-phase bridge circuit in such a way that current that does not cause the vehicle to start traveling flows through the permanent magnet motor.

12. The vehicle driving apparatus according to claim 11, wherein upon acceptance of the active check signal, the drive circuit switches the current control performed by the permanent magnet motor to the three-phase short circuit control.

13. The vehicle driving apparatus according to claim 11, wherein the control circuit terminates the current control when the control circuit outputs the active check signal.

14. The vehicle driving apparatus according to claim 11, wherein the control circuit performs the current control by controlling the three-phase bridge circuit via the drive circuit in such a way that d-axis current flows through the permanent magnet motor.

15. The vehicle driving apparatus according to claim 1, wherein in a case where torque of the permanent magnet motor produced when the three-phase short circuit control is performed is smaller than or equal to torque that does not affect a driven state of the vehicle driving apparatus, the control circuit:
1) determines current expected to flow through the permanent magnet motor when the three-phase short circuit control is performed;
2) controls the three-phase bridge circuit via the drive circuit in such a way that the current flows through the permanent magnet motor; and then
3) outputs the active check signal to the check terminal.

16. The vehicle driving apparatus according to claim 15, wherein when the permanent magnet motor is not performing powering or regenerating operation or performing regenerating operation at torque smaller than or equal to predetermined torque, the control circuit determines that the torque of the permanent magnet motor produced when the three-phase short circuit control is performed is smaller than or equal to the torque that does not affect the driven state of the vehicle driving apparatus.

17. The vehicle driving apparatus according to claim 15, wherein the control circuit determines the current based on a number of revolutions of the permanent magnet motor achieved when the three-phase short circuit control is performed.

18. The vehicle driving apparatus according to claim 15, wherein the control circuit includes a failure evaluating unit configured to evaluate whether or not the three-phase-short-circuit-forming circuit has failed, and the failure evaluating unit determines that the three-phase-short-circuit-forming circuit has failed in at least one of a case where a difference in d-axis current in the permanent magnet motor between before and after the active check signal is output does not fall within a specified range and a case where a difference in q-axis current in the permanent magnet motor between before and after the active check signal is output does not fall within a specified range.

19. The vehicle driving apparatus according to claim 1, comprising:
two permanent magnet motors that are each the permanent magnet motor, one inverter that is the inverter and drives one of the two permanent magnet motors, and an other inverter that is the inverter and drives an other one of the two permanent magnet motors,
wherein in a case where the one permanent magnet motor is performing powering or regenerating operation, and the three-phase short circuit control is performed in the other permanent magnet motor, and when torque of the other permanent magnet motor is smaller than or equal to torque that does not affect a driven state of the vehicle driving apparatus, the control circuit in the other inverter:
1) determines current expected to flow through the other permanent magnet motor when the three-phase short circuit control is performed;
2) controls the three-phase bridge circuit via the drive circuit in such a way that the current flows through the other permanent magnet motor; and then
3) outputs the active check signal to the check terminal.

20. The vehicle driving apparatus according to claim 1, wherein the drive circuit performs the three-phase short circuit control in a case where the drive circuit accepts the active check signal output from the control circuit via the check terminal.

21. The vehicle driving apparatus according to claim 1, wherein the control circuit includes a failure evaluating unit configured to evaluate whether or not the three-phase-short-circuit-forming circuit has failed.

22. The vehicle driving apparatus according to claim 21, wherein the failure evaluating unit acquires information on a change that occurs in at least one of the following, when the three-phase short circuit control is performed: current flowing through the three phases of the permanent magnet motor; a current phase; and DC voltage applied to the three-phase bridge circuit, and evaluates whether or not the three-phase-short-circuit-forming circuit has failed based on the information.

23. The vehicle driving apparatus according to claim 21, wherein after the control circuit determines that the three-phase-short-circuit-forming circuit has failed, and in a case where abnormality occurs in the inverter, the control circuit uses a program stored in a memory in the control circuit to output a control signal for performing the three-phase short circuit control to the drive circuit.

24. The vehicle driving apparatus according to claim 1, wherein the control circuit stops outputting the active check signal in a case where the permanent magnet motor performs powering or regenerating operation during the output of the active check signal.

* * * * *